United States Patent
Gesty

(10) Patent No.: US 10,363,613 B1
(45) Date of Patent: Jul. 30, 2019

(54) PIPELINE REINSTATEMENT TOOL

(71) Applicant: Hurricane Reinstatement Solutions, LLC, Tucson, AZ (US)

(72) Inventor: Michael Gesty, Tucson, AZ (US)

(73) Assignee: Hurricane Reinstatement Solutions, LLC, Tucson, AZ (US)

( * ) Notice: Subject to any disclaimer, the term of this patent is extended or adjusted under 35 U.S.C. 154(b) by 0 days.

(21) Appl. No.: 16/277,241

(22) Filed: Feb. 15, 2019

Related U.S. Application Data

(60) Provisional application No. 62/754,403, filed on Nov. 1, 2018.

(51) Int. Cl.
    *B23B 45/00*     (2006.01)
    *F16L 55/179*     (2006.01)
    *F16L 55/175*     (2006.01)

(52) U.S. Cl.
    CPC .......... *B23B 45/005* (2013.01); *F16L 55/179* (2013.01); *B23B 2251/58* (2013.01); *B23B 2260/068* (2013.01); *F16L 55/175* (2013.01); *Y10T 408/557* (2015.01); *Y10T 408/665* (2015.01)

(58) Field of Classification Search
    CPC .............. B23B 45/005; B23B 2251/58; B23B 2260/068; F16L 55/179; Y10T 408/665
    See application file for complete search history.

(56) References Cited

U.S. PATENT DOCUMENTS

| | | | | |
|---|---|---|---|---|
| 3,016,073 A | * | 1/1962 | Broussard | B23B 45/00 408/110 |
| 4,029,428 A | * | 6/1977 | Levens | F16L 55/179 175/61 |
| 4,245,970 A | * | 1/1981 | St. Onge | B29C 44/386 138/93 |
| 5,411,082 A | * | 5/1995 | Kennedy | E21B 7/061 166/181 |
| 5,816,345 A | * | 10/1998 | Keller | B29C 63/36 175/53 |
| 7,510,357 B2 | * | 3/2009 | Kamiyama | F16L 55/179 138/97 |

(Continued)

OTHER PUBLICATIONS

"Lateral Cutters", Picote Solutions, retrieved from: <https://www.picotesolutions.com/lateral-cutters>, 3 pages., 2018.

*Primary Examiner* — Eric A Gates
(74) *Attorney, Agent, or Firm* — Grossman, Tucker, Perreault & Pfleger, PLLC

(57) ABSTRACT

A new, innovative tool useful in fluidly coupling a lateral pipeline to a reinstated pipeline containing a continuous liner is provided. The pipeline reinstatement tool includes a flexible shaft that is coupled to a cutting head at a first end and a coupling assembly at a second end. The cutting head includes a hollow cylindrical member having cutting teeth that project longitudinally from the first end of the hollow cylindrical member. The tool includes a first compressible tensioner portion disposed about the flexible shaft proximate cutting head, a second compressible tensioner portion disposed about the flexible shaft proximate the coupling assembly, and a flexible sleeve portion disposed about the flexible shaft between the first compressible tensioner portion and the second compressible tensioner portion.

18 Claims, 47 Drawing Sheets

(56) References Cited

U.S. PATENT DOCUMENTS

2007/0163810 A1* 7/2007 Underwood ............ E21B 17/20
                                                                  175/61
2008/0083567 A1* 4/2008 Downton ................ E21B 7/067
                                                                  175/73

\* cited by examiner

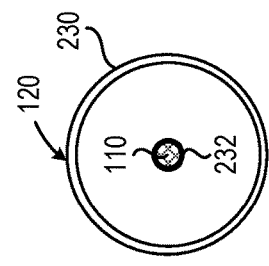
FIG. 2B
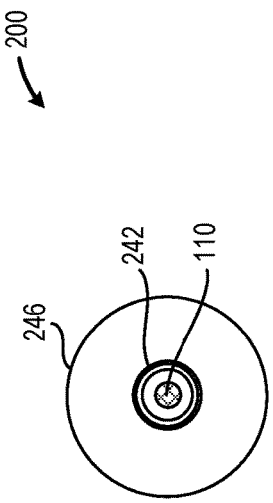
FIG. 2C
FIG. 2D
FIG. 2E
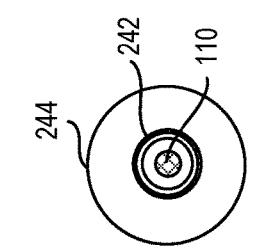
FIG. 2F
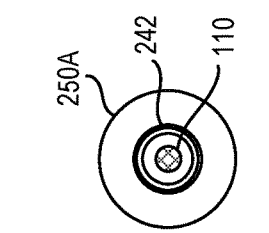
FIG. 2G
FIG. 2H
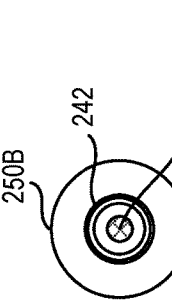
FIG. 2I
FIG. 2J
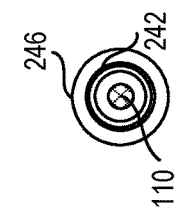
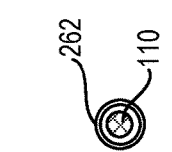
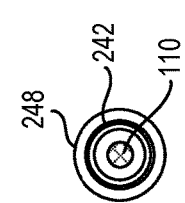

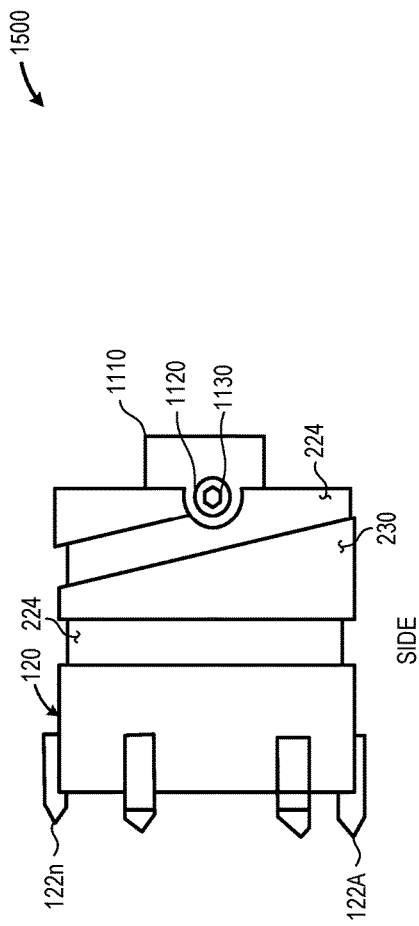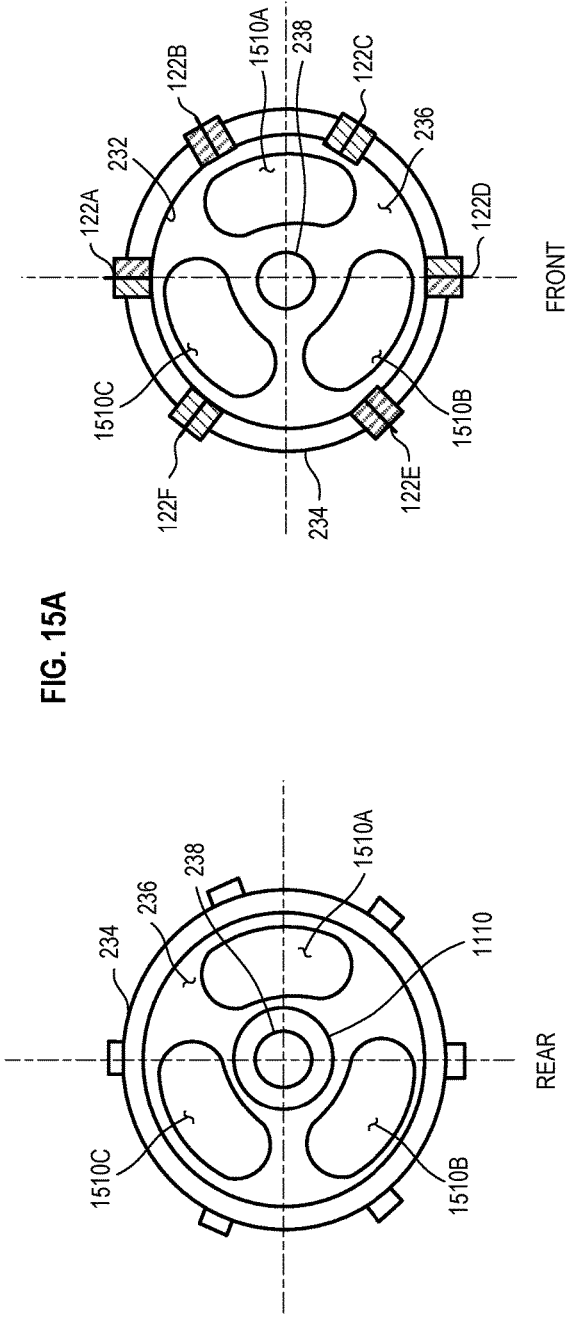
FIG. 15A
FIG. 15B
FIG. 15C

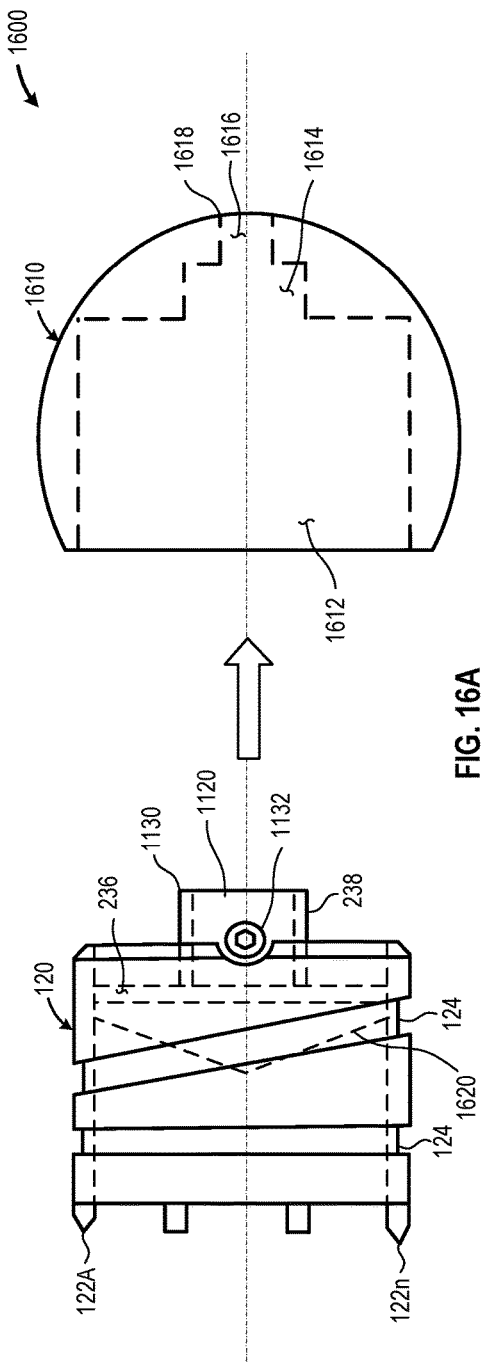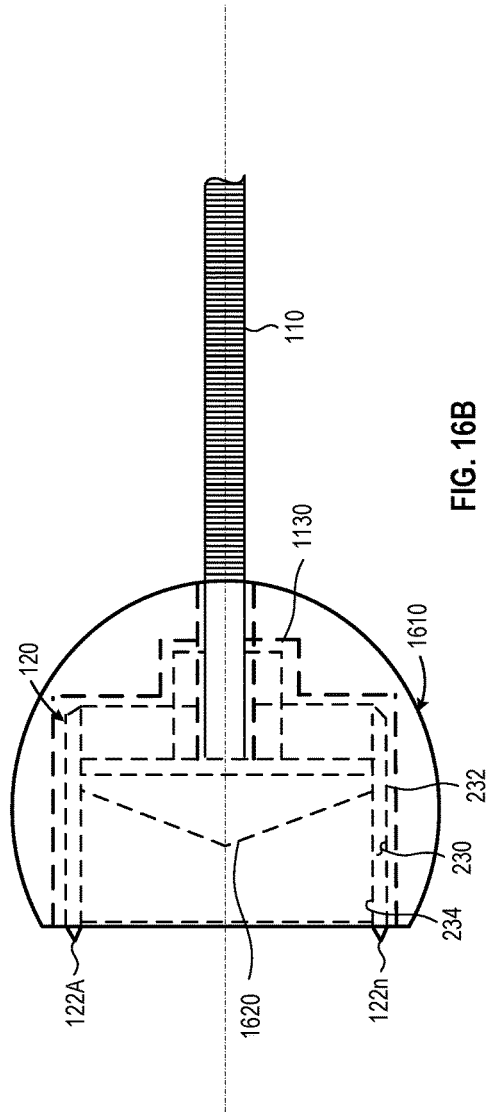
FIG. 16A
FIG. 16B

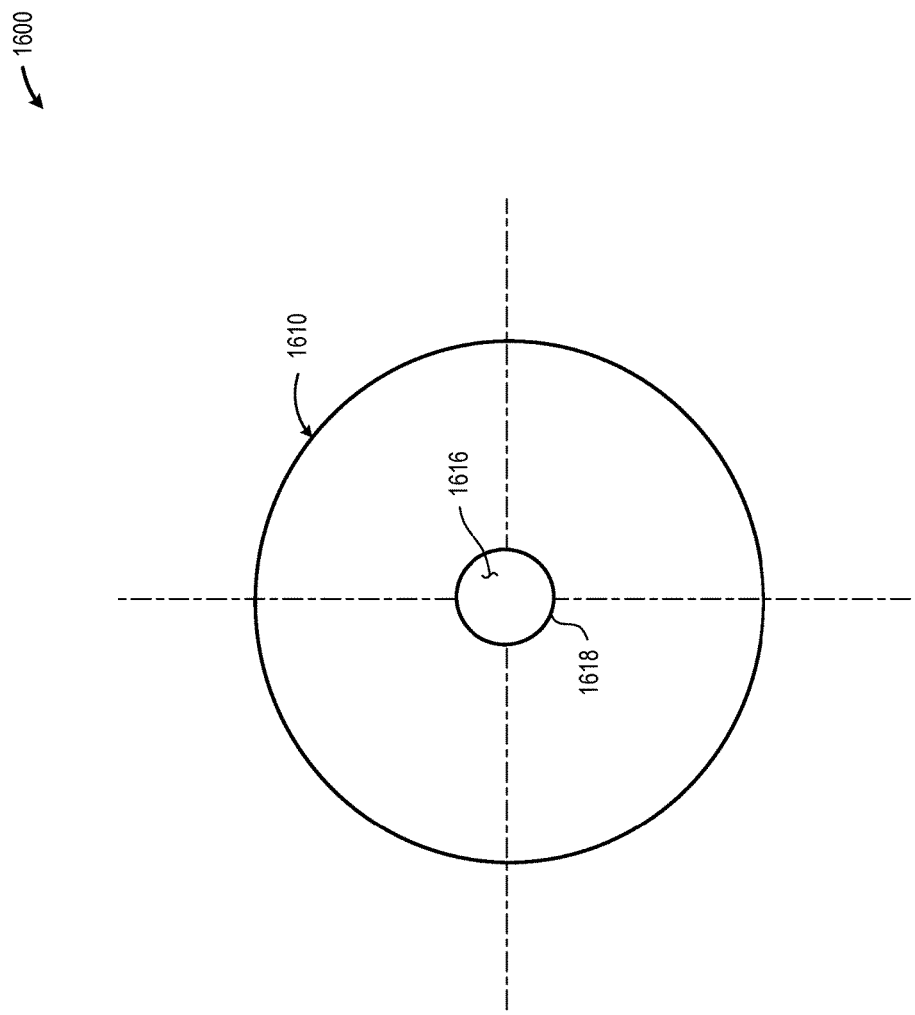

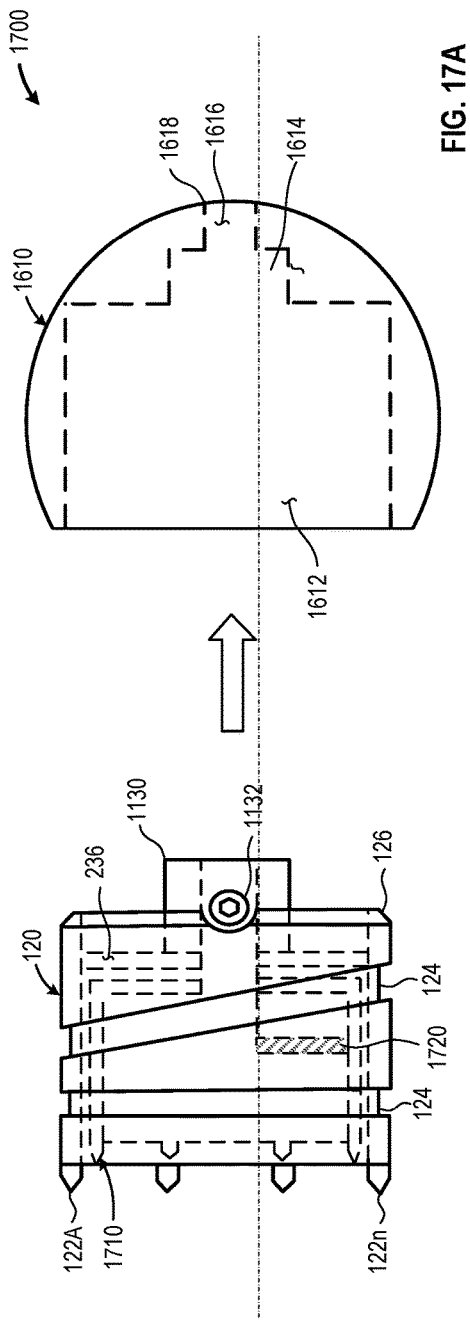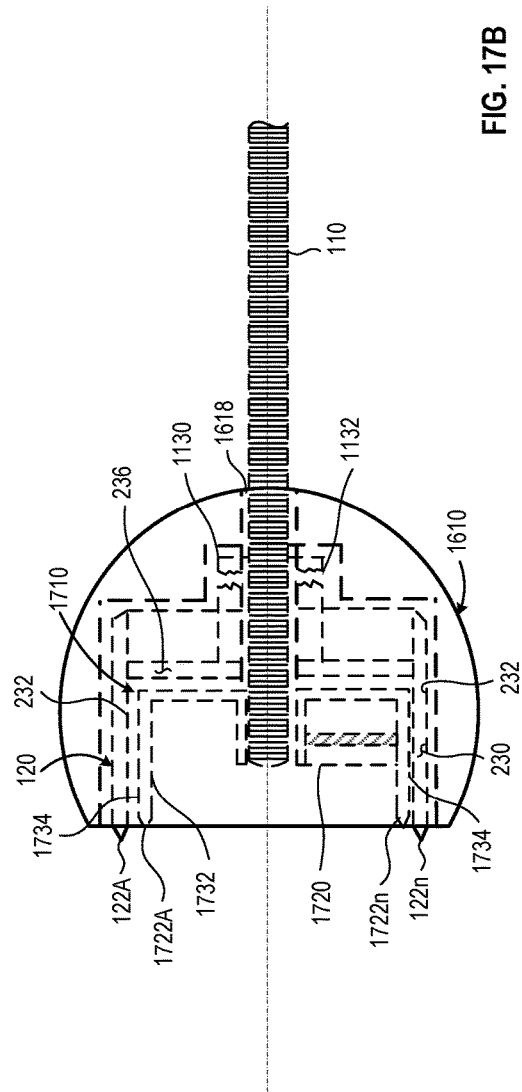

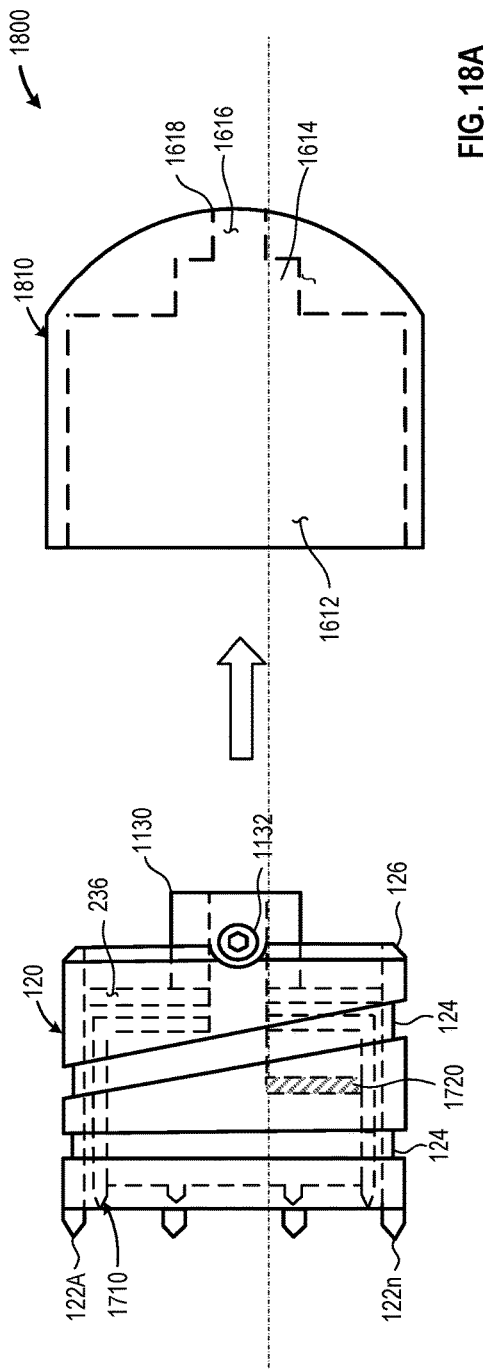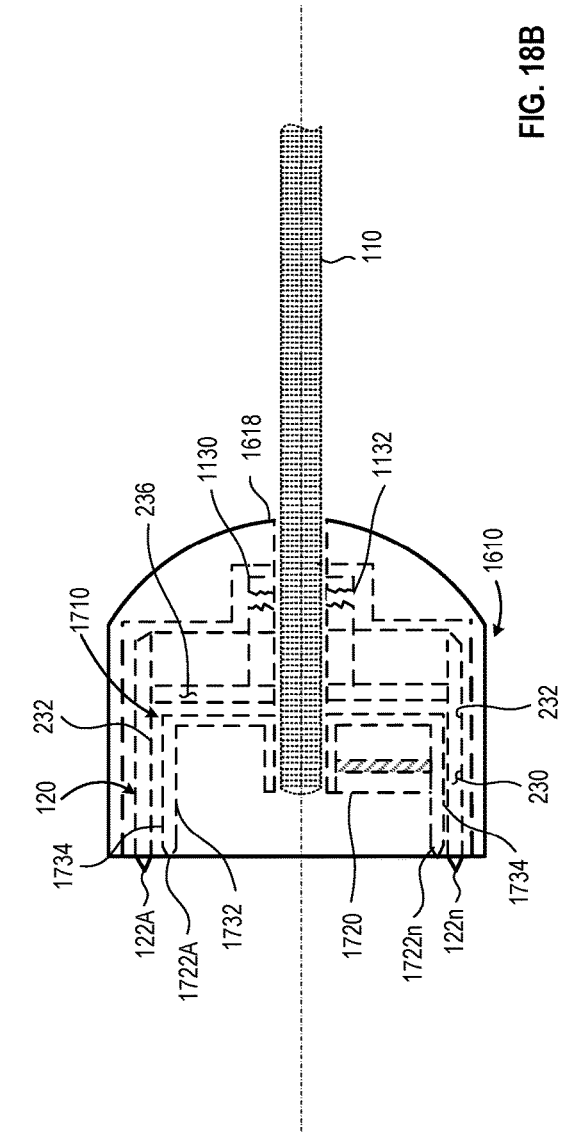

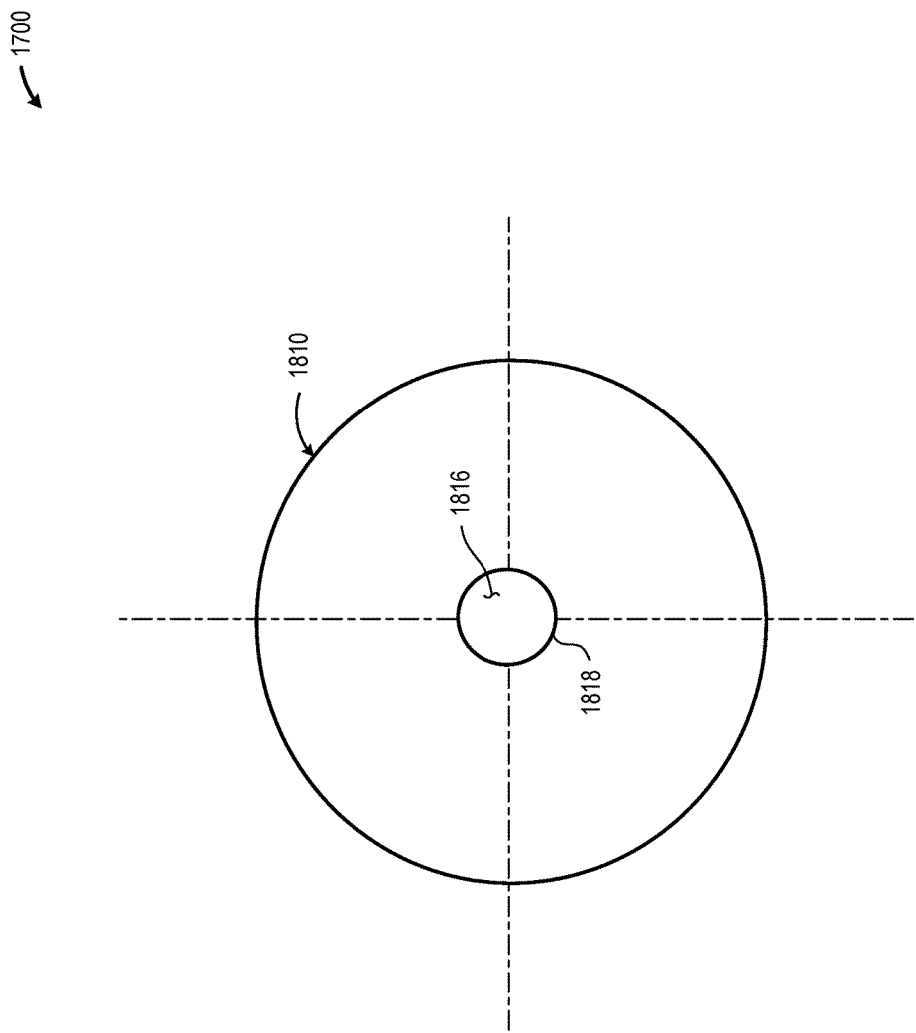

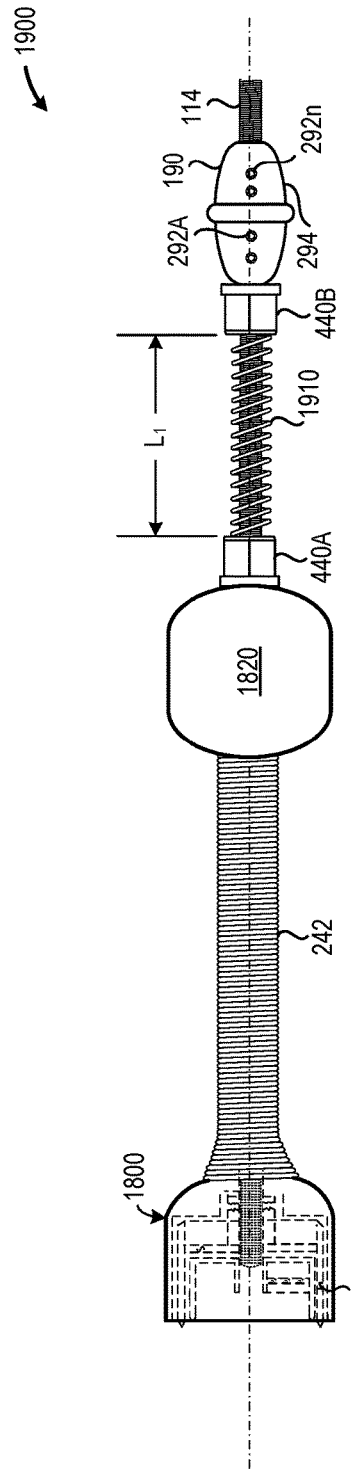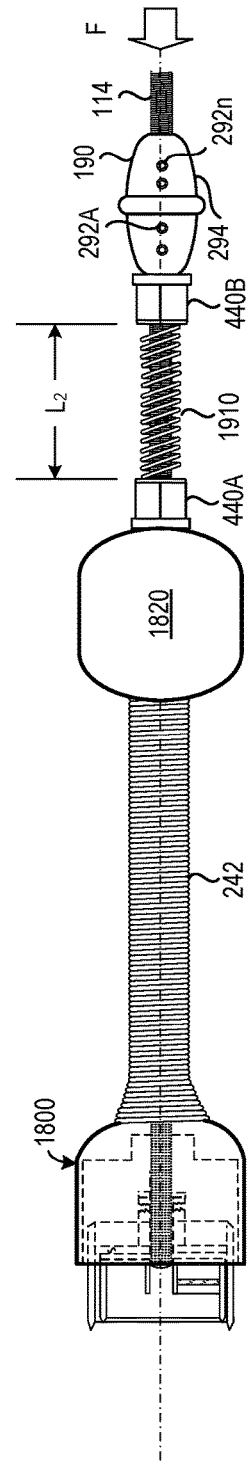
FIG. 19A
FIG. 19B

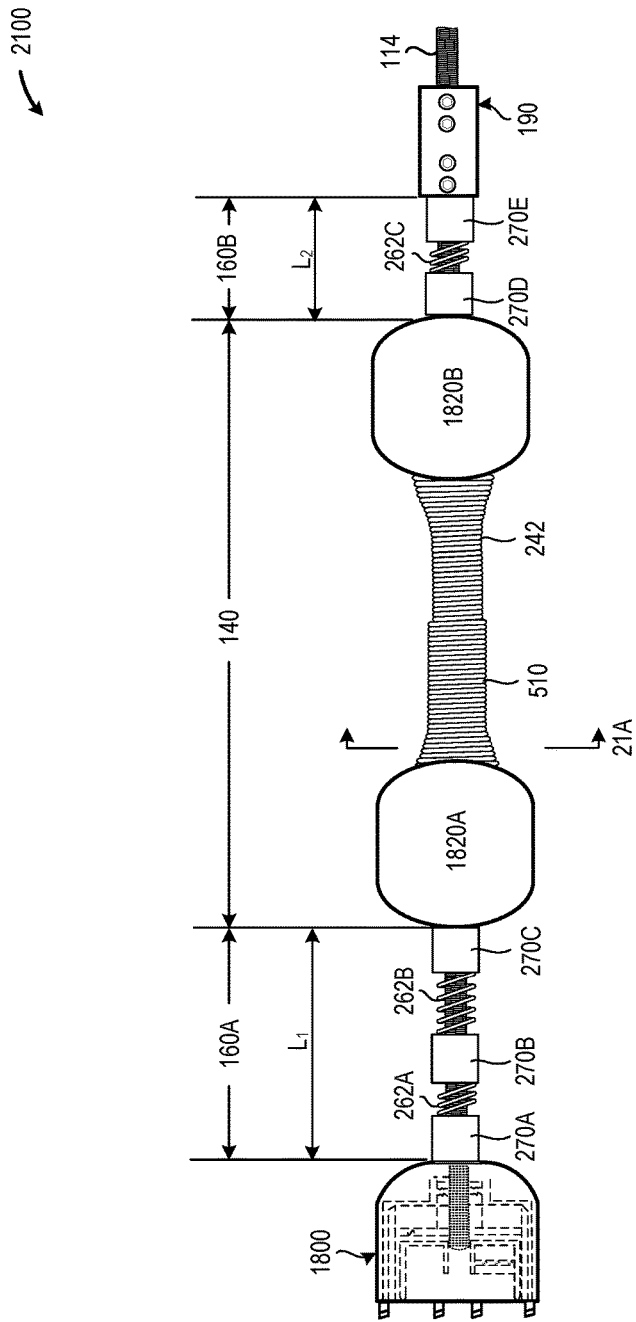
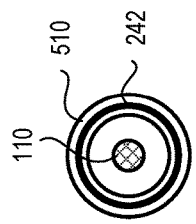
FIG. 21
FIG. 21A

PIPELINE REINSTATEMENT TOOL

TECHNICAL FIELD

The present disclosure relates to tools used to reinstate pipelines.

BACKGROUND

As pipelines age and deteriorate, few options exist other than replacement, which can be disruptive, financially costly, and time consuming, or restoration by installing a liner material that can be cured in place and doesn't require pipeline replacement. Typically, such in pipeline restorations or reinstatements the pipeline is first cleaned and a flexible liner is installed and cured in place. For example, a flexible fabric or fiberglass tube may be impregnated with a chemically or electromagnetically curable resin. The flexible tube is routed through the deteriorated pipeline and expanded to provide a full-bore or near full-bore passage. The resin is then cured, providing a seamless, rigid, lining system that extends the length of the pipeline. After installing and curing of the liner, holes are made in the liner at each lateral connection to permit flow from the lateral connection into the reinstated pipeline.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 2B is a cross-sectional elevation of the illustrative pipeline reinstatement tool depicted in FIG. 2A along sectional line 2B, in accordance with at least one embodiment described herein;

FIG. 2C is a cross-sectional elevation of the illustrative pipeline reinstatement tool depicted in FIG. 2A along sectional line 2C, in accordance with at least one embodiment described herein;

FIG. 2D is a cross-sectional elevation of the illustrative pipeline reinstatement tool depicted in FIG. 2A along sectional line 2D, in accordance with at least one embodiment described herein;

FIG. 2E is a cross-sectional elevation of the illustrative pipeline reinstatement tool depicted in FIG. 2A along sectional line 2E, in accordance with at least one embodiment described herein;

FIG. 2F is a cross-sectional elevation of the illustrative pipeline reinstatement tool depicted in FIG. 2A along sectional line 2F, in accordance with at least one embodiment described herein;

FIG. 2G is a cross-sectional elevation of the illustrative pipeline reinstatement tool depicted in FIG. 2A along sectional line 2G, in accordance with at least one embodiment described herein;

FIG. 2H is a cross-sectional elevation of the illustrative pipeline reinstatement tool depicted in FIG. 2A along sectional line 2H, in accordance with at least one embodiment described herein;

FIG. 2I is a cross-sectional elevation of the illustrative pipeline reinstatement tool depicted in FIG. 2A along sectional line 2I, in accordance with at least one embodiment described herein;

FIG. 2J is a cross-sectional elevation of the illustrative pipeline reinstatement tool depicted in FIG. 2A along sectional line 2J, in accordance with at least one embodiment described herein;

FIG. 15A is a side elevation of another illustrative cutting head, in accordance with at least one embodiment described herein;

FIG. 15B is a rear elevation of the illustrative cutting head depicted in FIG. 15A, in accordance with at least one embodiment described herein;

FIG. 15C is a front elevation of the illustrative cutting head depicted in FIG. 15A and FIG. 15B, in accordance with at least one embodiment described herein;

FIG. 16A is a side elevation view of an illustrative two-piece cutting head system that includes a cutting head that is separated from and slideably insertable into a floating spacer member that is slideably displaceable along the longitudinal axis of the flexible shaft to expose at least a portion of the cutting head, in accordance with at least one embodiment described herein;

FIG. 16B is a side elevation view of the illustrative two-piece cutting head as depicted in FIG. 16A in an assembled state, with the cutting head inserted into the floating spacer member, in accordance with at least one embodiment described herein;

FIG. 16E is a rear-elevation view of the illustrative assembled two-piece cutting head as depicted in FIG. 16B, in accordance with at least one embodiment described herein;

FIG. 17A is a side elevation view of an illustrative dual-blade cutting head system that includes a second cutting head disposed coaxially with and at least partially within the first cutting head, such that the dual-blade cutting head formed by the first cutting head and the second cutting head are slideably insertable into a floating spacer member that is slideably displaceable along the longitudinal axis of the flexible shaft to expose at least a portion of the first cutting head and the second cutting head, in accordance with at least one embodiment described herein;

FIG. 17B is a side elevation view of the illustrative dual-blade cutting head as depicted in FIG. 17A in an assembled state, with the first cutting head affixed to the second cutting head and inserted into the floating spacer member, in accordance with at least one embodiment described herein;

FIG. 18A is a side elevation view of an illustrative dual-blade cutting head system that includes a second cutting head disposed coaxially with and at least partially within the first cutting head, such that the dual-blade cutting head formed by the first cutting head and the second cutting head are slideably insertable into a floating spacer member that is slideably displaceable along the longitudinal axis of the flexible shaft to expose at least a portion of the first cutting head and the second cutting head, in accordance with at least one embodiment described herein;

FIG. 18B is a side elevation view of the illustrative dual-blade cutting head as depicted in FIG. 18A in an assembled state, with the first cutting head affixed to the second cutting head and inserted into the floating spacer member, in accordance with at least one embodiment described herein;

FIG. 18E is a rear-elevation view of the illustrative assembled dual-blade cutting head 1700 as depicted in FIG. 18B, in accordance with at least one embodiment described herein;

FIG. 19A is a side elevation view of the illustrative pipeline reinstatement tool in which the compressible tensioner and the second flexible sleeve have been combined to provide compressible tensioner sleeve, in accordance with at least one embodiment described herein;

FIG. 19B is a side elevation view of the illustrative pipeline reinstatement tool depicted in FIG. 19A with an axially applied force ("F") causing the displacement of the cylindrical floating spacer element along the flexible shaft, exposing the first cutter head and the second cutter head, in accordance with at least one embodiment described herein;

FIG. 20A is a sectional view of the illustrative pipeline reinstatement tool depicted in FIG. 20 along sectional line 20A-20A, in accordance with at least one embodiment described herein;

FIG. 20B is a sectional view of the illustrative pipeline reinstatement tool depicted in FIG. 20 along sectional line 20B-20B, in accordance with at least one embodiment described herein;

FIG. 20C is a sectional view of the illustrative pipeline reinstatement tool depicted in FIG. 20 along sectional line 20C-20C, in accordance with at least one embodiment described herein;

FIG. 20D is a sectional view of the illustrative pipeline reinstatement tool depicted in FIG. 20 along sectional like 20D-20D, in accordance with at least one embodiment described herein;

FIG. 21 is a side elevation view of an illustrative pipeline reinstatement tool that includes: a flexible sleeve portion having a flexible member, an external flexible member disposed about at least a portion of an external surface of the flexible member, and two cylindrical floating spacer elements disposed along the flexible shaft and positioned between a first compressible tensioner and a second compressible tensioner, in accordance with at least one embodiment described herein; and FIG. 21A is a sectional view of the illustrative pipeline reinstatement tool 2100 depicted in FIG. 21 along sectional line 21A-21A, in accordance with at least one embodiment described herein.

Figure 1:
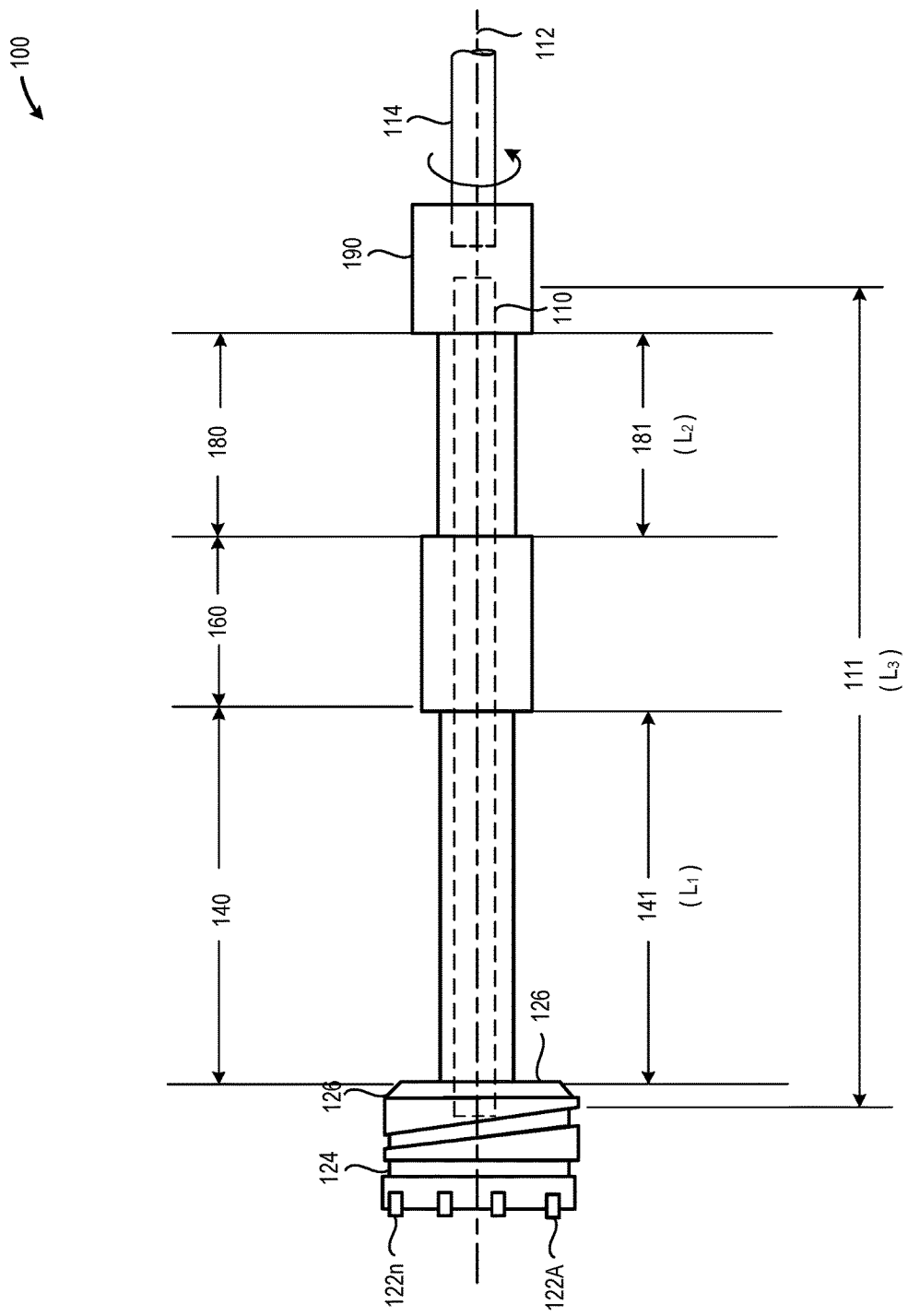
FIG. 1 is a block diagram depicting an illustrative pipeline reinstatement tool that includes a flexible shaft, a cutting head affixed to a first end of the flexible shaft, a first flexible sleeve having a first axial length ($L_1$), a compressible tensioner, a second flexible sleeve having a second axial length ($L_2$), and a coupling assembly that couples a second end of the flexible shaft to a rotatable external drive shaft, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The apparatuses, systems, and methods described herein provide a pipeline reinstatement tool capable of passing through lateral pipelines and penetrating a cured liner disposed within a pipeline. More specifically, the apparatuses, systems, and methods detailed herein provide a penetration tool capable of reducing to seconds the time required to penetrate a liner within a reinstated pipeline while minimizing or even eliminating damage to the lateral pipeline as the penetration tool is positioned against the liner in the reinstated pipeline. The apparatuses disclosed herein include a penetration tool having a cutting head that, when passed through a lateral pipeline and positioned in contact with the cured liner in a reinstated pipeline, quickly and efficiently penetrates the cured liner.

The apparatuses, systems, and methods described herein provide a penetration tool that includes a cutting head, a first flexible sleeve, a second flexible sleeve, and a compressible tensioner disposed on a flexible shaft. The cutting head is disposed on a first end of the flexible shaft, the first flexible sleeve is disposed proximate the cutting head, and the compressible tensioner is positioned along the flexible shaft, between the first flexible sleeve and the second flexible sleeve. The flexible shaft extends through the second flexible sleeve, the compressible tensioner, and the first flexible sleeve. The flexible shaft also extends through a mounting feature coupled to the cutting head and a plurality of fasteners disposed in the mounting feature are used to detachably attach the cutting head to a fixed position proximate the first end of the flexible shaft. The first flexible sleeve proximate the cutting head extends a greater distance along the flexible shaft than the second flexible sleeve proximate a coupler attached proximate the second end of the flexible shaft.

One or more spacers may be positioned along the flexible shaft. The one or more spacers assist in keeping the cutting head centered in the lateral, beneficially centering the hole formed by the cutter bit in the cured liner within the reinstated pipe. By centering the cutting head within the lateral pipe, the risk of the cutting head damaging the lateral pipe is reduced or even eliminated. The one or more spacers may be positioned along the flexible shaft, along the first flexible sleeve, and/or along the second flexible sleeve. The one or more spacers may include one or more 2-dimensional (e.g., disk-shaped member(s), snowflake-shaped member(s), or similar) or 3-dimensional (e.g., spherical members, hemispherical members, or similar) or combinations thereof.

The cutting head includes a hollow cylindrical member having a plurality of teeth extending longitudinally outward from a first end of the hollow cylindrical member. The number, spacing, and composition of the teeth may be adjusted based upon the composition of the lateral pipe, the composition of the reinstated pipeline, and/or the composition of the liner inside the reinstated pipeline. A slideably displaceable sheath may be disposed proximate the external surface of the hollow cylindrical member. The slideably displaceable sheath may have a thickness greater than the lateral distance the teeth extend from the external surface of the cutting head such that the slideably displaceable sheath advantageously reduces or even prevents the teeth from contacting the sidewall of the lateral pipe as the cutting head is rotated and penetrates the liner within the reinstated pipeline. One or more elastomeric rings may be disposed about the external surface of the cutting head. Similar to the slideably displaceable sheath, the one or more elastomeric rings may have a thickness that exceeds the radial projection of the teeth from the external surface of the cutting head. Thus, like the slideably displaceable sheath, the one or more elastomeric rings advantageously reduce or even prevent the teeth from contacting the sidewall of the lateral pipe as the cutting head is rotated and penetrates the liner within the reinstated pipeline.

The first flexible sleeve may include a tightly coiled helical member, for example a tightly coiled metal spring. A self-adjusting alignment bushing may be disposed on either or both ends of the first flexible sleeve. The self-adjusting alignment bushing may threadedly engage the external surface of the first flexible sleeve. The self-adjusting alignment bushing beneficially adjusts the rigidity of the penetration tool—as the first flexible sleeve is advanced into the self-adjusting alignment bushing, the rigidity or stiffness of the penetration tool is increased. As the first flexible sleeve is withdrawn from the self-adjusting alignment bushing, the rigidity or stiffness of the penetration tool is decreased. Thus, to insert the penetration tool the first flexible sleeve may be withdrawn from the self-adjusting alignment bushing to permit the penetration tool to pass through fittings in the lateral pipe. Upon contacting the liner in the reinstated pipeline and rotating the cutting head, the first flexible sleeve may advance into the self-adjusting alignment bushing, beneficially increasing the stiffness of the penetration tool and advantageously increasing the ability of the system operator to apply pressure to the cutting head, thereby speeding the penetration of the liner in the reinstated pipeline. The compressible tensioner permits an operator to maintain a constant pressure along the flexible shaft to the cutting head as the bit "bites" into the liner within the reinstated pipeline and as the cutting head penetrates the liner.

A pipeline reinstatement tool is provided. The tool may include: a flexible shaft having a first length, a first end, and a second end; a cutting head coupled to the first end of the flexible shaft, the cutting head including: a hollow cylindrical member having a first end, a second end, an internal surface and an external surface; and cutting teeth disposed on a first end of the hollow cylindrical member and extending longitudinally from the first end of the hollow cylindrical member; a first flexible sleeve disposed around the flexible shaft proximate the cutting head, the first flexible sleeve having a first sleeve length that extends a first distance along the flexible shaft; a second flexible sleeve disposed around the flexible shaft, the second flexible sleeve having a second sleeve length that extends a second distance along the flexible shaft; wherein the second sleeve length is less than the first length of the first sleeve length; and a compressible tensioner disposed about the flexible shaft between the first flexible element and the second flexible element.

A pipeline reinstatement tool is provided. The tool may include: a flexible shaft having a first length, a first end, and a second end; a cutting head coupled to the first end of the flexible shaft, the cutting head including: a hollow cylindrical member having a first end, a second end, an internal surface and an external surface; and cutting teeth disposed on a first end of the hollow cylindrical member and extending longitudinally from the first end of the hollow cylindrical member; a first flexible sleeve disposed around the flexible shaft proximate the cutting head, the first flexible sleeve having a first sleeve length that extends a first distance along the flexible shaft, the first flexible sleeve including: a first flexible member having an external surface, a first end, a second end, and an inside diameter through which the flexible shaft freely passes; a first self-adjusting alignment bushing coupled to the first end of the first flexible member; a second self-adjusting alignment bushing coupled to the second end of the first flexible shaft; and at least one floating spacer element disposed proximate the first flexible member;

a second flexible sleeve disposed around the flexible shaft, the second flexible sleeve having a second sleeve length that extends a second distance along the flexible shaft, wherein the second sleeve length is less than the first sleeve length, the second flexible sleeve including: a second flexible member having a first end, a second end, and an inside diameter through which the flexible shaft freely passes; and a first self-adjusting alignment bushing coupled to the first end of the second flexible shaft; and a compressible tensioner disposed about the flexible shaft between the first flexible element and the second flexible element, the compressible tensioner including: a compressible element having a first end and a second end; a first annular connector coupled to the first end of the compressible element; and a second annular connector coupled to the second end of the compressible element.

As used herein the term "axial" refers to the longitudinal axis of the flexible shaft of the pipeline reinstatement tool. As used herein, the term "radial" refers to a radius, radial member, or radial distance measured with respect to the longitudinal axis of the flexible shaft of the pipeline reinstatement tool.

FIG. 1 is a block diagram depicting an illustrative pipeline reinstatement tool 100 that includes a flexible shaft 110, a cutting head 120 affixed to a first end of the flexible shaft 110, a first flexible sleeve 140 having a first axial length ($L_1$) 141, a compressible tensioner 160, a second flexible sleeve 180 having a second axial length ($L_2$) 181, and a coupling assembly 190 that couples a second end of the flexible shaft 110 to a rotatable external drive shaft 114, in accordance with at least one embodiment described herein. In operation, the pipeline reinstatement tool 100 is inserted through a lateral pipeline that is connected to a lined reinstated pipeline. When the pipeline reinstatement tool 100 contacts the liner in the reinstated pipeline, the cutting head 120 rotates at high speed to cut through the liner and fluidly couple the lateral pipeline with the lined, reinstated pipeline. The first flexible sleeve 140 and the second flexible sleeve 180 permit the pipeline reinstatement tool 100 to pass through fittings in the lateral pipeline. The compressible tensioner 160 permits the application of an axial force on the cutting head 120 to cause the cutting head to initially bite into the liner inside the reinstated pipeline and eventually to cut through the liner to form a fluid connection between the lateral pipeline and the lined reinstated pipeline. The pipeline reinstatement tool 100 as described herein beneficially and advantageously performs such penetrations in a fraction of the time required using current reinstatement tools.

The flexible shaft 110 permits the pipeline reinstatement tool 100 to pass through and around fittings in the lateral pipeline. The first end of the flexible shaft 110 couples to the cutting head 120 and the opposite, second, end of the flexible shaft 110 couples to a coupling assembly 190. The cutting head 120 may be affixed to or detachably attached to the flexible shaft 110, for example using a plurality of threaded fasteners. The coupling assembly 190 may be affixed or detachably attached to the flexible shaft 110, for example using a plurality of threaded fasteners. In embodiments, the flexible shaft 110 may include a plurality off operably coupled individual segments.

The flexible shaft 110 can have any axial length measured along the longitudinal axis 112 of the flexible shaft 110. In embodiments, the flexible shaft 110 may have a length of less than: about 4 inches (in); about 6 in; about 8 in; about 12 in; about 18 in; about 24 in; or about 36 in. The flexible shaft 110 can have any diameter measured transverse to the longitudinal axis 112 of the flexible shaft 110. In embodiments, the flexible shaft 110 may have a diameter of less than: about 1/16 inch; about 1/8 in; about 1/4 in; about 3/8 in; about 1/2 in; about 5/8 in; or about 3/4 in. The flexible shaft 110 may be fabricated using any metallic, non-metallic, or composite material. In some embodiments, the flexible shaft 110 may include a metallic, tightly wound coiled member.

The first axial length 141 of the first flexible sleeve 140 is greater than the second axial length 181 of the second flexible sleeve 180. In embodiments, the ratio of the second axial length 181 to the first axial length 141 is less than: about 0.1; about 0.2; about 0.3; about 0.4; about 0.5; about 0.7; about 0.8; or about 0.9. In embodiments, the first axial length 141 may be less than: about 10%; about 20%; about 33%; about 40%; about 50%; about 60%; or about 70% of the length 111 of the flexible shaft 110. In embodiments, the second axial length 181 may be less than: about 5%; about 10%; about 20%; about 30%; or about 40% of the length 111 of the flexible shaft 110.

The cutting head 120 includes a plurality of teeth 122A-122n (collectively, "teeth 122") that extend longitudinally from a first end of the cutting head 120 and are generally parallel to the longitudinal axis 112 of the flexible shaft 110. One or more recesses or grooves 124 may be formed in the external surface of the cutting head 120. In embodiments, the one or more grooves 124 may include one or more helical or spiral grooves formed in the external surface of the cutting head 120. In embodiments, the second end of the cutting head 120 may be radiused or chamfered 126 to ease withdrawal of the pipeline reinstatement tool 100 from the reinstated pipeline after the pipeline reinstatement tool 100 penetrates the liner within the reinstated pipeline. The cutting head 120 can have any outside diameter. For example, the cutting head 120 may have an outside diameter of: less than 1 inch (in); less than 1½ in; less than 2 in; less than 2½ in; less than 3 in; less than 4 in; or less than 6 in.

Figure 2A:
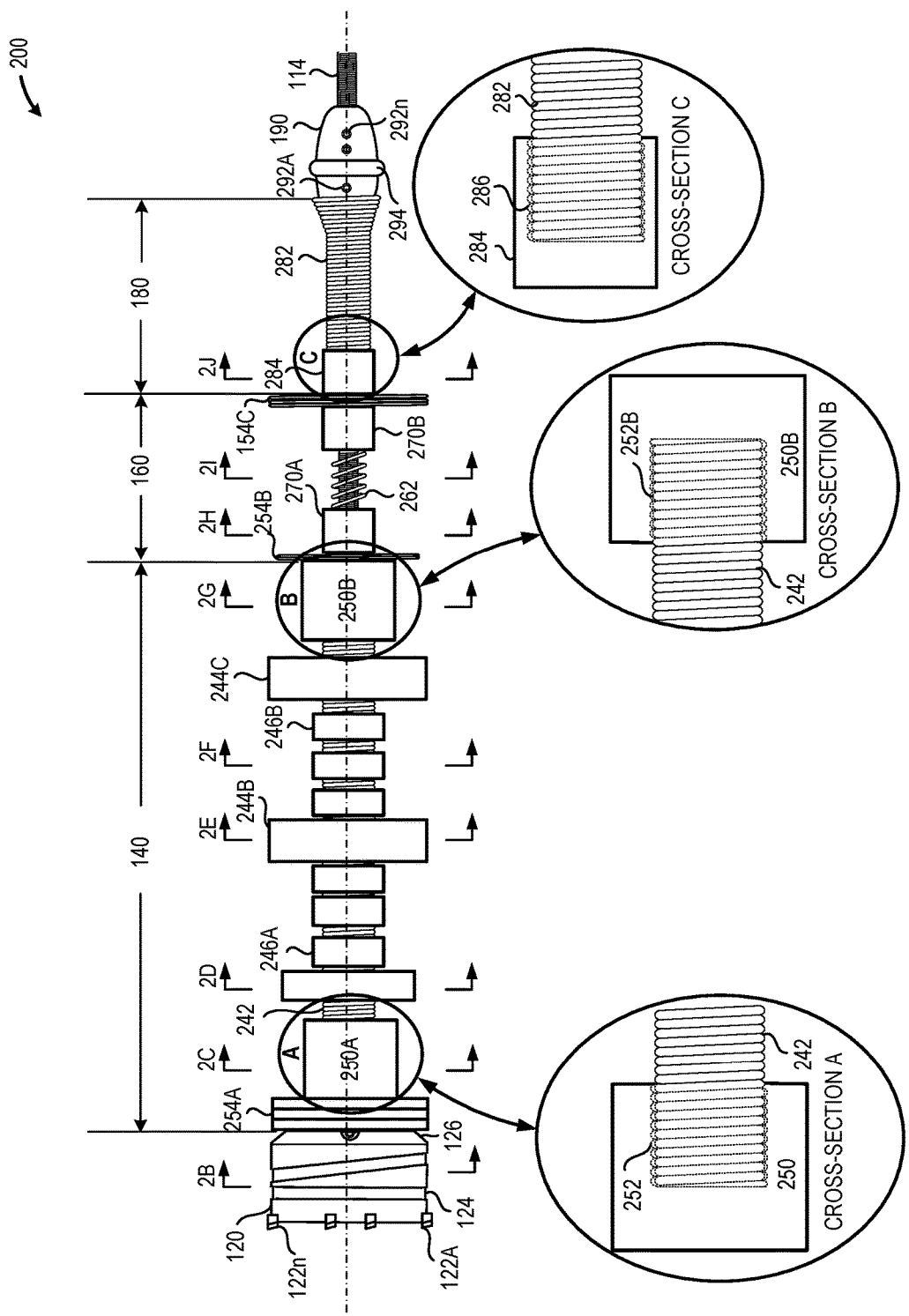
FIG. 2A is an plan view of an illustrative pipeline reinstatement tool that includes a flexible shaft having a first end and a second end, a cutting head affixed to the first end of the flexible shaft, a first flexible sleeve, a second flexible sleeve, a compressible tensioner disposed between the first flexible sleeve and the second flexible sleeve, and a coupling assembly disposed proximate the second end of the flexible shaft, in accordance with at least one embodiment described herein.

FIG. 2A is an plan view of an illustrative pipeline reinstatement tool 200 that includes a flexible shaft 110 having a first end and a second end, a cutting head 120 affixed to the first end of the flexible shaft 110, a first flexible sleeve 140, a second flexible sleeve 180, a compressible tensioner 160 disposed between the first flexible sleeve 140 and the second flexible sleeve 180, and a coupling assembly 190 disposed proximate the second end of the flexible shaft 110, in accordance with at least one embodiment described herein. FIGS. 2B, 2C, 2D, 2E, 2F, 2G, 2H, 2I, and 2J provide cross-sectional elevations of the pipeline reinstatement tool 200 at the respective points indicated in FIG. 2A. In operation, the pipeline reinstatement tool 200 is passed through a lateral pipeline until the cutting head 120 contacts a cured liner previously installed in a reinstated pipeline. The flexible shaft 110 is rotated, causing the cutting head 120 to rotate at a similar speed. The first flexible sleeve 140 and the second flexible sleeve 180 provide the ability to maneuver the pipeline reinstatement tool 100 through fittings and/or valves disposed in the lateral pipeline.

As depicted in FIG. 2A, the first flexible sleeve 140 includes a flexible member 242 through which the flexible shaft 110 passes. A plurality of fixed spacer elements 244A-244n (collectively, "fixed spacer elements 244") are affixed to the external surface of the flexible member 242. A plurality of floating spacer elements 246A-246n (collectively, "floating spacer elements 246") are disposed proximate the external surface of the flexible member 242 and are able to rotate about the flexible member 242 and slide along at least a portion of the length of the flexible member 242. A plurality of self-adjusting alignment bushings 250A, 250B (collectively, "self-adjusting alignment bushings 250")

couple to the first end and the second end of the first flexible member 242, respectively. In at least some embodiments, the self-adjusting alignment bushings 250 are displaceable with respect to the first flexible sleeve 140. In some implementations, the self-adjusting alignment bushings may threadedly engage the external surface of the first flexible member 242.

The second flexible sleeve 180 includes a second flexible member 282 through which the flexible shaft 110 passes. The second flexible member 282 includes a first end and second end. In embodiments the second end of the second flexible sleeve 180 proximate the coupling assembly 190 may be flared outward and may be disposed proximate an attachment fixture 190 that is affixed to the flexible shaft 110. A self-adjusting alignment bushing 284 couples to the first end second flexible sleeve 282. In at least some embodiments, the self-adjusting alignment bushing 284 is displaceable with respect to the second flexible member 282. In some implementations, the self-adjusting alignment bushing 284 may threadedly engage the external surface of the second flexible member 282. In embodiments, the axial length of the second flexible sleeve 180 (i.e., the length the second flexible sleeve 180 extends along the flexible shaft 110) is less than the axial length of the first flexible sleeve 140 (i.e., the length the first flexible sleeve 140 extends along the flexible shaft 110). In other embodiments, the axial length of the second flexible sleeve 180 may be greater than the axial length of the first flexible sleeve 140.

A plurality of positioning elements 254A-254n (collectively, "positioning elements 254") that extend radially outward from the flexible shaft 110 are disposed at various locations along the axial length of the flexible shaft 110. The positioning elements 254 assist in maintaining the pipeline reinstatement tool 200 centered in the lateral pipe as the pipeline reinstatement tool 200 passes through the lateral pipe. In addition, the positioning elements 254 also assist in preventing the cutting head 120 from contacting the sidewall of the lateral pipe as the pipeline reinstatement tool 200 rotates to cut through the liner disposed in the reinstated pipeline. The each of the positioning elements 254 may include one or more individual planar positioning elements 254 that are stacked along the longitudinal axis 112 of the flexible shaft 110.

The flexible shaft 110 may include any member capable of transmitting rotational motion provided by an external device (e.g., a rotating tool such as a mini-Miller or maxi-Miller) to the cutting head 120 via the coupling assembly 190. The flexible shaft 110 may be fabricated using any metallic, non-metallic, or composite material capable of transmitting the torque applied by the external device via the external shaft 114 and coupling assembly 190. For example, the flexible shaft 110 may be fabricated, in whole or in part, using a high tensile strength tightly coiled metal shaft. In another embodiment, the flexible shaft 110 may be fabricated, in whole or in part, using a carbon fiber shaft. In yet another example, the flexible shaft 110 may be fabricated, in whole or in part, using a composite shaft having a carbon fiber/metal construction.

Referring to FIGS. 2A and 2B, the cutting head 120 includes a hollow cylindrical member 230 having an inner surface 232 and an outer surface 234. The hollow cylindrical member 230 coaxially aligns with the longitudinal axis 112 of the flexible shaft 110. A plurality of teeth 122A-122n (collectively, "teeth 122") parallel to the longitudinal axis 112 of the flexible shaft 110 extend from the first end of the cutting head 120. In embodiments, the teeth 122 may extend radially outward from the external surface 234 of the hollow cylindrical member 230.

The cutting head 120 includes an attachment member 236 that is disposed transverse to the longitudinal axis 112 of the flexible shaft 110. The attachment member 236 is affixed to the hollow cylindrical member 230. In embodiments, the attachment member 236 may be affixed to the internal surface 232 of the hollow cylindrical member 230. The attachment member 236 may be affixed proximate the second end of the hollow cylindrical member 230 or may be affixed at an intermediate location between the first end and the second end of the hollow cylindrical member 230. In embodiments, the first end of the flexible shaft 110 may pass through an aperture 238 formed in the attachment member 236. In embodiments, the first end of the flexible shaft 110 may extend through the attachment member 236 and may project into the interior of the hollow cylindrical member 230.

In embodiments, the cutting head 120 detachably attaches to the first end of the flexible shaft 110, for example using one or more threaded fasteners or similar attachment devices. In other embodiments, the cutting head 120 is affixed to the first end of the flexible shaft 110, for example by compression fitting, stamping, or welding. In embodiments, the attachment member 236 may include an aperture 238 through which the first end of the flexible shaft 110 passes, allowing the cutting head 120 to be axially positioned proximate the first end of the flexible shaft 110. In embodiments, the aperture 238 may be disposed at a central location within the attachment member 236.

A number of grooves 124 may be formed circumferentially about all or a portion of the external surface of the hollow cylindrical member 230. In embodiments, one or more helical grooves 124 may be formed about all or a portion of the external surface of the hollow cylindrical member 230. Such groves 124 may beneficially permit the escape of detritus and waste material from the location where the cutting head 120 contacts the liner inside the reinstated pipeline. The second end of the hollow cylindrical member 230 may be chamfered or rounded 126 to permit retraction or withdrawal of the cutting head 120 from the reinstated pipeline penetrating the liner.

The cutting head 120 may be formed using any suitably rigid, resilient material. For example, the cutting head 120 may be fabricated in whole or in part using tungsten carbide or similar materials. In other embodiments, the hollow cylindrical member 230 may be formed using a first material and the teeth 122 formed using a second material. The cutting head 120 may have any diameter and height or axial length. In embodiments, the cutting head 120 may have a diameter of about: 1 inch or less; 2 inches or less; 3 inches or less; 4 inches or less; or about 6 inches or less. In embodiments, the cutting head 120 may have a height or axial length of about: 1 inch or less; 2 inches or less; 3 inches or less; 4 inches or less; or about 6 inches or less. The cutting head 120 may have any number of teeth 122 disposed on the first end of the hollow cylindrical member. For example, the cutting head 120 may have 4 or more teeth; 8 or more teeth; 12 or more teeth; 16 or more teeth; or 20 or more teeth. In embodiments, the teeth 122 may have a triangular cutting surface. In embodiments, each of the plurality of teeth 122 may have similar or identical cutting surface profiles. In other embodiments, at least some of the plurality of teeth 122 may have different cutting surface profiles.

In embodiments, one or more positioning elements 254A may be disposed between the cutting head 120 and the first flexible sleeve 140. The positioning elements 254A beneficially minimize the likelihood of the cutting head 120 contacting the inner surface of the lateral pipe as the cutting head 120 is rotated. The one or more positioning elements 254 may include any number of planar member having an aperture disposed therethrough to accommodate the passage of the flexible shaft 110. In embodiments, the aperture formed in the one or more positioning elements 254A may include a central aperture such that the one or more positioning elements 254A are symmetric about the flexible shaft 110. In embodiments, the one or more positioning elements 254A may be free floating about the flexible shaft 110. The one or more positioning elements 254A may be fabricated using any material that does not mar or damage the lateral pipe through which the pipeline reinstatement tool 200 is passed. For example, the one or more positioning elements 254A may be fabricated using one or more of: carbon fiber; propylene, polypropylene, ethylene propylene diene monomer (EPDM); polyvinyl chloride (PVC); chlorinated PVC (CPVC); polybutylene; or similar.

Each of the one or more positioning elements 254A may have the same or different diameters and/or thicknesses. In embodiments, at least some of the positioning elements 254A may have an outside diameter that is approximately the same as the outside diameter of the hollow cylindrical member 230 forming the cutting head 120. In embodiments, at least some of the positioning elements 254A may have an outside diameter that is slightly larger than the outside diameter of the hollow cylindrical member 230 by about: 1/16 inch; 1/8 inch; 1/4 inch; or 1/2 inch. In embodiments, at least some of the positioning elements 254A may have an outside diameter that is slightly smaller than the outside diameter of the hollow cylindrical member 230 by about by about: 1/16 inch; 1/8 inch; 1/4 inch; or 1/2 inch. Each of the positioning elements 254A may have a thickness of about: 1/32 inch or less; 1/16 inch or less; 1/8 inch or less; 1/4 inch or less; or 1/2 inch or less.

Referring next to FIGS. 2A, 2C, 2D, 2E, 2F, 2G, and cross sections A and B, the first flexible sleeve 140 includes a first flexible member 242, having a self-adjusting alignment bushings 250 coupled to the first and second ends of the first flexible member 242. In embodiments, the first flexible member 242 may include a tightly coiled member such as a tightly coiled spring or similar. As depicted in cross-sections A and B, the self-adjusting alignment bushings 250A, 250B may include internal (i.e., female) threads 252A, 252B (respectively) such that THE tightly coiled first flexible member 242 may threadedly engage the alignment bushings 250.

Beneficially, as the first flexible member 242 advances into the self-adjusting alignment bushings 250, the stiffness of the first flexible sleeve 140 increases. As the first flexible member 242 withdraws from the self-adjusting alignment bushings 250, the stiffness of the first flexible sleeve decreases. Thus, the first flexible member 242 may be at least partially withdrawn from the self-adjusting alignment bushings 250 to increase the flexibility of the first flexible sleeve and ease the insertion of the pipeline reinstatement tool 200 in a lateral pipe. As the cutting head 120 contacts the liner in the reinstated pipeline, the self-adjusting alignment bushings 250 thread onto the first flexible member 242, beneficially increasing the stiffness of the pipeline reinstatement tool 200 and permitting the tool operator to increase the force applied to the pipeline reinstatement tool 200, advantageously reducing the time required to penetrate the liner within the reinstated pipeline.

The first flexible member 242 may have any length and/or diameter. In embodiments, the first flexible member 242 may have a length of about 10%, about 20%, about 30%, about 40%, about 50%, or about 70% of the length of the flexible shaft 110. For example, in one embodiment, the flexible shaft 110 may have a length of 15 inches and the first flexible member 242 may have a length of about 7½ inches (about 50% of the length of the flexible shaft 110). The first flexible member 242 may be fabricated using any suitable metallic, non-metallic, or composite material. For example, the first flexible member 242 may be fabricated, in whole or in part, as a tightly wound metallic coil spring. In another example, the first flexible member 242 may include a carbon fiber spring or a polymeric spring. In another example, the first flexible member 242 may include a continuous tube fabricated using one or more flexible materials and/or fabrics. The first flexible member 242 may have a uniform or non-uniform construction. For example, the first flexible member 242 may have a tightly coiled metal first end and a tightly coiled metal second end connected by a flexible, smooth, metallic or non-metallic intermediate section.

The self-adjusting alignment bushings 250 may be fabricated using any material or combination of materials capable of engaging the external surface of the first flexible member 242. In some embodiments, the self-adjusting alignment bushings 250 are axially displaceable along the external surface of the first flexible member 242. In at least some implementations, the self-adjusting alignment bushings 250 may threadedly engage the external surface of the first flexible member 242.

The diameter of the self-adjusting alignment bushings 250 may be the same or different. The diameter of the self-adjusting alignment bushings 250 is less than the diameter of the hollow cylindrical member 230. In embodiments, the self-adjusting alignment bushings 250 may be fabricated, in whole or in part, using a metallic material demonstrating adequate corrosion resistance in the expected operating environment. Example metallic materials include but are not limited to: brass, bronze, stainless steel, and similar. In other embodiments, the self-adjusting alignment bushings 250 may be fabricated, in whole or in part, using a non-metallic material. Example non-metallic materials include but are not limited to: polypropylene, EPDM, polyoxymethylene (Delrin®), PVC, CPVC, fiber reinforced plastic (FRP), carbon fiber, or combinations thereof. In embodiments, the self-adjusting alignment bushings 250 may include a metallic member that is coated with one or more non-metallic materials.

One or more fixed spacer elements 244A-244n are disposed at equal or unequal intervals along the axial length of the first flexible member 242. In embodiments, the one or more fixed spacer elements 244 may be affixed to the external surface of the first flexible member 242 such that the one or more fixed spacer elements 244 are not axially displaceable along all or a portion of the axial length of the first flexible member 242. In embodiments, the outside diameter of some or all of the fixed spacer elements 244 may be the same as or similar to the outside diameter of the hollow cylindrical member 230. In some embodiments, the one or more fixed spacer elements 244 may be formed integral with the first flexible member 242. In other embodiments, the one or more fixed spacer elements 244 may be separately fabricated and affixed to the external surface of the first flexible member 242, such as via one or more fasteners, one or more adhesives, or via press or compression fitting.

Although depicted as discs, the one or more fixed spacer elements 244 may have any physical shape or geometry. For example, some or all of the one or more fixed spacer elements may be frustoconical, hemispherical, ovoid, spherical, or combinations thereof. The one or more fixed spacer elements 244 may be fabricated using any metallic or non-metallic material that will not damage the interior surface of the lateral pipe as the pipeline reinstatement tool 100 is passed through the lateral pipe. The one or more fixed spacer elements 244 minimize or eliminate the possibility of the first flexible member 242 and the flexible shaft 110 from contacting the interior of the lateral pipeline as the cutting head 120 rotates. Each of the one or more fixed spacer elements 244 may be fabricated from the same or different materials. In embodiments, the one or more fixed spacer elements 244 may be fabricated using one or more non-metallic materials such as: polypropylene, EPDM, polyoxymethylene (Delrin®), PVC, CPVC, fiber reinforced plastic (FRP), carbon fiber, and combinations thereof. In embodiments, the one or more fixed spacer elements 244 may be fabricated using one or more metallic materials such as: brass, nickel, stainless steel, and similar.

Each of the one or more fixed spacer elements 244 includes an annular space through which the first flexible member 242 and the flexible shaft 110 passes. The inside diameter of the annular space through each of the one or more fixed spacer elements 244 is therefore based on the outside or external diameter of the first flexible member 242. Each of the one or more fixed spacer elements 244 may have the same or different outside diameters. The diameter of each of the one or more fixed spacer elements 244 may be based on the outside diameter of the hollow cylindrical member 230 forming the cutting head 120. For example, the diameter of each of the one or more fixed spacer elements 244 may be: about 70% or less; about 80% or less; about 90% or less; about 100% or less; or about 110% or less than the outside diameter of the hollow cylindrical member 230.

One or more floating spacer elements 246A-246n are disposed at equal or unequal intervals along the axial length of the first flexible member 242. In embodiments, the one or more floating spacer elements 246 may be disposed about the first flexible member 242 such that the floating spacer elements 246 are able to rotate about the external surface of the first flexible member 242, slide axially along at least a portion of the external surface of the first flexible member 242, or both rotate and slide about the external surface of the first flexible member 242. In embodiments, the outside diameter of some or all of the floating spacer elements 246 may be smaller than the outside diameter of the hollow cylindrical member 230.

Although depicted as rings, the one or more floating spacer elements 246 may have any physical shape or geometry. For example, some or all of the one or more floating spacer elements 246 may be frustoconical, hemispherical, ovoid, spherical, or combinations thereof. The one or more floating spacer elements 246 may be fabricated using any metallic or non-metallic material that will not mar, erode, or otherwise damage the interior surface of the lateral pipe as the pipeline reinstatement tool 100 is passed through the lateral pipe. The one or more floating spacer elements 246 minimize or eliminate the possibility of the first flexible member 242 and/or the flexible shaft 110 from contacting the interior of the lateral pipeline as the cutting head 120 rotates. Each of the one or more floating spacer elements 246 may be fabricated from the same or different materials. In embodiments, the one or more floating spacer elements 246 may be fabricated using one or more non-metallic materials such as: polypropylene, EPDM, polyoxymethylene (Delrin®), PVC, CPVC, fiber reinforced plastic (FRP), carbon fiber, or similar. In embodiments, the one or more floating spacer elements 246 may be fabricated using one or more metallic materials such as: brass, nickel, stainless steel, and similar.

Each of the one or more floating spacer elements 246 includes an annular space through which the first flexible member 242 and the flexible shaft 110 passes. The inside diameter of the annular space through each of the one or more floating spacer elements 246 is therefore based on the outside or external diameter of the first flexible member 242. The inside diameter of the annular space through each of the one or more floating spacer elements 246 is slightly larger than the external diameter of the first flexible member 242. For example, each of the one or more floating spacer elements 246 may have an inside diameter of about 105% or less, about 110% or less; or about 125% or less of the outside diameter of the first flexible member 242. The diameter of each of the one or more floating spacer elements 246 may be based on the outside diameter of the hollow cylindrical member 230 forming the cutting head 120. For example, the diameter of each of the one or more floating spacer elements 244 may be: about 10% or less; about 20% or less; about 30% or less; about 40% or less; or about 50% or less than the outside diameter of the hollow cylindrical member 230.

In embodiments, one or more positioning elements 254B may be disposed between the first flexible sleeve 140 and the compressible tensioner 160. The positioning elements 254B beneficially minimize the likelihood of the pipeline reinstatement tool 100 contacting the inner surface of the lateral pipe as the cutting head 120 is rotated. The one or more positioning elements 254B may include any number of planar member having an aperture disposed therethrough to accommodate the passage of the flexible shaft 110. In embodiments, the aperture formed in the one or more positioning elements 254B may include a central aperture such that the one or more positioning elements 254B are symmetric about the flexible shaft 110. The aperture formed in the one or more positioning elements 254B may have a diameter sufficient to permit the free passage of the flexible shaft 110.

In embodiments, the one or more positioning elements 254B may be free floating about the flexible shaft 110. The one or more positioning elements 254B may be fabricated using any material that does not mar or damage the lateral pipe through which the pipeline reinstatement tool 100 is passed. For example, the one or more positioning elements 254B may be fabricated using one or more of: carbon fiber; propylene, polypropylene, ethylene propylene diene monomer (EPDM); polyvinyl chloride (PVC); chlorinated PVC (CPVC); polybutylene; fiber reinforced plastic (FRP); carbon fiber: or combinations thereof.

Each of the one or more positioning elements 254B may have the same or different diameters and/or thicknesses. In embodiments, at least some of the positioning elements 254B may have an outside diameter that is approximately the same as the outside diameter of the hollow cylindrical member 230 forming the cutting head 120. In embodiments, at least some of the positioning elements 254B may have an outside diameter that is about 105% or less; about 110% or less; or about 125% or less than the outside diameter of the hollow cylindrical member 230. In embodiments, at least some of the positioning elements 254B may have an outside diameter that is about 95% or less; about 90% or less; about 75% or less; or about 50% or less than the outside diameter of the hollow cylindrical member 230. Each of the positioning elements 254B may have a thickness of about: 1/32 inch or less; 1/16 inch or less; 1/8 inch or less; 1/4 inch or less; or 1/2 inch or less.

Referring next to FIGS. 2A, 2H, and 2I, in embodiments, the compressible tensioner 160 includes a helical coil spring 262 with annular connectors 270A, 270B (collectively, "annular connectors 270") coupled to the first end and the second end of the helical coil spring 262. The flexible shaft 110 passes through the central aperture formed in the compressible tensioner 160. The central aperture formed through the compressible tensioner 160 is slightly larger in inside diameter than the outside diameter of the flexible shaft 110. For example, the central aperture through the coil spring 262 and annular connectors 270 may have an inside diameter that is at least 100% but less than about 105%; 110%; 115%; 120%; 125%; or 250% of the outside diameter of the flexible shaft 110.

The helical coil spring 262 may include a metallic spring element having any number of turns. The helical coil spring 262 may have a spring constant of about: 2 pounds/inch (lb/in) or less; 3 lb/in or less; 5 lb/in or less; 7 lb/in or less; 9 lb/in or less; 11 lb/in or less; 15 lb/in or less; 20 lb/in or less; or 25 lb/in or less. The helical coil spring 262 may have about 5 useable turns or less; 10 useable turns or less; or 20 useable turns or less. The helical coil spring 262 may have an uncompressed length of about: 10% or less; 20% or less; 30% or less; 40% or less; 50% or less; or 60% or less of the length of the flexible shaft 110. The helical coil spring 262 may be fabricated using any metallic or non-metallic material. Examples of such materials include, but are not limited to: stainless steel, nickel, brass, carbon fiber, or combinations thereof. Although the helical coil spring 262 is illustrated, any similar resilient, compressible member (e.g., other types of springs) may be used in the compressible tensioner 160.

The annular connectors 270 may be affixed or detachably attached to the helical coil spring 262. In embodiments, the annular connectors 270 may have an outside diameter that is slightly larger than the helical coil spring 262 to accommodate the at least partial insertion of the helical coil spring 262 into the annular connector 270A, 270B.

The annular connectors 270 may be fabricated using any material or combination of materials. The diameter of the annular connectors 270A and 270B may be the same or different. The diameter of the annular connectors 270 is less than the diameter of the hollow cylindrical member 230. In embodiments, the annular connectors 270 may be fabricated, in whole or in part, using a metallic material that demonstrates adequate corrosion resistance in the expected operating environment. Example metallic materials include but are not limited to brass, bronze, stainless steel, and similar. In other embodiments, the annular connectors 270 may be fabricated, in whole or in part, using a non-metallic material. Example non-metallic materials include but are not limited to: polypropylene, EPDM, polyoxymethylene (Delrin®), PVC, CPVC, fiber reinforced plastic (FRP), carbon fiber, or combinations thereof. In embodiments, the annular connectors 270 may include a metallic core member that is covered, encapsulated, and/or coated with one or more non-metallic materials.

In embodiments, one or more positioning elements 254C may be disposed between the compressible tensioner 160 and the second flexible sleeve 180. The positioning elements 254C beneficially minimize the likelihood of the pipeline reinstatement tool 100 contacting the inner surface of the lateral pipe as the cutting head 120 is rotated. The one or more positioning elements 254C may include any number of planar member having an aperture disposed therethrough to accommodate the passage of the flexible shaft 110. In embodiments, the aperture formed in the one or more positioning elements 254C may include a central aperture such that the one or more positioning elements 254C are symmetric about the flexible shaft 110. The aperture formed in the one or more positioning elements 254C may have a diameter sufficient to permit the free passage of the flexible shaft 110.

In embodiments, the one or more positioning elements 254C may be free floating about the flexible shaft 110. The one or more positioning elements 254C may be fabricated using any material that does not mar or damage the lateral pipe through which the pipeline reinstatement tool 100 is passed. For example, the one or more positioning elements 254C may be fabricated using one or more of: carbon fiber; propylene, polypropylene, ethylene propylene diene monomer (EPDM); polyvinyl chloride (PVC); chlorinated PVC (CPVC); polybutylene; fiber reinforced plastic (FRP); carbon fiber: or combinations thereof.

Each of the one or more positioning elements 254C may have the same or different diameters and/or thicknesses. In embodiments, at least some of the positioning elements 254C may have an outside diameter that is approximately the same as the outside diameter of the hollow cylindrical member 230 forming the cutting head 120. In embodiments, at least some of the positioning elements 254C may have an outside diameter that is at least 100%, but less than: about: 105%; about 110%; or about 125% of the outside diameter of the hollow cylindrical member 230. In embodiments, at least some of the positioning elements 254C may have an outside diameter that is about 95% or less; about 90% or less; about 75% or less; or about 50% or less than the outside diameter of the hollow cylindrical member 230. Each of the positioning elements 254C may have a thickness of about: 1/32 inch or less; 1/16 inch or less; 1/8 inch or less; 1/4 inch or less; or 1/2 inch or less.

Referring next to FIGS. 2A, 2J, and cross section C, the second flexible sleeve 180 includes a second flexible member 282, having a bushing 284 coupled to the first end of the second flexible member 282. In embodiments, the second flexible member 282 may include a tightly coiled member such as a tightly coiled spring or similar. As depicted in FIG. 2A, in embodiments, the second end of the second flexible member 282 may be flared outward and at least partially cover the coupling assembly 190. In some embodiments, the bushing 284 is axially displaceable along the external surface of the second flexible member 282. In at least some implementations, the bushing 284 may threadedly engage the external surface of the second flexible member 282. As depicted in cross-section C, in embodiments, the bushing 284 may include internal (i.e., female) threads 186 such that a tightly coiled second flexible member 282 may threadedly engage the bushing 282.

The second flexible member 282 has an axial length that is shorter or less than the axial length of the first flexible member 242. In embodiments, the second flexible member 282 may have a length that is about 10%, about 20%, about 30%, about 40%, about 50%, or about 70% of the length of the first flexible member 242. The second flexible member 282 may be fabricated using any suitable metallic, non-metallic, or composite material. For example, the second flexible member 282 may be fabricated, in whole or in part, as a tightly wound metallic coil spring. In another example, the second flexible member 282 may include a carbon fiber spring or a polymeric spring. In another example, the second flexible member 282 may include a continuous tube fabricated using one or more flexible materials and/or fabrics. The second flexible member 282 may have a uniform or non-uniform construction. For example, the second flexible member 282 may have a tightly coiled metal first end and a tightly coiled metal second end connected by a flexible, smooth, metallic or non-metallic intermediate section. Although the second flexible member 282 is depicted as a tightly coiled spring in FIG. 1A, other structures capable of providing flexibility similar to the tightly coiled spring depicted in FIG. 1A may be freely substituted.

The bushing 284 may be fabricated using any material or combination of materials capable of engaging the external surface of the second flexible member 282. In some embodiments, the bushing 284 is axially displaceable along the external surface of the second flexible member 282. In at least some implementations, the bushing 284 may threadedly engage the external surface of the second flexible member 282.

The diameter of the bushing 284 is less than the diameter of the hollow cylindrical member 230. In embodiments, the bushing 284 may be fabricated, in whole or in part, using a metallic material demonstrating adequate corrosion resistance in the expected operating environment. Example metallic materials include but are not limited to: brass, bronze, stainless steel, and similar. In other embodiments, the bushing 284 may be fabricated, in whole or in part, using a non-metallic material. Example non-metallic materials include but are not limited to: polypropylene, EPDM, polyoxymethylene (Delrin®), PVC, CPVC, fiber reinforced plastic (FRP), carbon fiber, or combinations thereof. In embodiments, the bushing 284 may include a metallic member that is coated with one or more non-metallic materials.

The coupling assembly 190 is affixed to detachably attached to the second end of the flexible shaft 110. The coupling assembly 190 includes a resilient ring 194 that prevents the coupling assembly 190 from scraping against the walls of the lateral pipeline when the pipeline reinstatement tool 100 is inserted or withdrawn from the lateral pipeline. The coupling assembly includes a plurality of attachment devices, such as threaded attachment devices 192A-192n that couple the coupling assembly to the second end of the flexible shaft 110 to a rotating shaft powered by one or more external devices.

Figure 3A:
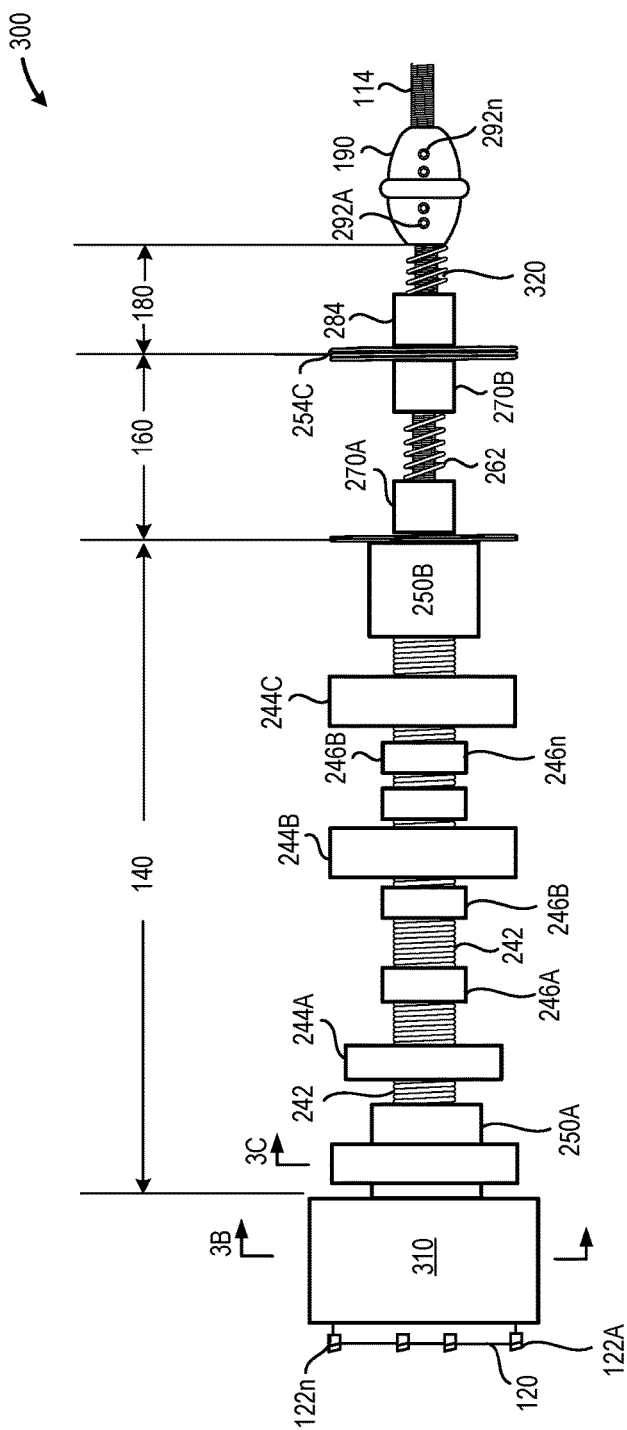
FIG. 3A is an plan view of an illustrative pipeline reinstatement tool that includes a flexible shaft having a first end and a second end, a cutting head affixed to the first end of the flexible shaft, a sleeve at least partially covering the cutting head, a first flexible sleeve, a second flexible sleeve, a compressible tensioner disposed between the first flexible sleeve and the second flexible sleeve, and a coupling assembly disposed proximate the second end of the flexible shaft, in accordance with at least one embodiment described herein.
Figure 3C:
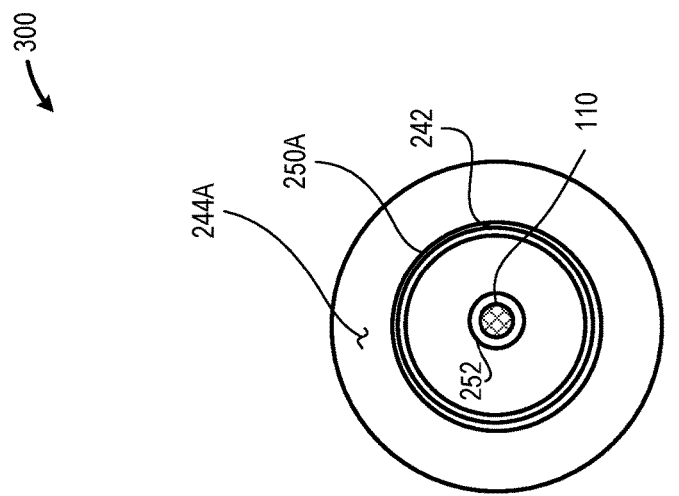
FIG. 3C is a cross-sectional elevation of the illustrative pipeline reinstatement tool depicted in FIG. 3A along sectional line 3C, in accordance with at least one embodiment described herein.
Figure 3B:
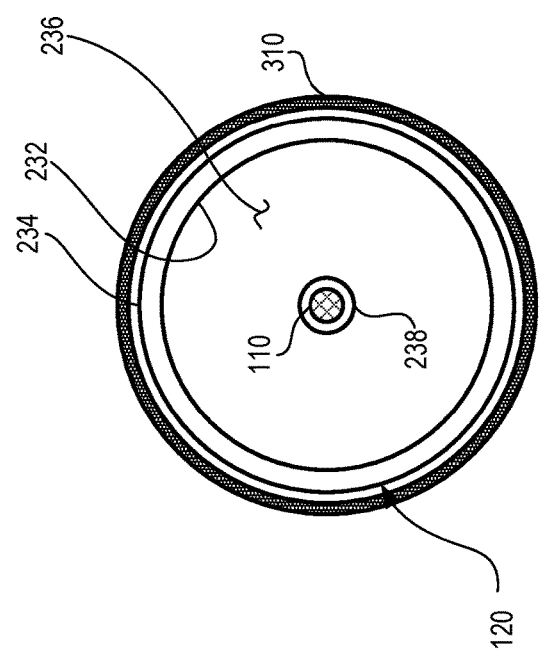
FIG. 3B is a cross-sectional elevation of the illustrative pipeline reinstatement tool depicted in FIG. 3A along sectional line 3B, in accordance with at least one embodiment described herein.

FIG. 3A is an plan view of an illustrative pipeline reinstatement tool 300 that includes a flexible shaft 110 having a first end and a second end, a cutting head 120 affixed to the first end of the flexible shaft 110, a sleeve 310 at least partially covering the cutting head 120, a first flexible sleeve 140, a second flexible sleeve 180, a compressible tensioner 160 disposed between the first flexible sleeve 140 and the second flexible sleeve 180, and a coupling assembly 190 disposed proximate the second end of the flexible shaft 110, in accordance with at least one embodiment described herein. FIGS. 3B and 3C provide cross-sections of the pipeline reinstatement tool 300 at the respective points indicated in FIG. 3A. As depicted in FIG. 3A, in embodiments, a sleeve 310 includes a second hollow cylindrical member having an open first end and a closed second end. The closed second end of the sleeve 310 has an aperture formed therethrough to permit the passage of the flexible shaft 110 through the bit sleeve and into the aperture 238 formed in the attachment member 236 of the cutting head 120. The aperture formed in the second end of the sleeve 310 permits the axial displacement of the sleeve 310 along the flexible shaft 110.

Referring first to FIGS. 3A and 3B, beneficially, the thickness of the sleeve 310 exceeds the projection of the teeth 122 on the cutting head 120, minimizes the likelihood that the teeth 122 contacting the surface of the lateral pipeline as the cutting head 120 is rotated against the liner in the reinstated pipeline. In addition, the force applied to the pipeline reinstatement tool 100 when penetrating the liner in the reinstated pipeline, compresses the compressible tensioner 160, allowing the sleeve 310 to move (or be displaced) away from the first end of the flexible shaft 110, increasing the exposure of the cutting head 120 to the liner in the reinstated pipeline. Thus, the sleeve 310 beneficially protects the lateral pipeline from damage caused by the cutting head 120 while being easily displaced to permit strong contact between the cutting head 120 and the liner in a reinstated pipeline. In embodiments, the closed second end of the bit sleeve may be chamfered, tapered, or otherwise sloped to permit the passage of the sleeve 310 and cutting head 120 after the cutting head 120 penetrates the liner in the reinstated pipeline 110.

Referring next to FIGS. 3A and 3C, in embodiments, one or more of the fixed spacer elements 244A may be disposed about the external surface of the self-adjusting alignment bushing 250A. In some embodiments, the fixed spacer element 244 may be formed integral with the self-adjusting alignment bushing 250A, for example the fixed spacer element 244 may be cast integral with a metallic or non-metallic self-adjusting alignment bushing 250A. In other embodiments, the fixed spacer element 244 may be separately formed and affixed to the external surface of the self-adjusting alignment bushing 250A via one or more fasteners, chemical adhesives, thermal bonding, compression fitting, or combinations thereof.

The pipeline reinstatement tool 300 includes a second flexible sleeve 180 that includes a bushing 284 and a compressible element 320. As depicted in FIG. 3A, in some implementations, the compressible element 320 may include a helical coil spring. The compressible element 320 may include a helical coil spring having any number of turns. The compressible element 320 may have a spring constant of about: 2 pounds/inch (lb/in) or less; 3 lb/in or less; 5 lb/in or less; 7 lb/in or less; 9 lb/in or less; 11 lb/in or less; 15 lb/in or less; 20 lb/in or less; or 25 lb/in or less. The compressible element 320 may include a helical coil spring that includes: 5 useable turns or less; 10 useable turns or less; or 20 useable turns or less. The compressible element 320 may include a helical coil spring have an uncompressed length of about: 10% or less; 20% or less; 30% or less; 40% or less; 50% or less; or 60% or less of the length of the flexible shaft 110. The compressible element 320 may include a helical coil spring formed using wire having a diameter of: about 0.025 inches or less; about 0.050 inches or less; about 0.115 inches or less; or about 0.250 inches or less. The compressible element 320 may be fabricated using any metallic or non-metallic material. Examples of such materials include, but are not limited to: stainless steel, nickel, brass, carbon fiber, or combinations thereof. The compressible element 320 beneficially provides additional axial displacement along the flexible shaft 110 for the sleeve 310, the first flexible sleeve 140, and/or the compressible tensioner 160.

Figure 4A:
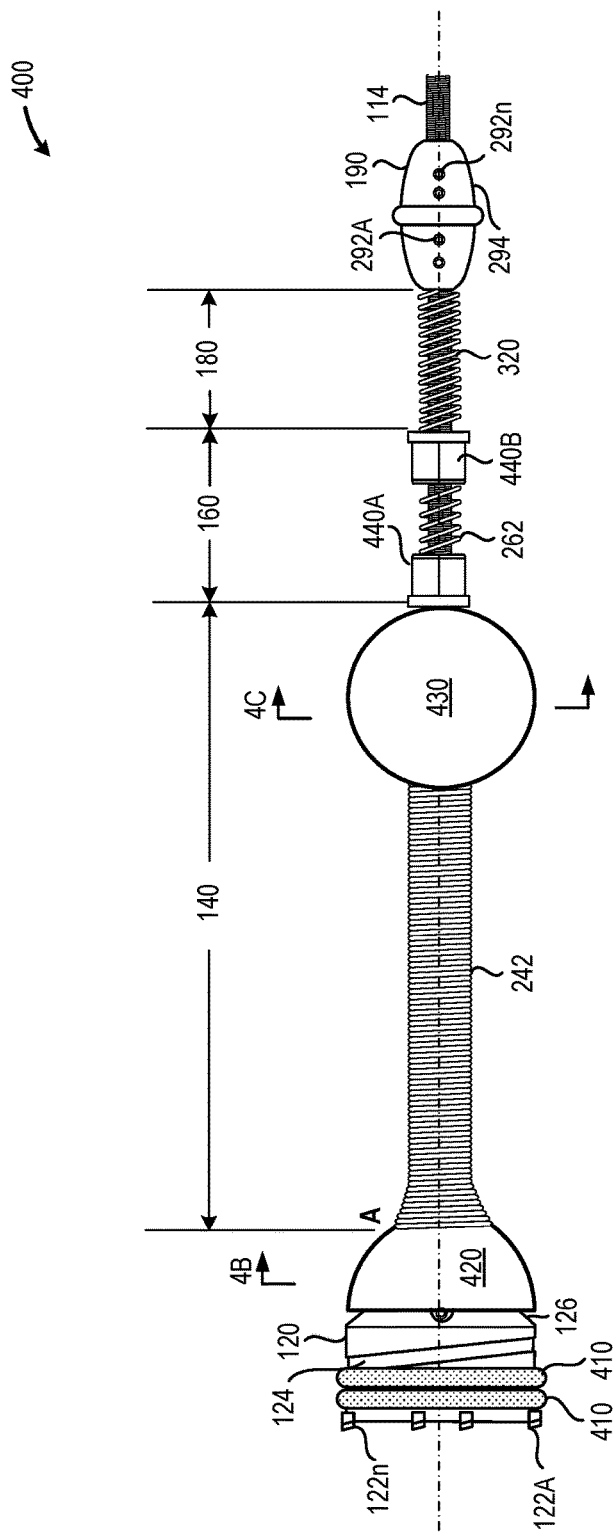
FIG. 4A is an plan view of an illustrative pipeline reinstatement tool that includes a flexible shaft having a first end and a second end, a cutting head affixed to the first end of the flexible shaft, a plurality of resilient members disposed about the cutting head, a hemispherical floating spacer element a first flexible sleeve, a second flexible sleeve, a spherical floating spacer element, a compressible tensioner disposed between the first flexible sleeve and the second flexible sleeve, and a coupling assembly disposed proximate the second end of the flexible shaft, in accordance with at least one embodiment described herein.
Figure 4C:
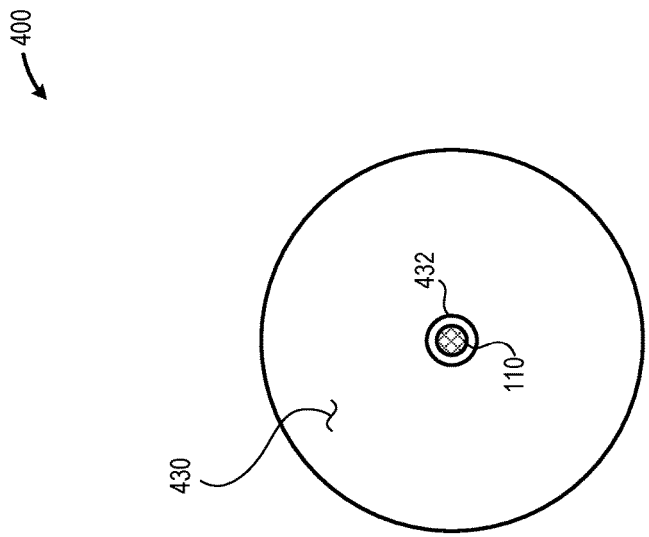
FIG. 4C is a cross-sectional elevation of the illustrative pipeline reinstatement tool depicted in FIG. 4A along sectional line 4C, in accordance with at least one embodiment described herein.
Figure 4B:
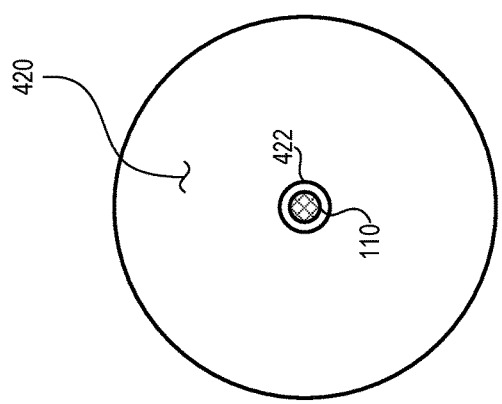
FIG. 4B is a cross-sectional elevation of the illustrative pipeline reinstatement tool depicted in FIG. 4A along sectional line 4B, in accordance with at least one embodiment described herein.

FIG. 4A is an plan view of an illustrative pipeline reinstatement tool 400 that includes a flexible shaft 110 having a first end and a second end, a cutting head 120 affixed to the first end of the flexible shaft, a plurality of resilient members 410A-410n (collectively, "resilient members 410") disposed about the cutting head 120, a hemispherical floating spacer element 420 a first flexible sleeve 140, a second flexible sleeve 180, a spherical floating spacer element 430, a compressible tensioner 160 disposed between the first flexible sleeve 140 and the second flexible sleeve 180, and a coupling assembly 190 disposed proximate the second end of the flexible shaft 110, in accordance with at least one embodiment described herein. FIGS. 4B and 4C provide cross-sections of the pipeline reinstatement tool 400 at the respective points indicated in FIG. 4A. As depicted in FIG. 4A, in embodiments, the resilient members 410 may be disposed about the external surface of the hollow cylindrical element 230 and the hemispherical floating spacer element 420 may be disposed proximate the cutting head 120. In embodiments, the spherical floating spacer element 430 is positioned between the first flexible sleeve 140 and the compressible tensioner 160. In other embodiments (not depicted in FIG. 4A) the spherical floating spacer element 430 is positioned between the compressible tensioner 160 and the second flexible sleeve 180.

The resilient members 310 may include any number and or combination of resilient or elastomeric members disposed proximate at least a portion of the external surface of the cutting head 120. The thickness of the resilient members 410 (i.e., the distance the resilient members 410 project above the external surface of the cutting head 120) is greater than the projection of the teeth 122 from the external surface of the cutting head 120. The resilient members 410 may extend partially or completely about the external circumference of the cutting head 120. Where a plurality of resilient members 410 are used, each may have the same or different thicknesses and/or cross-sectional profiles. Example cross-sectional profiles include but are not limited to: circular (e.g., a "O"-ring); rectangular; square; triangular; oval; or combinations thereof. The resilient members 410 may be fabricated using one or more materials demonstrating suitable corrosion and/or abrasion resistance. Example materials include but are not limited to: rubber, nitrile (Buna-N), ethylene propylene diene monomer (EPDM); Viton®; neoprene; polytetrafluoroethylene (PTFE—Teflon®); silicone; polyurethane; or combinations thereof. The resilient members 410 beneficially minimize the likelihood of contact between the teeth 122 and the sidewall of the lateral pipeline as the cutting head 120 rotates at speed. In operation, as the cutting head 120 penetrates the liner in the reinstated pipe, the resilient members 410 will tend to "roll" off the back (i.e., the second end) of the cutting head 120.

Referring now to FIGS. 4A and 4B, the pipeline reinstatement tool 400 includes a hemispherical floating spacer element 420 disposed proximate the second end of the cutting head 120. The outside diameter 424 of the hemispherical floating spacer element 420 may be similar to the outside diameter 235 of the hollow cylindrical shell 230. In embodiments, the hemispherical floating spacer element 320 may have an outside diameter 324 similar to the outside diameter of the circular path of the teeth 122 on the cutting head 120 (i.e., an outside diameter that is slightly larger than the outside diameter of the hollow cylindrical member).

The hemispherical floating spacer element 420 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture 422 formed through the hemispherical floating spacer element 420 permits the passage of the flexible shaft 110 through the hemispherical floating spacer element 420. The inside diameter of the aperture 422 is larger than the outside diameter of the flexible shaft 110 thereby permitting the axial displacement of the hemispherical floating spacer element 420 along the flexible shaft 110.

Referring next to FIGS. 4A and 4C, the pipeline reinstatement tool 400 includes a spherical floating spacer element 430 disposed proximate the compressible tensioner 160. In embodiments, the spherical floating spacer element 430 may be disposed between the first flexible sleeve 140 and the compressible tensioner 160. In other embodiments, the spherical floating spacer element 430 may be disposed between the second flexible sleeve 180 and the compressible tensioner 160. The outside diameter 434 of the spherical floating spacer element 430 may be similar to the outside diameter 235 of the hollow cylindrical shell 230. In embodiments, the spherical floating spacer element 430 may have an outside diameter 434 similar to the outside diameter of the circular path of the teeth 122 on the cutting head 120 (i.e., an outside diameter that is slightly larger than the outside diameter of the hollow cylindrical member). In other embodiments, the spherical floating spacer element 430 may have an outside diameter 434 that is smaller or less than the outside diameter 235 of the hollow cylindrical member 230.

The spherical floating spacer element 430 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture 432 formed through the spherical floating spacer element 430 permits the passage of the flexible shaft 110 through the spherical floating spacer element 430. The inside diameter of the aperture 432 is larger than the outside diameter of the flexible shaft 110 thereby permitting the axial displacement of the spherical floating spacer element 430 along the flexible shaft 110.

Figure 5A:
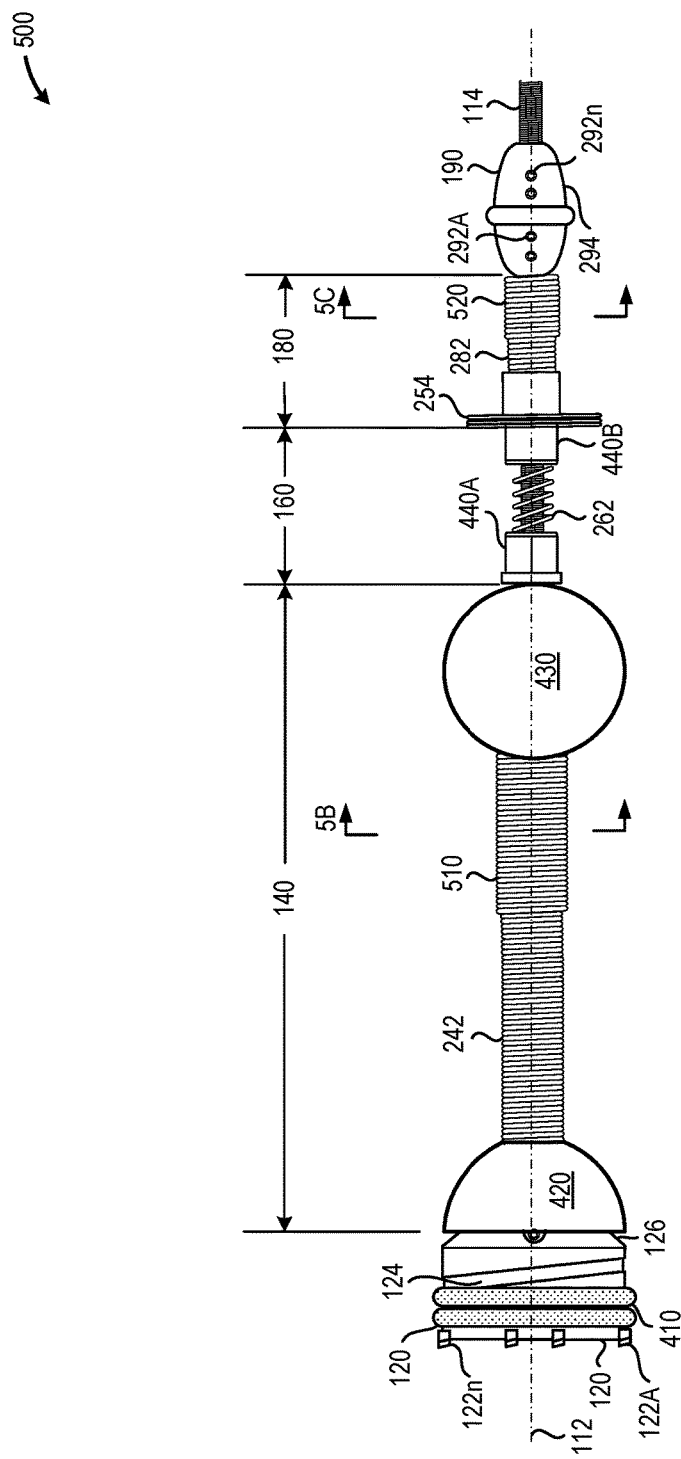
FIG. 5A is an plan view of an illustrative pipeline reinstatement tool that includes a flexible shaft having a first end and a second end, a cutting head affixed to the first end of the flexible shaft, a plurality of resilient members disposed about the cutting head, and in which the first flexible sleeve includes an external flexible member disposed at least partially about the first flexible member and the second flexible sleeve includes an external flexible member disposed at least partially about the second flexible member, in accordance with at least one embodiment described herein.
Figure 5C:
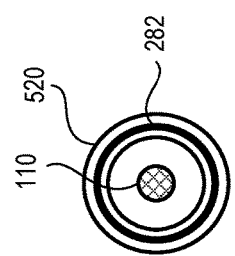
FIG. 5C is a cross-sectional elevation of the illustrative pipeline reinstatement tool depicted in FIG. 5A along sectional line 5C, in accordance with at least one embodiment described herein.
Figure 5B:
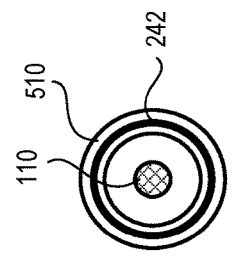
FIG. 5B is a cross-sectional elevation of the illustrative pipeline reinstatement tool depicted in FIG. 5A along sectional line 5B, in accordance with at least one embodiment described herein.

FIG. 5A is an plan view of an illustrative pipeline reinstatement tool 500 that includes a flexible shaft 110 having a first end and a second end, a cutting head 120 affixed to the first end of the flexible shaft, a plurality of resilient members 410A-410n (collectively, "resilient members 410") disposed about the cutting head 120, and in which the first flexible sleeve 140 includes an external flexible member 510 disposed at least partially about the first flexible member 242 and the second flexible sleeve 180 includes an external flexible member 520 disposed at least partially about the second flexible member 282, in accordance with at least one embodiment described herein. FIGS. 5B and 5C provide cross-sections of the pipeline reinstatement tool 500 at the respective points indicated in FIG. 5A. As depicted in FIG. 5A, in embodiments, a first external flexible member 510 may be disposed about the first flexible member 242 and a second external flexible member 520 may be disposed about the second flexible member 282.

Referring first to FIGS. 5A and 5B, the first flexible sleeve 140 includes the first flexible member 242 and a first external flexible member 510 disposed about at least a portion of the first flexible member 242. In embodiments, the first external flexible member 510 encircles at least a portion of the axial length of the first flexible member 242. The first external flexible member 510 may enclose, encompass, or encircle about 10% or less; about 20% or less; about 30% or less; about 50% or less; or about 75% or less of the axial length of the first flexible member 242. In embodiments, the first flexible member 242 may include a tightly coiled spring member and the first external flexible member 510 may include a tightly coiled spring member having an inside diameter that closely matches the outside diameter of the first flexible member 242. In such embodiments, the internal surface of the first external flexible member 510 may threadedly engage the external surface of the first flexible member 242. As the first flexible member 242 is inserted into the first external flexible member 510, the stiffness of the first flexible sleeve 140 increases and as the first flexible member 242 is withdrawn from the first external flexible member 510, the stiffness of the first flexible sleeve 140 decreases.

Referring next to FIGS. 5A and 5C, the second flexible sleeve 180 includes the second flexible member 282 and a second external flexible member 520 disposed about at least a portion of the second flexible member 282. In embodiments, the second external flexible member 520 encircles at least a portion of the axial length of the second flexible member 282. The second external flexible member 520 may enclose, encompass, and/or encircle about 10% or less; about 20% or less; about 30% or less; about 50% or less; or about 75% or less of the axial length of the second flexible member 282. In embodiments, the second flexible member 282 may include a tightly coiled spring member and the second external flexible member 520 may include a tightly coiled spring member having an inside diameter that closely matches the outside diameter of the second flexible member 282. In such embodiments, the internal surface of the second external flexible member 520 may threadedly engage the external surface of the second flexible member 282. As the second flexible member 282 is inserted into the second external flexible member 520, the stiffness of the second flexible sleeve 180 increases and as the second flexible member 282 is withdrawn from the second external flexible member 520, the stiffness of the second flexible sleeve 180 decreases.

Figure 6A:
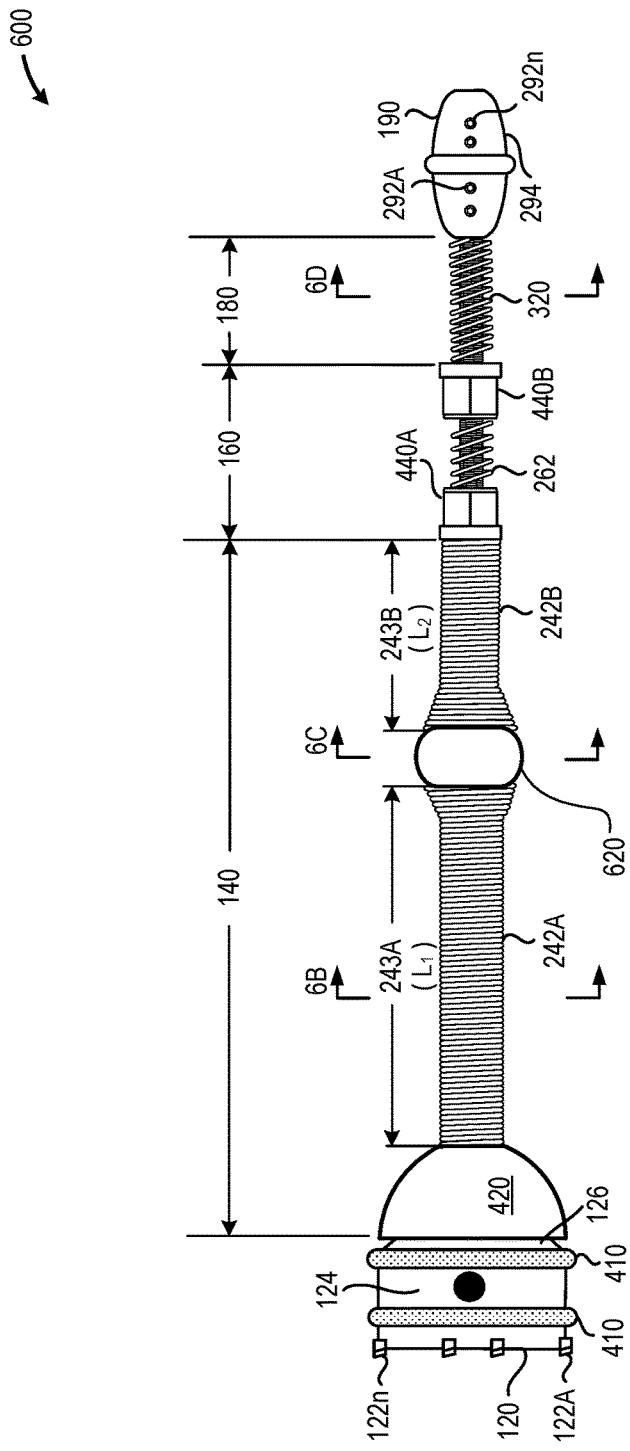
FIG. 6A is a plan view of an illustrative pipeline reinstatement tool in which the cutting head includes one or more apertures formed in the hollow cylindrical shell, and in which the first flexible member includes a first portion and a second portion separated by a floating spacer element, in accordance with at least one embodiment described herein.
Figure 6D:
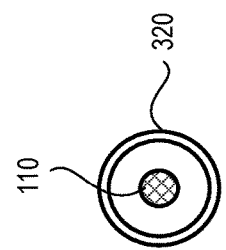
FIG. 6D is a cross-sectional elevation of the illustrative pipeline reinstatement tool depicted in FIG. 6A along sectional line 6D, in accordance with at least one embodiment described herein.
Figure 6C:
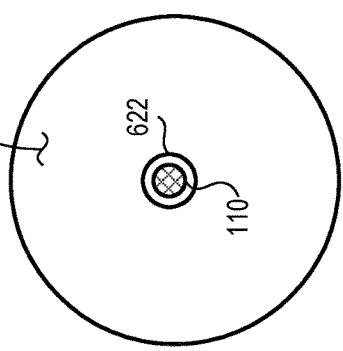
FIG. 6C is a cross-sectional elevation of the illustrative pipeline reinstatement tool depicted in FIG. 6A along sectional line 6C, in accordance with at least one embodiment described herein.
Figure 6B:
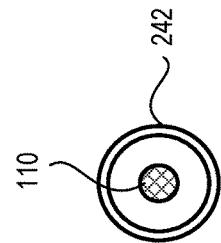
FIG. 6B is a cross-sectional elevation of the illustrative pipeline reinstatement tool depicted in FIG. 6A along sectional line 6B, in accordance with at least one embodiment described herein.

FIG. 6A is a plan view of an illustrative pipeline reinstatement tool 600 in which the cutting head 120 includes one or more apertures formed in the hollow cylindrical shell 130, and in which the first flexible member 242 includes a first portion 242A and a second portion 242B separated by a floating spacer element 620, in accordance with at least one embodiment described herein. FIGS. 6B, 6C, and 6D provide cross-sections of the pipeline reinstatement tool 600 at the respective points indicated in FIG. 6A. As depicted in FIG. 6A, one or more holes or apertures 610 may be formed in the hollow cylindrical member 230 forming the cutting head 120. The presence of the one or more apertures 610 beneficially permits material (e.g., liner material removed during the reinstatement process) trapped in the cutting head 120 to escape to the area external to the cutting head 120. In embodiments, the one or more apertures 610 may include a plurality of apertures having the same or different diameters. The one or more apertures 610 may have a diameter of about 1/16 inch (in) or less; about 1/8 in or less; about 1/4 in or less; about 3/8 in or less; about 1/2 in or less; or about 3/4 in or less. As depicted in FIG. 6A, one or more elastomeric members 410 may be disposed about the external surface of the cutting head 120 in locations that do not completely obstruct the one or more apertures 610.

As depicted in FIG. 6A, in embodiments, the first flexible sleeve 140 includes a first floating spacer element 420 disposed proximate the cutting head 120. In addition the first flexible sleeve 140 is apportioned into a first flexible portion 242A and a second flexible portion 242B separated by a second floating spacer element 620. In embodiments, the first flexible portion 242A has a first length 243A (L1) and the second flexible portion 242B has a second length 243B. In embodiments, the first length 243A and the second length 243B are equal. In other embodiments, the first length 243A and the second length 243B are unequal. Referring to FIGS. 6A and 6B, the inside diameter of the first flexible sleeve 140 is greater than the outside diameter of the flexible shaft 110, thus the first flexible sleeve 140 is freely displaceable along the flexible shaft 110.

Referring next to FIGS. 6A and 6C, the pipeline reinstatement tool 600 includes a toroidal floating spacer element 620 disposed between the first flexible portion 242A and the second flexible portion 242B of the first flexible sleeve 140. The outside diameter 624 of the toroidal floating spacer element 620 may be similar to the outside diameter 235 of the hollow cylindrical shell 230. In embodiments, the toroidal floating spacer element 620 may have an outside diameter 624 similar to the outside diameter of the circular path of the teeth 122 on the cutting head 120 (i.e., an outside diameter that is slightly larger than the outside diameter of the hollow cylindrical member 230). In other embodiments, the toroidal floating spacer element 620 may have an outside diameter 624 that is smaller or less than the outside diameter 235 of the hollow cylindrical member 230.

The toroidal floating spacer element 620 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture 622 formed through the toroidal floating spacer element 620 permits the passage of the flexible shaft 110 through the toroidal floating spacer element 620. The inside diameter of the aperture 622 is larger than the outside diameter of the flexible shaft 110 thereby permitting the axial displacement of the toroidal floating spacer element 620 along the flexible shaft 110.

Figure 7A:
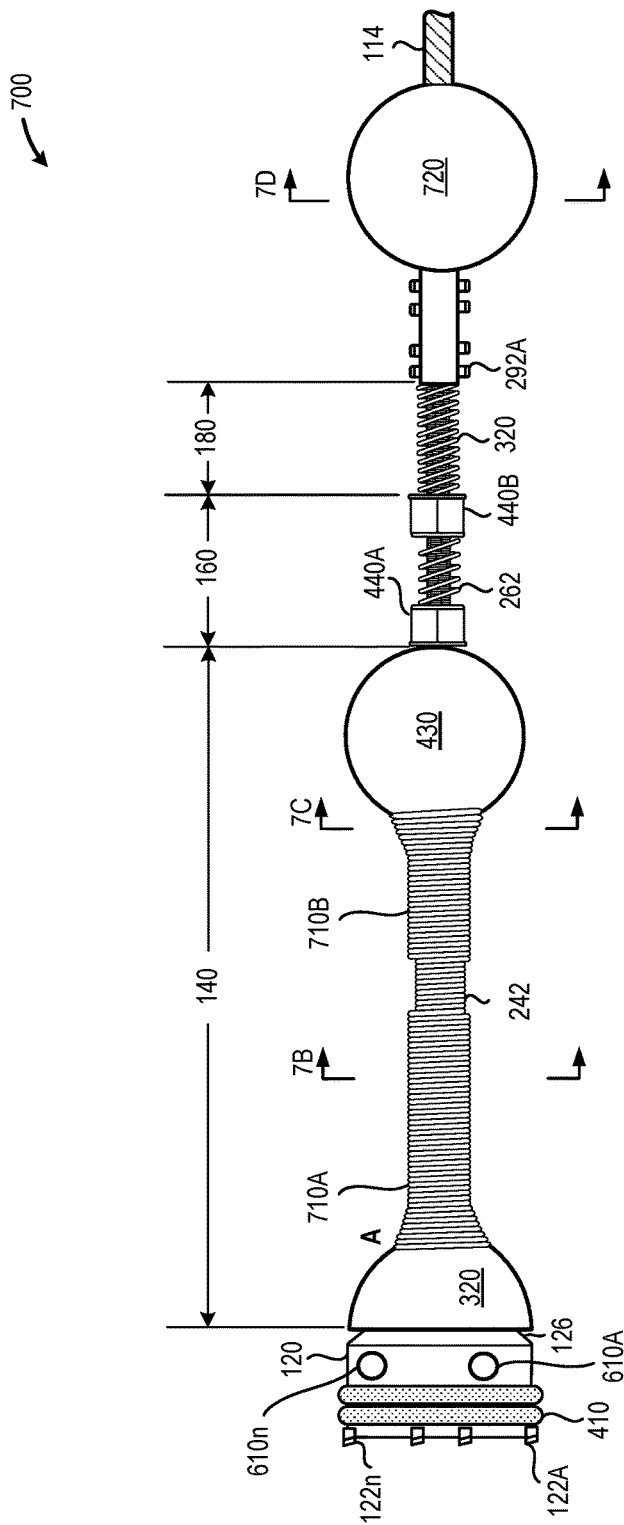
FIG. 7A is a plan view of another illustrative pipeline reinstatement tool in which the cutting head includes a plurality of apertures formed in the hollow cylindrical shell, and in which the first flexible sleeve includes a first external flexible member and a second external flexible member disposed about at least a portion of the flexible member, in accordance with at least one embodiment described herein.
Figure 7C:
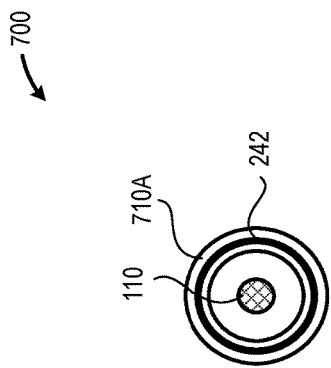
FIG. 7C is a cross-sectional elevation of the illustrative pipeline reinstatement tool depicted in FIG. 7A along sectional line 7C, in accordance with at least one embodiment described herein.
Figure 7D:
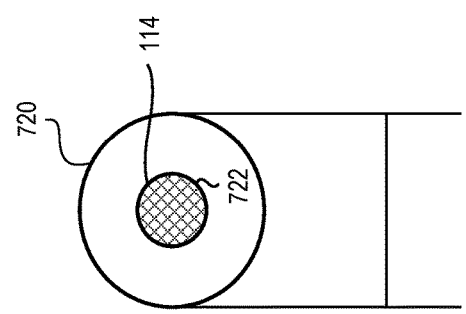
FIG. 7D is a cross-sectional elevation of the illustrative pipeline reinstatement tool depicted in FIG. 7A along sectional line 7D, in accordance with at least one embodiment described herein.
Figure 7B:
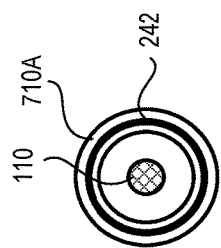
FIG. 7B is a cross-sectional elevation of the illustrative pipeline reinstatement tool depicted in FIG. 7A along sectional line 7B, in accordance with at least one embodiment described herein.

FIG. 7A is a plan view of another illustrative pipeline reinstatement tool 700 in which the cutting head 120 includes a plurality of apertures 610A-610n formed in the hollow cylindrical shell 130, and in which the first flexible sleeve 140 includes a first external flexible member 710A and a second external flexible member 710B disposed about at least a portion of the flexible member 242, in accordance with at least one embodiment described herein. The pipeline reinstatement tool 700 further includes an additional spacer element 720 disposed proximate the coupling assembly 190. In embodiments, the spacer element 720 may include a fixed spacer element affixed to either (or both) the coupling assembly 190 and the external drive shaft 114. In other embodiments, the spacer element 720 may include a floating spacer element able to move axially along the longitudinal axis of the external drive shaft 114. FIGS. 7B and 7C provide cross-sections of the pipeline reinstatement tool 700 at respective points along the first flexible sleeve 140 as indicated in FIG. 7A. FIG. 7D provides a cross-sectional view through spacer element 720 of the pipeline reinstatement tool 700.

As depicted in FIG. 7A, a plurality of holes or apertures 610 may be formed in the hollow cylindrical member 230 portion of the cutting head 120. The apertures 610A-610n beneficially permit material (e.g., liner material removed during the reinstatement process) trapped in the cutting head 120 to escape to the region of the lateral pipeline external to the cutting head 120. Each of the plurality of apertures 610 may have a diameter of about 1/16 inch (in) or less; about 1/8 in or less; about 1/4 in or less; about 3/8 in or less; about 1/2 in or less; or about 3/4 in or less. As depicted in FIG. 7A, one or more elastomeric members 410 may be disposed about the external surface 234 of the cutting head 120 in locations that do not partially or completely obstruct the plurality of apertures 610.

Referring now to FIGS. 7A, 7B, and 7C, the first flexible sleeve 140 includes a first external flexible member 710A and a second external flexible member 710B (collectively, "external flexible members 710") disposed about at least a portion of the flexible member 242. In embodiments, the first flexible member 242 may include a tightly coiled member having an outside diameter and the external flexible members 710 may include tightly coiled members having an inside diameter that closely matches the outside diameter of the first flexible member 242. In such embodiments, the external flexible members 710 may threadedly couple to the first flexible member 242. Also, note that although only two external flexible members 710 are depicted in FIG. 7A, any number of external flexible members may be similarly positioned proximate all or a portion of the external surface of the first flexible member 242. In embodiments, the external flexible members 710 may be affixed to the external surface of the first flexible member 242. In other embodiments, the external flexible members may be displaceable along the external surface of the first flexible member 242. As depicted in FIG. 7A, some or all of the external flexible members 710 may include a flared end to conform to the surface of the hemispherical floating spacer element 420 and/or the spherical floating spacer element 430.

Referring next to FIGS. 7A and 7D, spacer element 720 may be disposed proximate the coupling assembly 190. In embodiments, the spacer element 720 may be disposed about the external drive shaft 114 coupled to the flexible shaft 110 by the coupling assembly 190. In embodiments, the spacer element 720 may include a fixed spacer element affixed to either (or both) the coupling assembly 190 and/or the external drive shaft 114. In other embodiments, the spacer element 720 may include a floating spacer element that can be axially displaced along the external drive shaft 114. The spacer element 720 beneficially minimizes the likelihood of the coupling assembly 190 "hanging-up" in the lateral pipeline as the pipeline reinstatement tool 700 passes through the lateral pipeline.

The outside diameter 724 of spacer element 720 may be similar to the outside diameter 235 of the hollow cylindrical shell 230. In embodiments, the spacer element 720 may have an outside diameter 724 similar to the outside diameter of the circular path of the teeth 122 on the cutting head 120 (i.e., an outside diameter that is slightly larger than the outside diameter of the hollow cylindrical member 230). In other embodiments, the spacer element 720 may have an outside diameter 724 that is smaller or less than the outside diameter 235 of the hollow cylindrical member 230. The spacer element 720 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture 722 formed through the spacer element 720 permits the passage of the external drive shaft 114 through spacer element 720.

Figure 8B:
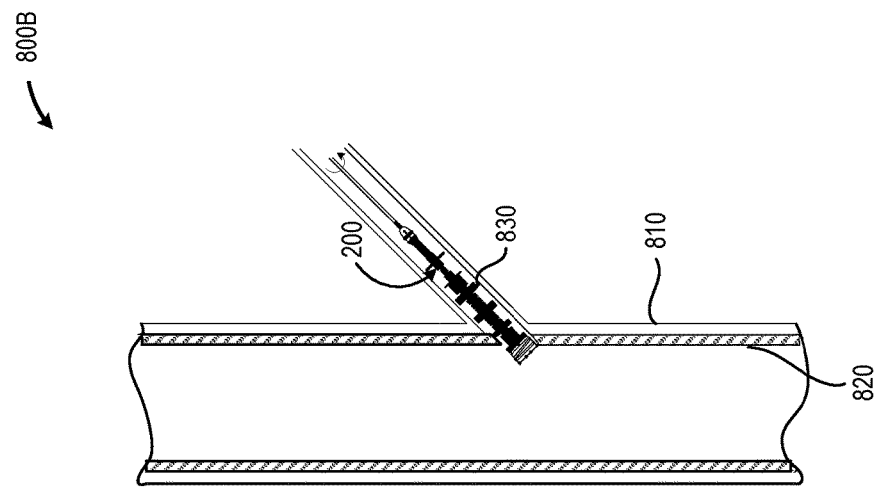
FIG. 8B is a partial cross-sectional view of the illustrative pipeline reinstatement tool of FIG. 8A after the pipeline reinstatement tool has cut a penetration through the liner to fluidly couple the lateral pipeline to the reinstated pipeline, in accordance with at least one embodiment described herein.
Figure 8A:
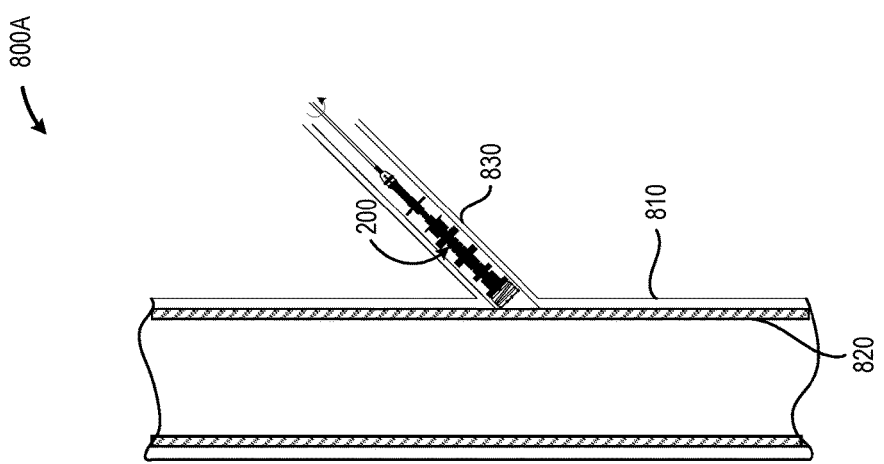
FIG. 8A is a partial cross-sectional view of an illustrative pipeline reinstatement tool disposed in a lateral pipeline, as the pipeline reinstatement tool approaches a reinstated pipeline that includes a previously installed liner, in accordance with at least one embodiment described herein.

FIG. 8A is a partial cross-sectional view of an illustrative pipeline reinstatement tool 200 disposed in a lateral pipeline 830, as the pipeline reinstatement tool 200 approaches a reinstated pipeline 810 that includes a previously installed liner 820, in accordance with at least one embodiment described herein. FIG. 8B is a partial cross-sectional view of the illustrative pipeline reinstatement tool 200 of FIG. 8A after the pipeline reinstatement tool 200 has cut a penetration through the liner 820 to fluidly couple the lateral pipeline 830 to the reinstated pipeline 810, in accordance with at least one embodiment described herein. In embodiments, the reinstated pipeline 810 may include any size pipeline formed using any material. For example, the diameter of the reinstated pipeline 810 may be about: 2 inches (in) or less; 3 in or less; 4 in or less; 6 in or less; 8 in or less; 12 in or less; 16 in or less; 18 in or less; or 24 in or less. The diameter of the lateral pipeline 830 may be about: 1 inch or less; 2 in or less; 3 in or less; 4 in or less; 6 in or less; or 8 in or less.

The liner 820 may include any photo or thermally curable liner capable of in-situ installation within the pipeline 810. In embodiments, the liner 820 may include a curable resin impregnated fiberglass liner. In embodiments, the liner 820 may be pulled through the pipeline 810 in a flattened state. Once in place, the liner 820 is "inflated" such that the liner 820 contacts the internal radius of the pipeline 810. Lateral pipelines 830 are blocked once the liner 820 is inflated to fill the pipeline 810. To restore drainage from the lateral pipeline 830, a penetration is made through the cured liner 820.

The lateral pipeline 830 may be fabricated using any of a number of materials, such as polyvinyl chloride (PVC); chlorinated polyvinyl chloride (CPVC); polyethylene; cast iron; carbon steel; galvanized steel; or combinations thereof. One may note that a number of the materials listed for lateral pipelines 830 are relatively soft materials that may be easily damaged by the metal pipeline reinstatement tools or by the heat generated by the rotating shaft in current pipeline reinstatement tools as they slowly cut through the liner 820 within the reinstated pipeline 810. The pipeline reinstatement tools disclosed herein beneficially and advantageously include spacer elements to minimize the likelihood of the cutting head 120 contacting the sidewall of the lateral pipeline 830 or fittings disposed in the lateral pipeline 830. In addition, the cutting head design disclosed herein minimizes the time required to penetrate the liner 820 in the reinstated pipeline 810, reducing the heating that occurs in the lateral pipeline. Further, the spacers disposed on the pipeline reinstatement tools disclosed herein maintain a separation between the flexible shaft 110 and the sidewall of the lateral pipeline 830.

Figure 9:
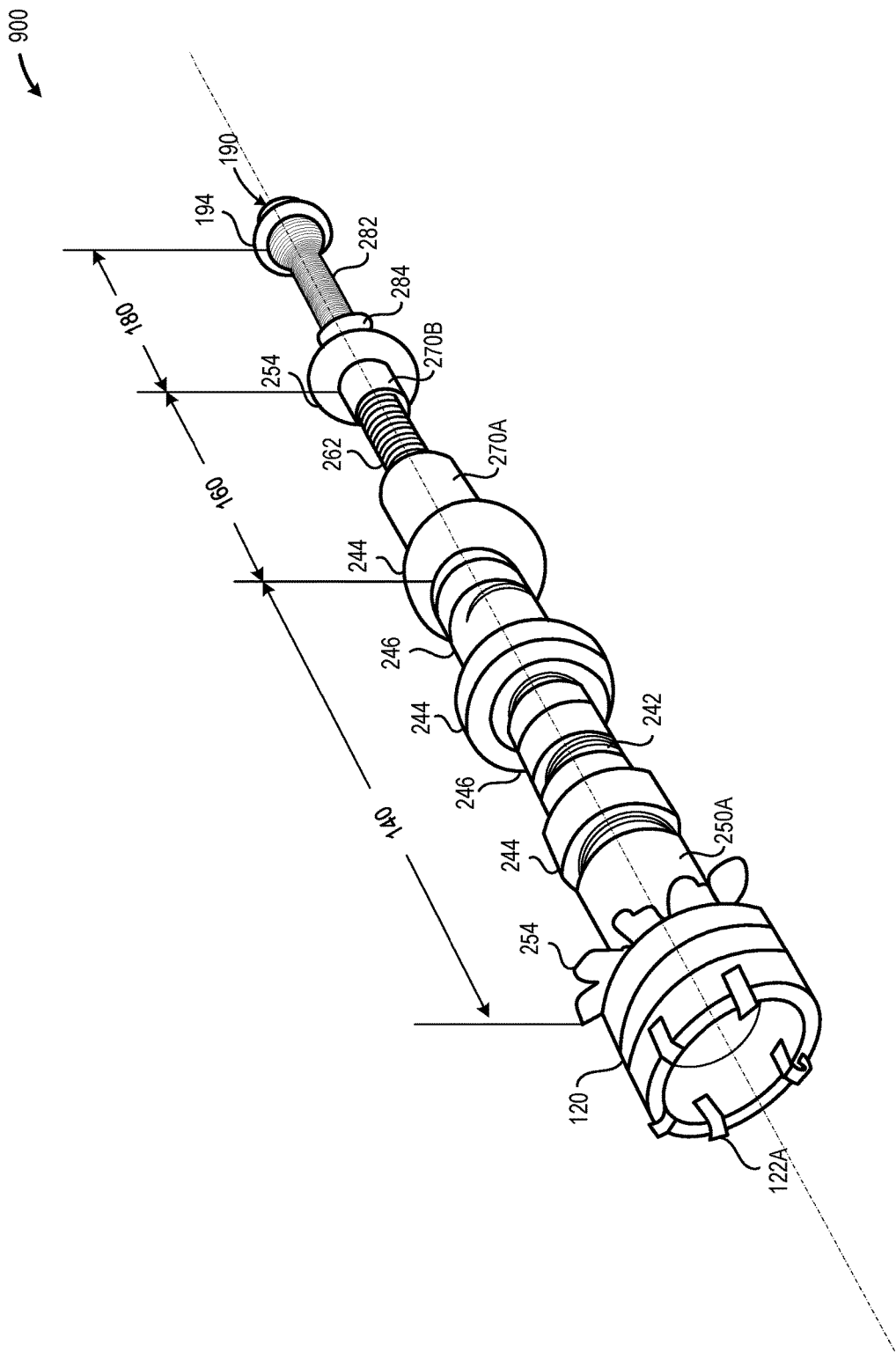
FIG. 9 is a rearward looking perspective view of the illustrative pipeline reinstatement tool such as depicted in FIG. 2, in accordance with at least one embodiment described herein.
Figure 10:
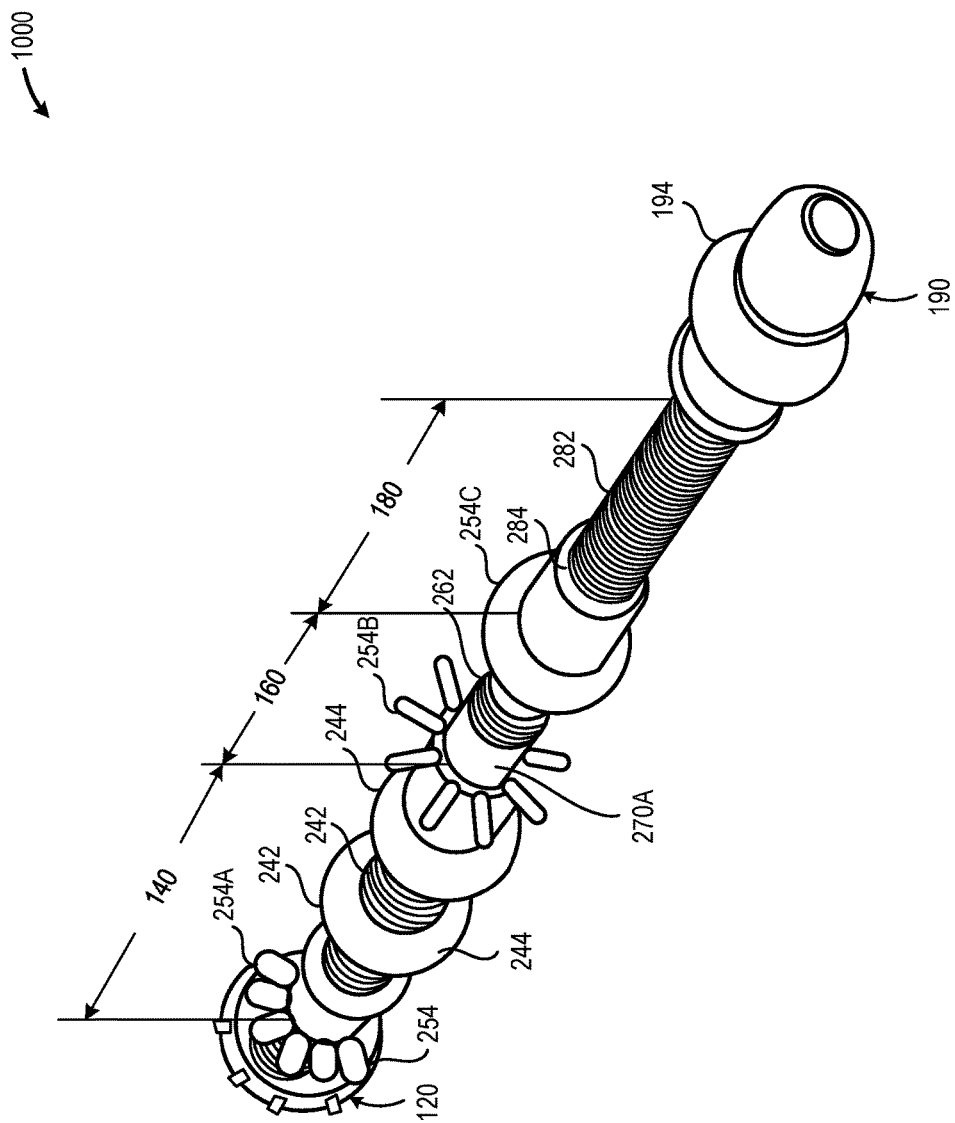
FIG. 10 is a forward-looking perspective view of the illustrative pipeline reinstatement tool such as depicted in FIG. 2, in accordance with at least one embodiment described herein.

FIG. 9 is a rearward looking perspective view of the illustrative pipeline reinstatement tool 200 depicted in FIG. 2, in accordance with at least one embodiment described herein. FIG. 10 is a forward-looking perspective view of the illustrative pipeline reinstatement tool 200 depicted in FIG. 2, in accordance with at least one embodiment described herein. Evident in FIGS. 9 and 10 is the protection provided to the high rotational speed flexible shaft 110 by the first flexible sleeve 140, second flexible sleeve 180, and compressible tensioner 160. Spacers disposed along the length of the pipeline reinstatement tool 900 minimize the possibility that the sleeve portions 140, 180 that may experience a degree of heating due to friction from contacting the rotating flexible shaft 110 can contact the internal surfaces of the lateral pipeline 830. The spacers disposed along the length of the pipeline reinstatement tool 200 also minimize the likelihood that the cutting teeth 122 on the cutting head 120 will contact the internal surface of the lateral pipeline 830—reducing the risk of unintended damage to the internal surfaces of the lateral pipeline.

Figure 11A:
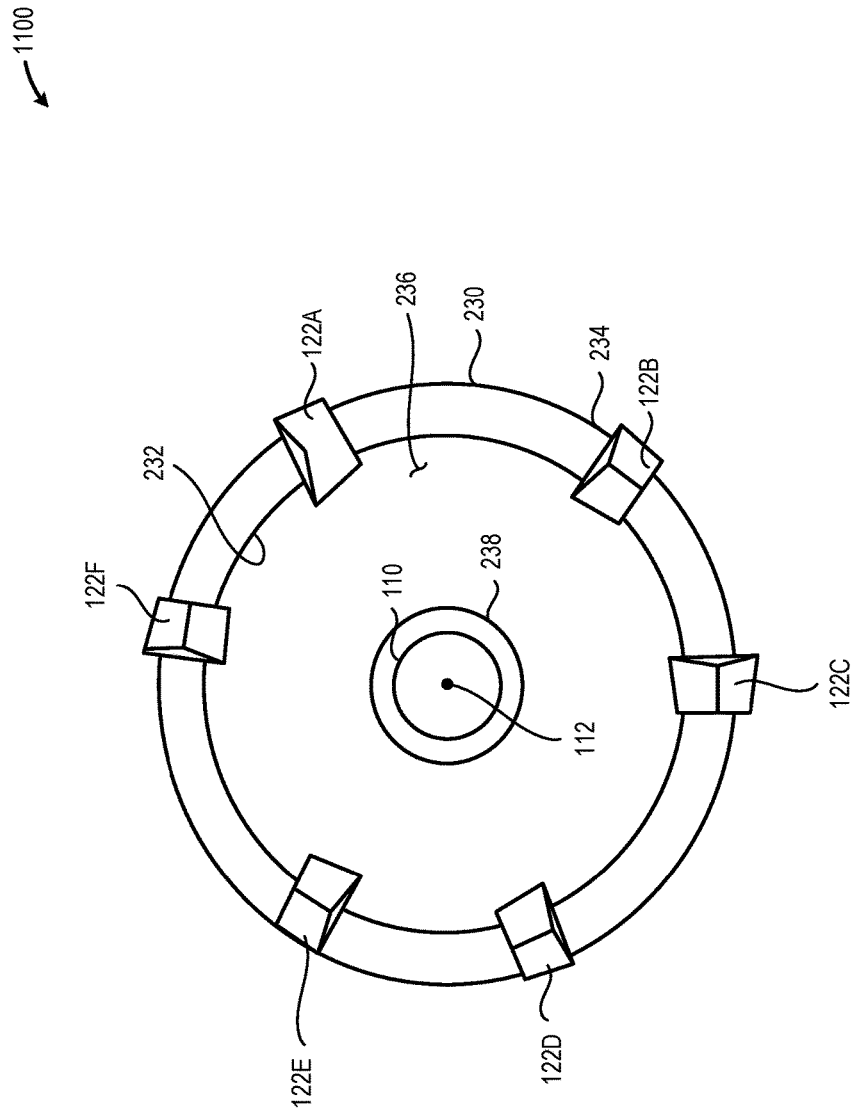
FIG. 11A is a front elevation view of an illustrative cutting head, in accordance with at least one embodiment described herein.
Figure 11B:
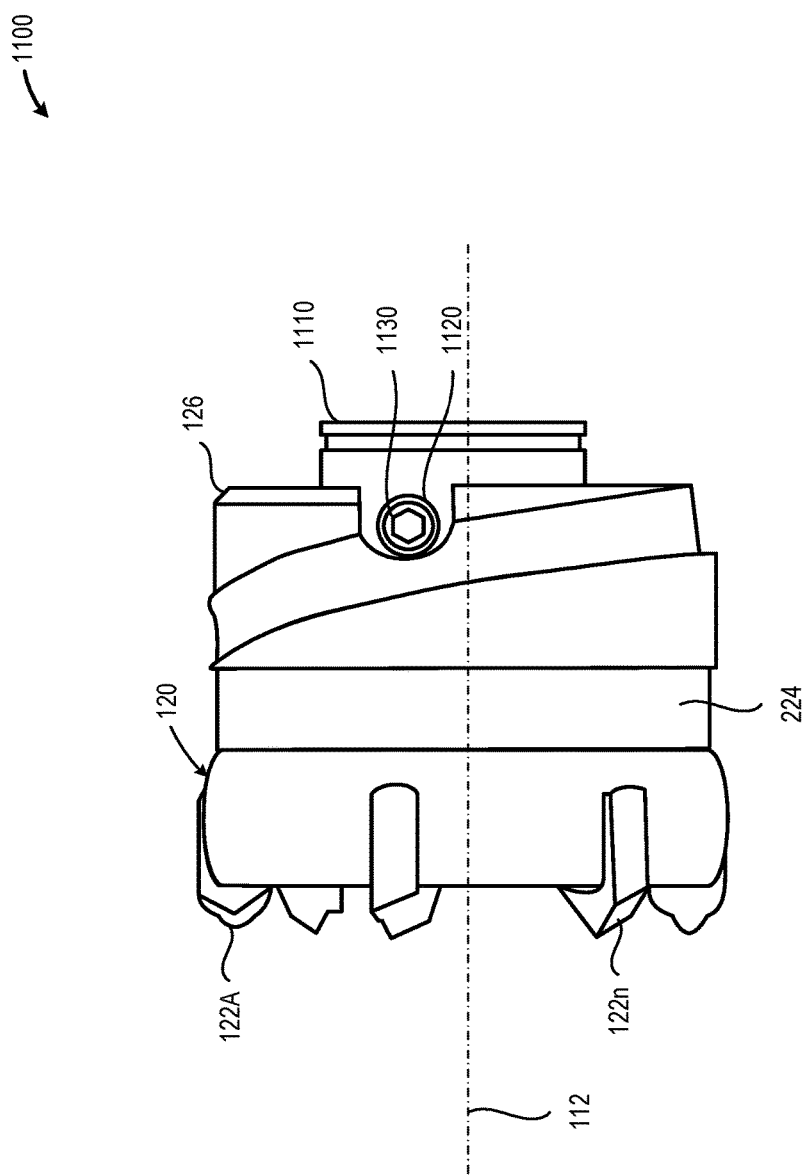
FIG. 11B is a side elevation of the illustrative cutting head, in accordance with at least one embodiment described herein.
Figure 11C:
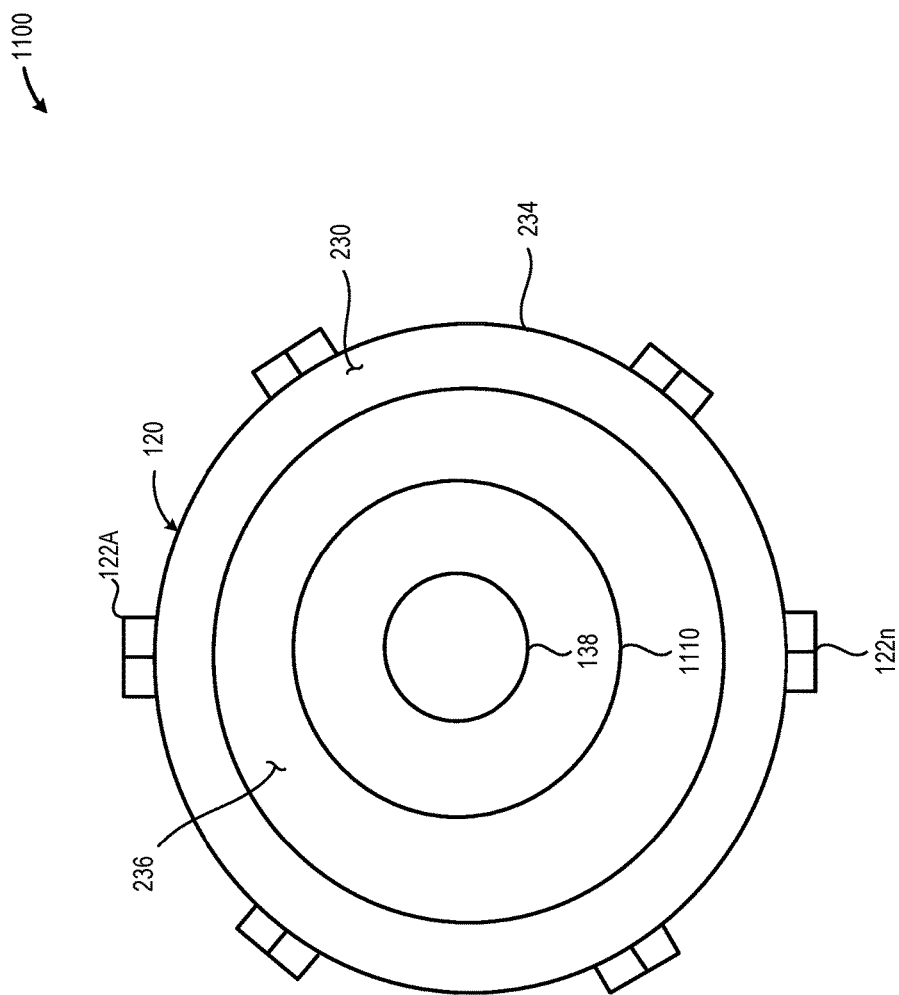
FIG. 11C is a rear elevation view of the illustrative cutting head, in accordance with at least one embodiment described herein.
Figure 11D:
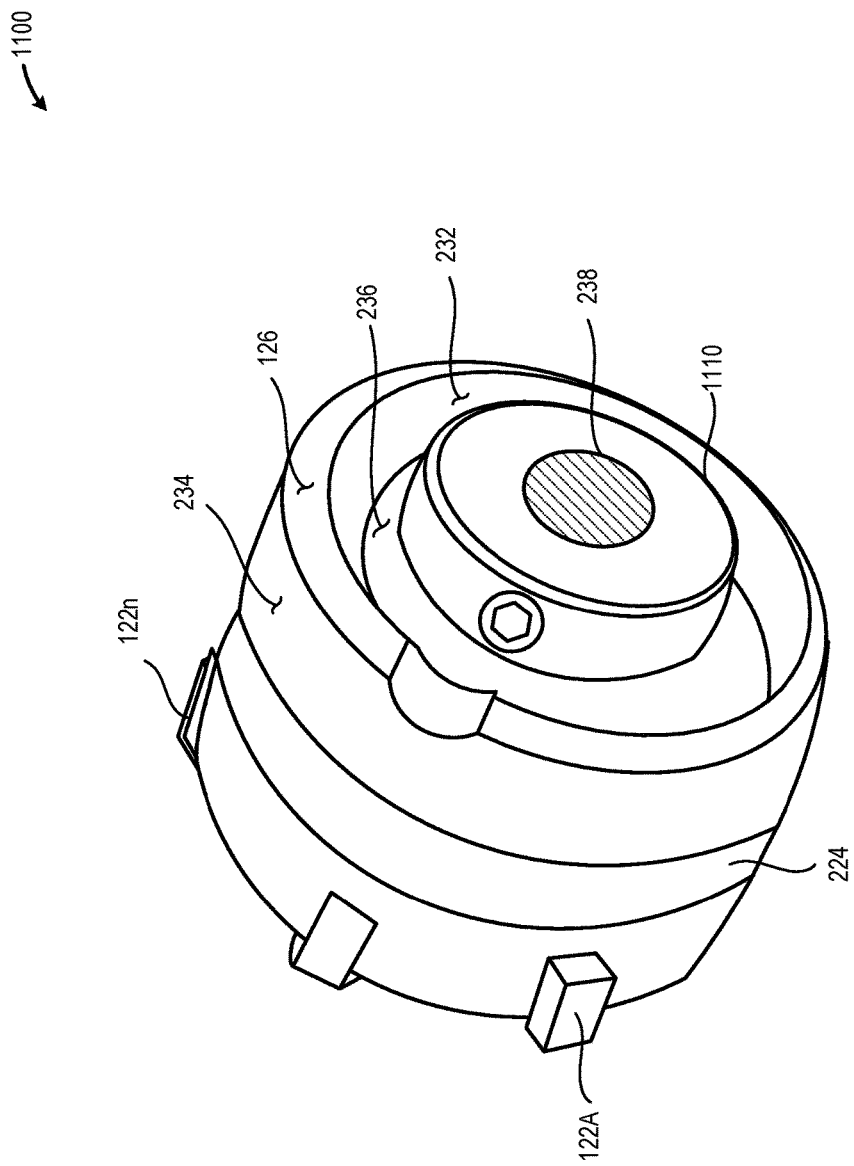
FIG. 11D is a rear perspective view of the illustrative cutting head, in accordance with at least one embodiment described herein.
Figure 11E:
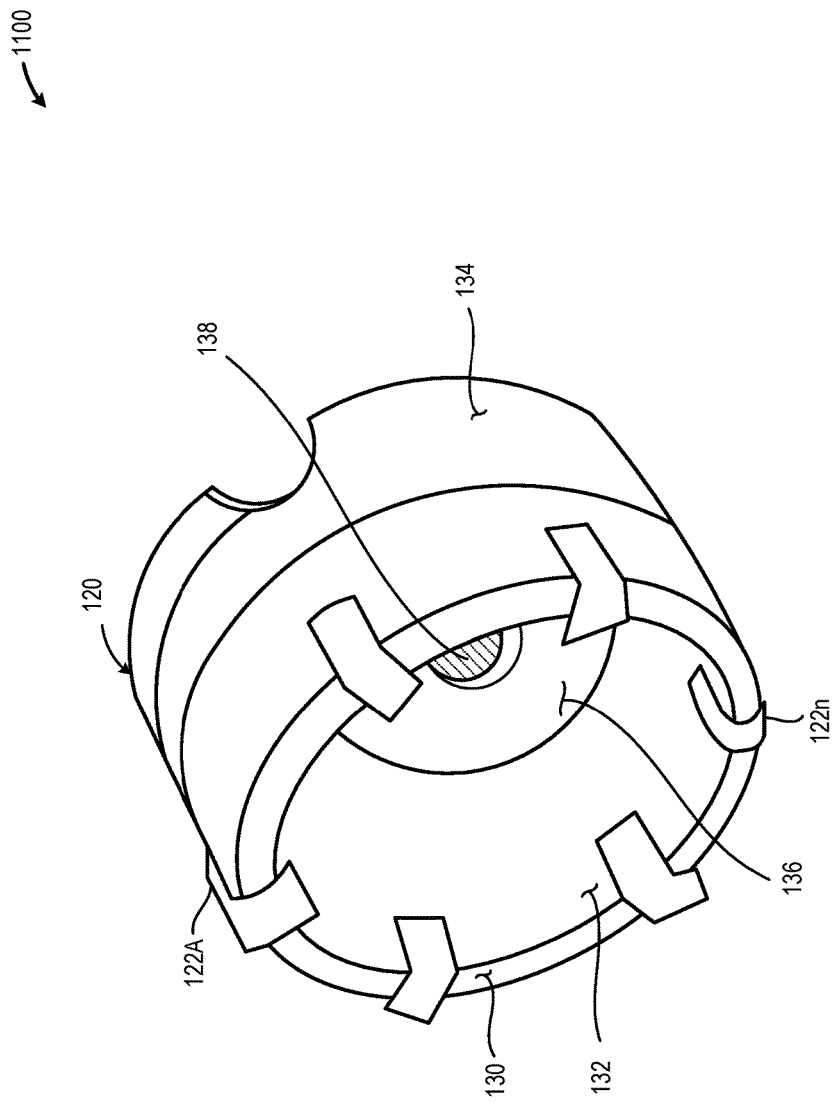
FIG. 11E is a front perspective view of the illustrative cutting head, in accordance with at least one embodiment described herein.
Figure 11F:
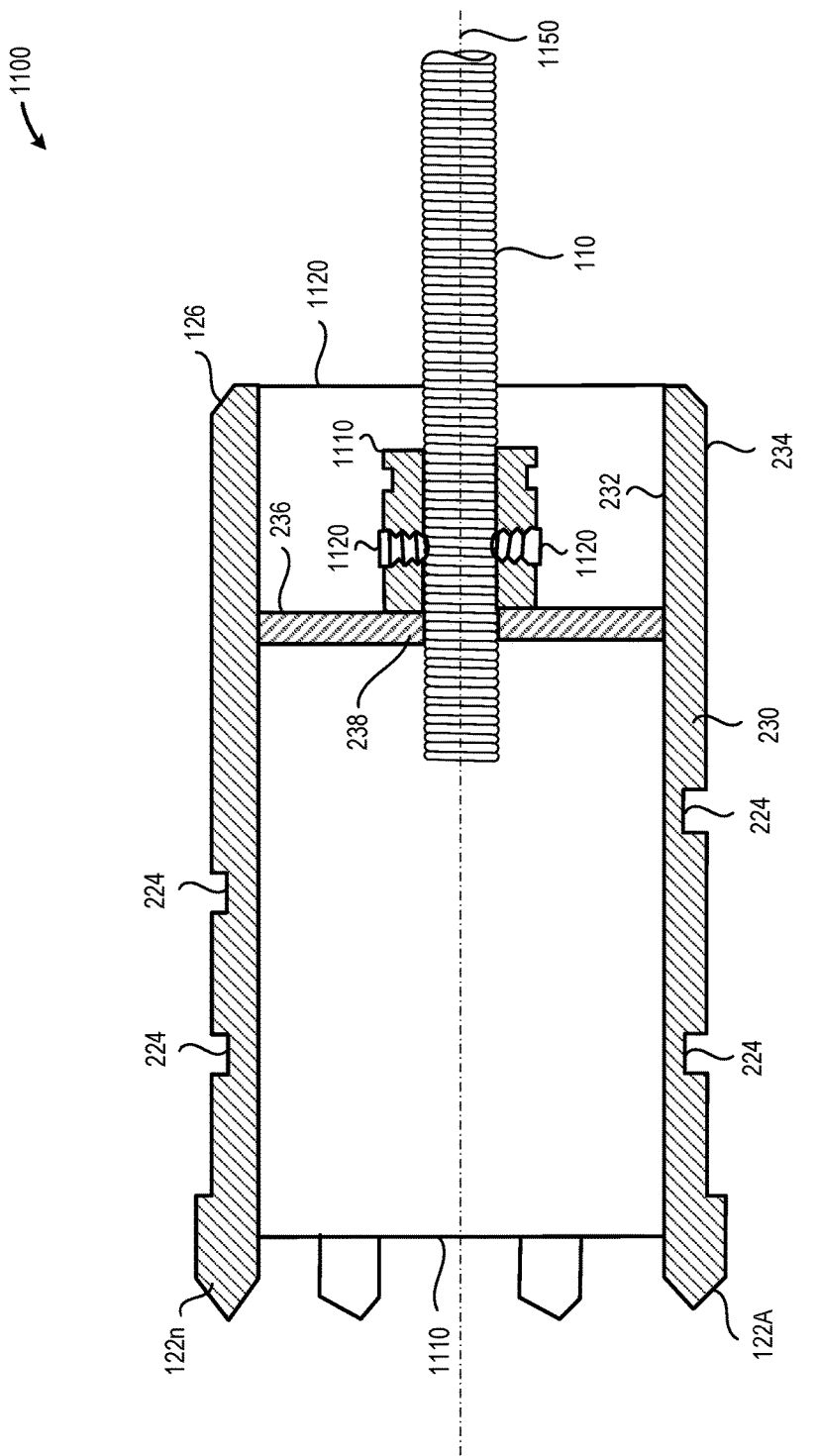
FIG. 11F is a longitudinal cross-sectional side view of the illustrative cutting head, in accordance with at least one embodiment described herein.

FIG. 11A is a front elevation view of an illustrative cutting head 1100, in accordance with at least one embodiment described herein. FIG. 11B is a side elevation of the illustrative cutting head 1100, in accordance with at least one embodiment described herein. FIG. 11C is a rear elevation view of the illustrative cutting head 1100, in accordance with at least one embodiment described herein. FIG. 11D is a rear perspective view of the illustrative cutting head 1100, in accordance with at least one embodiment described herein. FIG. 11E is a front perspective view of the illustrative cutting head 1100, in accordance with at least one embodiment described herein. FIG. 11F is a longitudinal cross-sectional side view of the illustrative cutting head 1100, in accordance with at least one embodiment described herein.

As depicted in FIGS. 11A-11F, the cutting head 1100 is formed as a hollow cylindrical member 230 having a first end 1110, a second end 1120, an internal surface 232 and an external surface 234. An attachment member 236 is disposed transverse to the longitudinal axis 1150 of the cutting head 1100. Although the attachment member 236 is depicted as an annular member having a central aperture 238 sufficient in diameter to pass the flexible shaft 110, in other embodiments, the attachment member 110 may include a single bar or rectangular shaped member disposed transverse to the longitudinal axis 1150 of the cutting head 1100. In other embodiments, the attachment member 236 may include an "X" or cross shaped member disposed transverse to the longitudinal axis 1150 of the cutting head 1100. The attachment member 236 may be formed integral with the hollow cylindrical member 230. The attachment member 236 may be formed separate from the hollow cylindrical member 230 and affixed to the internal surface 232 of the hollow cylindrical member 230, for example by welding, thermal bonding, chemical bonding, or compression fitting. The attachment member 236 may be detachably attached to the hollow cylindrical member 230, for example using threaded fasteners, snap rings, or similar attachment devices.

An attachment sleeve 1130 may be affixed to the attachment member 236. In embodiments, the attachment sleeve 1130 may include a hollow cylindrical member having a central aperture sufficient to permit the passage of the flexible shaft 110 therethrough. A plurality of shaft fasteners 1132 are disposed radially about the attachment sleeve 1130. The shaft fasteners detachably attach the cutting head 1100 to the flexible shaft 110. In at least some embodiments, the shaft fasteners 1132 may include set screws or similar threaded fasteners disposed radially about the attachment sleeve 1130 at equal angles (e.g., 3 fasteners 254 at 120°) or unequal angles (e.g., 3 shaft fasteners, the first two positioned at 90° with respect to each other, the third positioned at 135° with respect to each of the first two).

Figure 12A:
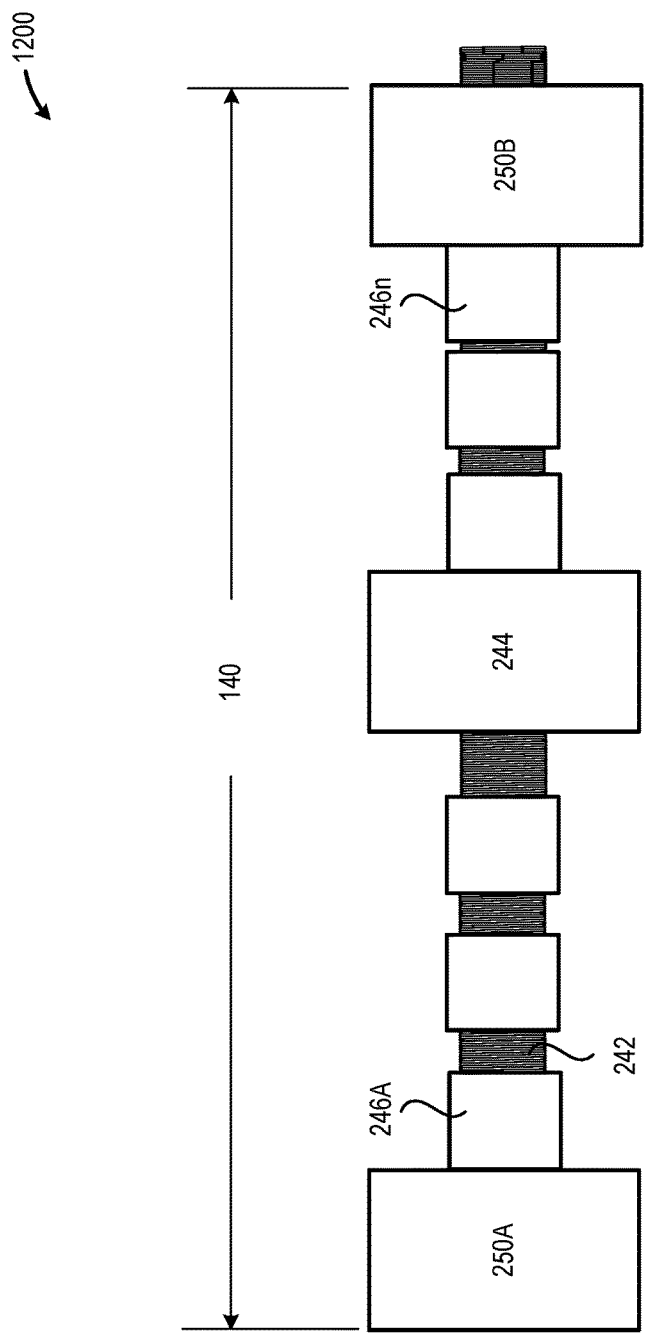
FIG. 12A is a block diagram of an illustrative first flexible sleeve, in accordance with at least one embodiment described herein.
Figure 12B:
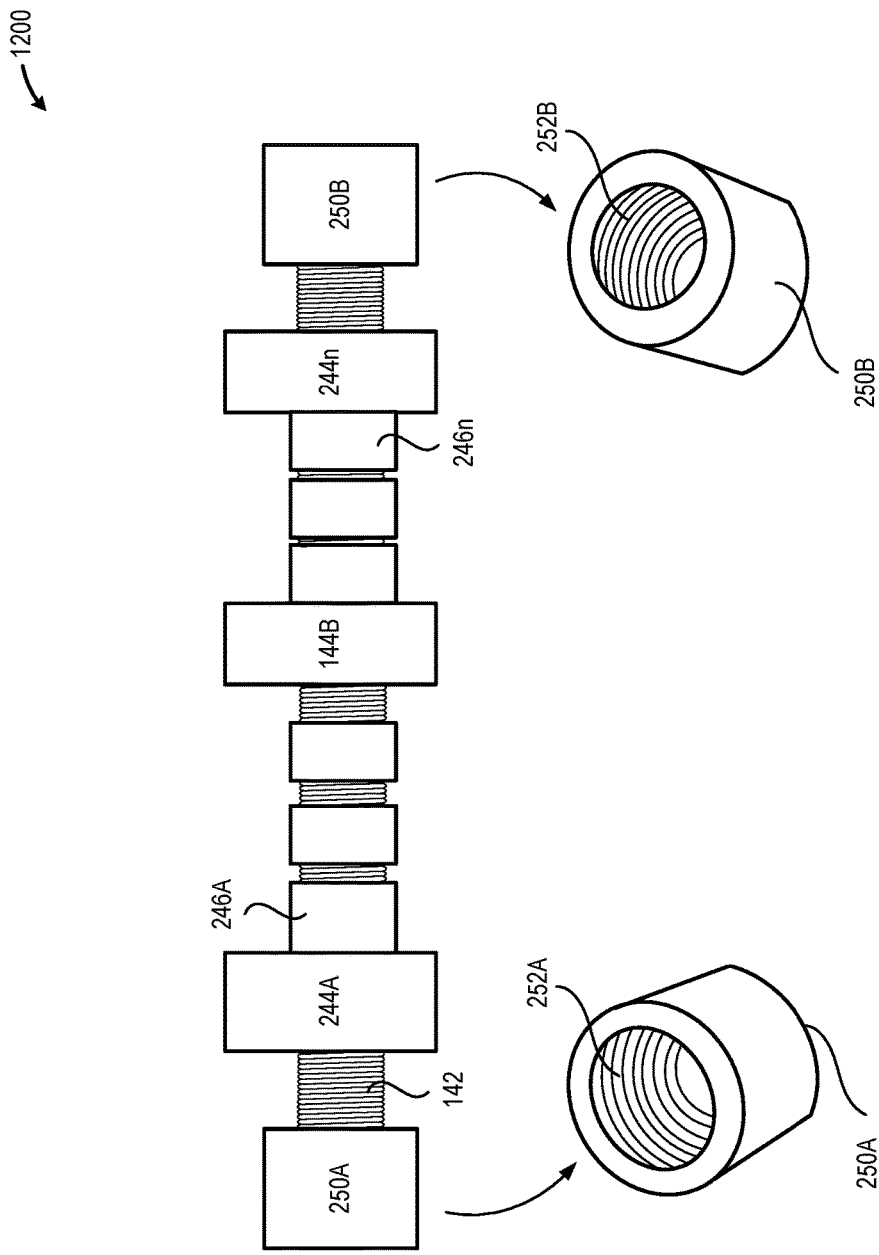
FIG. 12B is an elevation of an illustrative flexible sleeve, in accordance with at least one embodiment described herein.
Figure 12C:
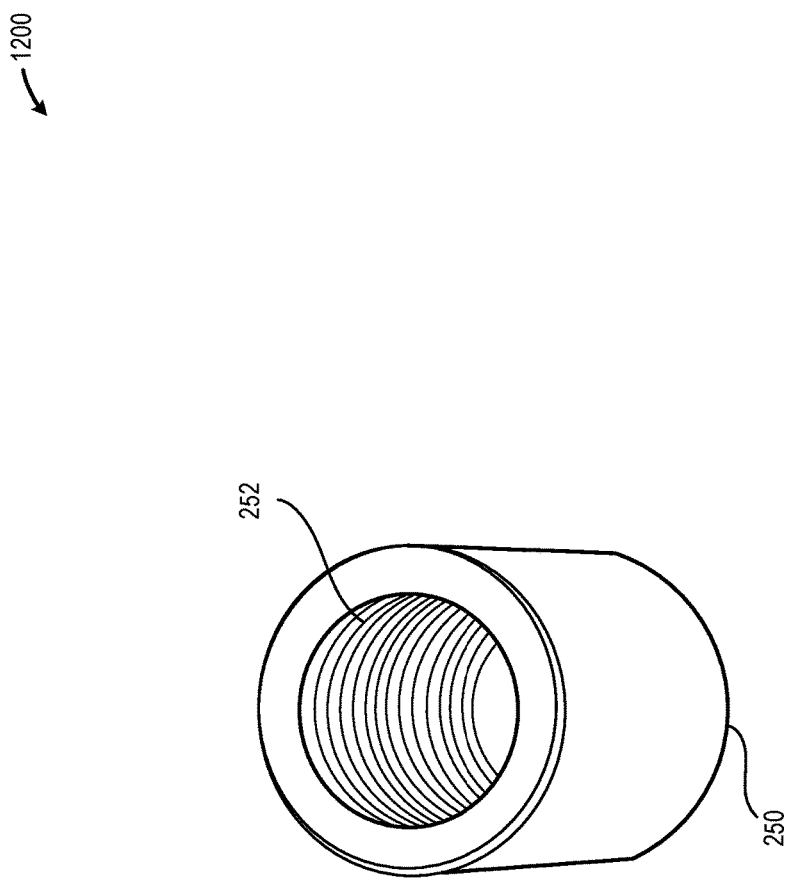
FIG. 12C is a perspective view of an illustrative self-adjusting alignment bushing included in the first flexible sleeve, in accordance with at least one embodiment described herein.
Figure 12D:
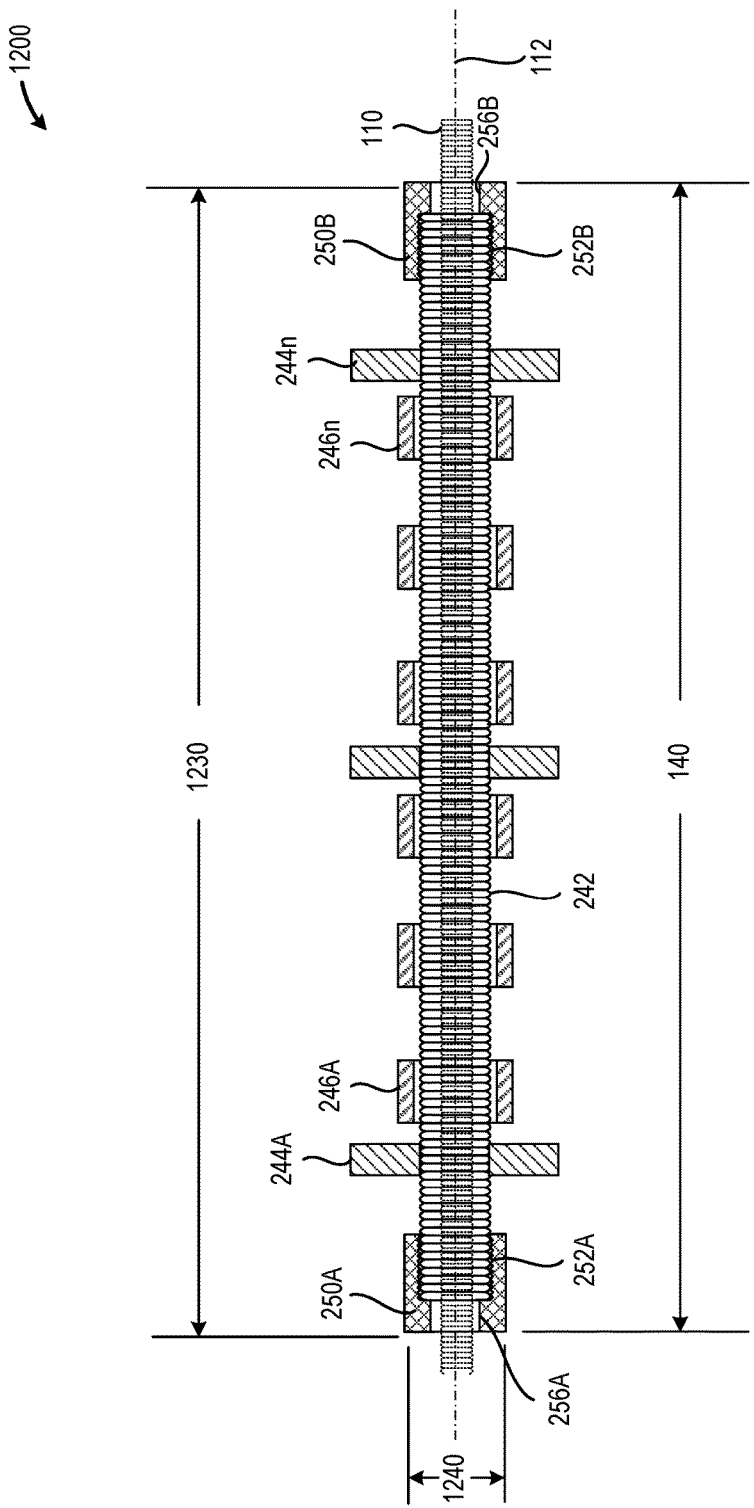
FIG. 12D is a cross-sectional elevation of an illustrative first flexible sleeve, such as depicted in FIGS. 12A and 12B, in accordance with at least one embodiment described herein.

FIG. 12A is a block diagram of an illustrative first flexible sleeve 140, in accordance with at least one embodiment described herein. FIG. 12B is an elevation of an illustrative flexible sleeve 140, in accordance with at least one embodiment described herein. FIG. 12C is a perspective view of an illustrative self-adjusting alignment bushing 250 included in the first flexible sleeve 140, in accordance with at least one embodiment described herein. FIG. 12D is a cross-sectional elevation of an illustrative first flexible sleeve 140, such as depicted in FIGS. 12A and 12B, in accordance with at least one embodiment described herein. As depicted in FIGS. 12A-12D, the first flexible sleeve 140 includes a first self-adjusting alignment bushing 250A coupled to the first end of the first flexible member 242 and a second self-adjusting alignment bushing 250B coupled to the second end of the first flexible member 242. Any number of fixed spacer elements 244A-244n and any number of floating spacer elements 246A-246n are disposed along the external surface of the first flexible member 242.

In embodiments, the self-adjusting alignment bushings 250 may be affixed to the first end and the second end of the first flexible member 242 such that the self-adjusting alignment bushings 250 are in fixed locations with respect to the longitudinal axis of the first flexible member 242. In other embodiments, the self-adjusting alignment bushings 250 may be threadedly coupled to or threadedly engage the external surface of the first flexible member 242 such that the longitudinal position of each self-adjusting alignment bushing 250A, 250B is variable with respect to the first flexible member 242. A depicted in FIGS. 12B, 12C, and 12D at least a portion of the internal surface of each self-adjusting alignment bushing 250 may be threaded (i.e., contain female threads) to accept the threaded insertion of the first flexible member 242. As depicted in FIG. 12D, an aperture 256A, 256B is formed in each of the self-adjusting alignment bushings 250 to permit the free passage of the flexible shaft 110 therethrough. Thus, the first flexible sleeve 140 is freely displaceable along the longitudinal axis of the flexible shaft 110. The first flexible sleeve 140 may have any axial length 1230 or diameter 1240 determined at least in part based on the diameter and/or size of the pipeline reinstatement tool 100. In embodiments, the first flexible sleeve 140 may have an axial length 1230 (i.e., a length measured along the longitudinal axis 112 of the flexible shaft 110) of: about 4 inches (in) or less; about 6 in or less; about 8 in or less; about 12 in or less; about 16 in or less; about 24 in or less; or about 36 in or less.

Figure 13A:
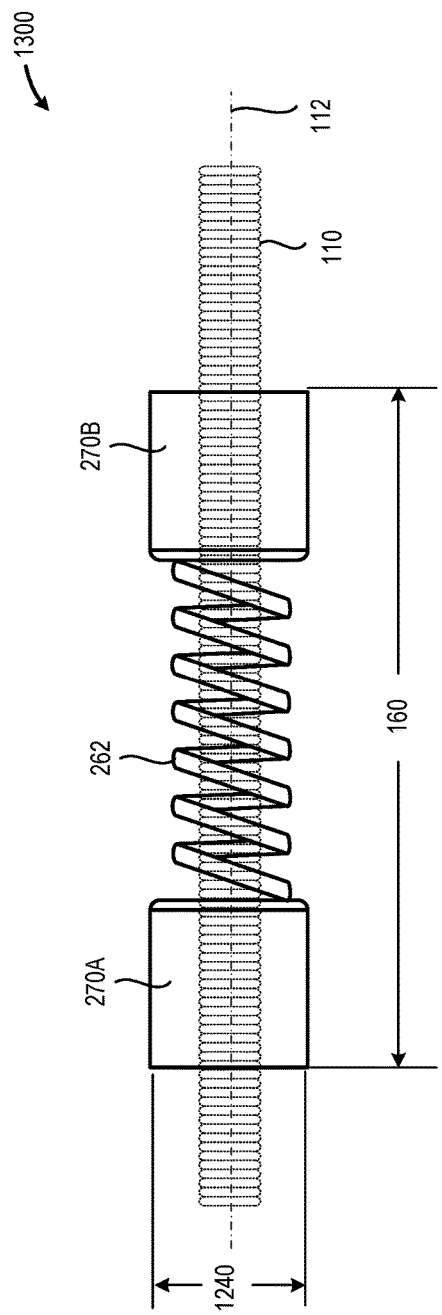
FIG. 13A is a side elevation of an illustrative compressible tensioner, in accordance with at least one embodiment described herein.
Figure 13B:
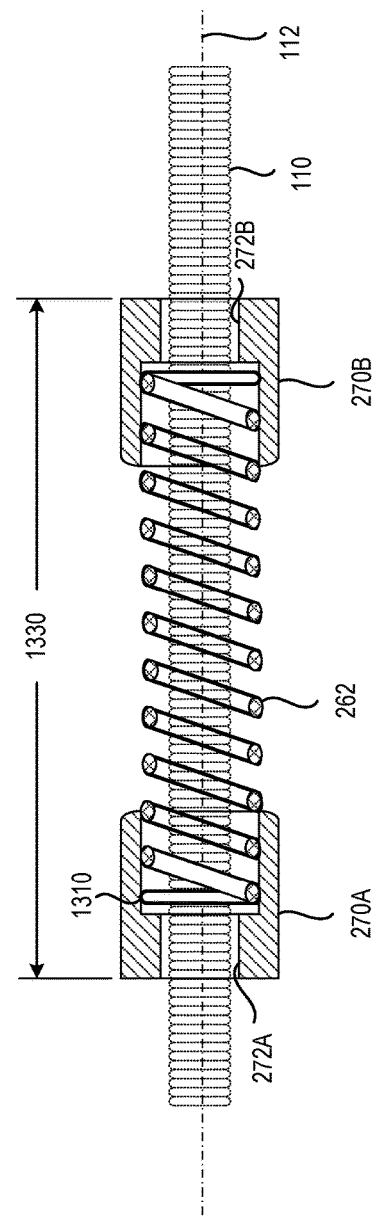
FIG. 13B is a cross-sectional elevation of the illustrative compressible tensioner, in accordance with at least one embodiment described herein.

FIG. 13A is a side elevation of an illustrative compressible tensioner 160, in accordance with at least one embodiment described herein. FIG. 13B is a cross-sectional elevation of the illustrative compressible tensioner 160, in accordance with at least one embodiment described herein. As depicted in FIGS. 13A and 13B, the compressible tensioner 160 includes a first annular connector 270 coupled to the first end 1310 of the compressible element 262 and a second annular connector coupled to the second end 1320 of the compressible element 262. Although the compressible element 262 is depicted as a helical coil spring in FIGS. 13A and 13B, other reversibly compressible elements and/or structures capable of providing free passage to the flexible shaft 110 may be substituted. In embodiments, the annular connectors 270A, 270B are affixed to the first end 1310 and second end 1320 of the compressible element 262, respectively. In other embodiments, the annular connectors 270A and 270B are detachably attached to the first end 1310 and second end 1320 of the compressible element 262, respectively.

As depicted in FIG. 13B, an aperture 272A and 272B is formed in each of the annular connectors 270A and 270B, respectively. The diameter of the apertures 272A, 272B permits the free passage of the flexible shaft 110 through the respective annular connector 270. Thus, the compressible tensioner 160 is freely displaceable along the longitudinal axis of the flexible shaft 110. The compressible tensioner 160 may have any axial length 1330 or diameter 1340 determined at least in part based on the diameter and/or size of the pipeline reinstatement tool 100. In embodiments, the compressible tensioner may have an axial length 1330 (along the longitudinal axis 112) of: about 2 inches (in) or less; about 3 in or less; about 4 in or less; about 6 in or less; about 8 in or less; about 10 in or less; or about 12 in or less. In embodiments, the axial length 1330 of the compressible tensioner 160 is less than the axial length of the first flexible sleeve 140. In embodiments, the axial length of the compressible tensioner 160 is less than the axial length of the second flexible sleeve 180. In other embodiments, the axial length of the compressible tensioner 160 is greater than the axial length of the second flexible sleeve 180.

Figure 14A:
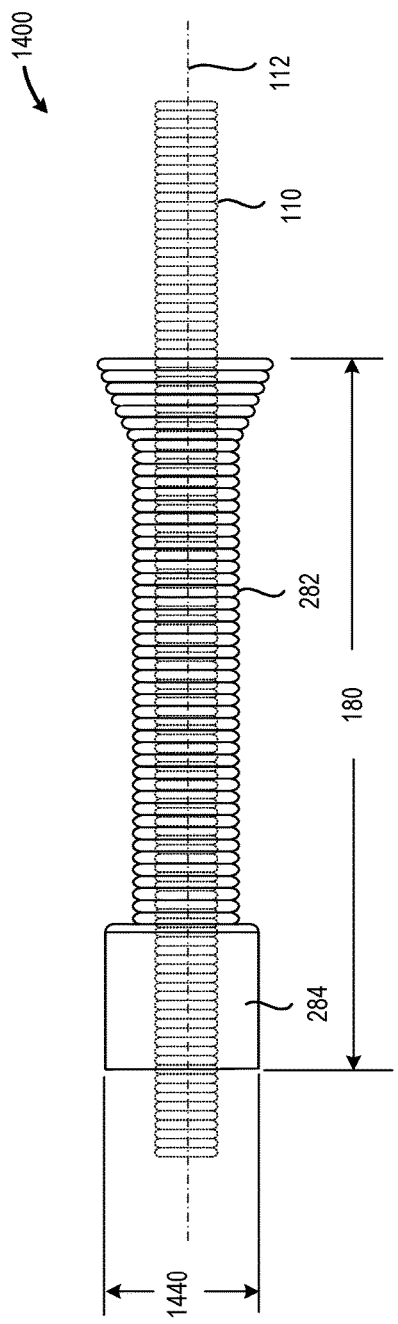
FIG. 14A is a side elevation of an illustrative second flexible sleeve, in accordance with at least one embodiment described herein.
Figure 14B:
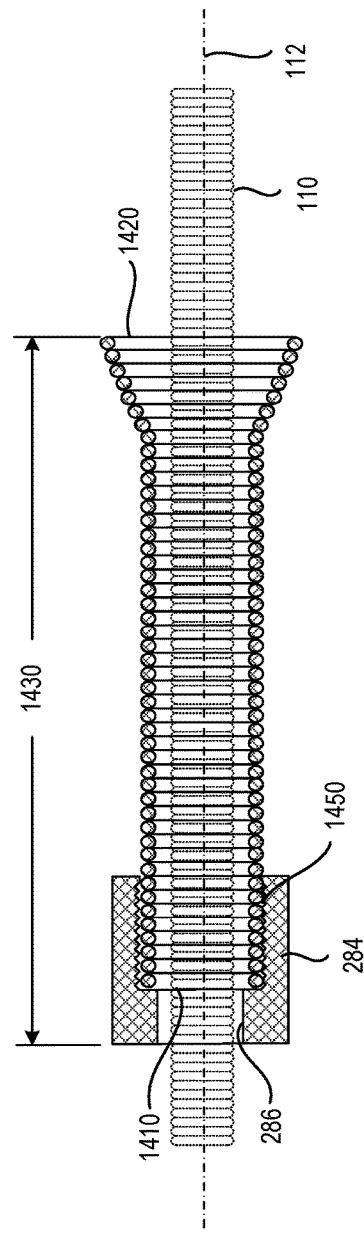
FIG. 14B is a cross-sectional elevation of the illustrative second flexible sleeve, in accordance with at least one embodiment described herein.

FIG. 14A is a side elevation of an illustrative second flexible sleeve 180, in accordance with at least one embodiment described herein. FIG. 14B is a cross-sectional elevation of the illustrative second flexible sleeve 180, in accordance with at least one embodiment described herein. As depicted in FIGS. 14A and 14B, the second flexible sleeve 180 includes a self-adjusting alignment bushing 284 coupled to the first end 1410 of the second flexible member 282. In embodiments, the second end 1420 of the second flexible member 282 is disposed proximate the coupling assembly 190 (not shown in FIGS. 14A and 14B). In embodiments, the self-adjusting alignment bushing 284 is affixed to the first end 1410 of the second flexible member 282. In other embodiments, the self-adjusting alignment bushing 284 is detachably attached to the first end 1410 of the second flexible member 282. In at least some embodiments, threads 1450 formed or otherwise disposed in, on, or about at least a portion of the internal surface of the self-adjusting alignment bushing 284 may threadedly engage at least a portion of the external surface of the second flexible member 282.

As depicted in FIG. 14B, an aperture 286 is formed in the self-adjusting alignment bushing 284. The diameter of the aperture 286 permits the free passage of the flexible shaft 110 through the respective self-adjusting alignment bushing 284. Thus, the second flexible sleeve 180 is freely displaceable along the longitudinal axis 112 of the flexible shaft 110. The second flexible sleeve 180 may have any axial length 1430 or diameter 1440 determined at least in part based on the diameter and/or size of the pipeline reinstatement tool 100. In embodiments, the second flexible sleeve 180 may have an axial length 1430 that is less than the axial length 1230 of the first flexible sleeve 1230. In embodiments, the length 1430 of the second flexible sleeve 180 is about: about 10% or less; about 20% or less; about 30% or less; about 40% or less; about 50% or less; about 60% or less; about 70% or less; about 80% or less; or about 90% or less of the axial length 1230 of the first flexible sleeve 140. Although no fixed spacer elements 244 or floating spacer elements 246 are depicted as being disposed about the second flexible member 282 in FIGS. 14A and 14B, any number and/or combination of fixed spacer elements 244 and floating spacer elements 246 may be disposed about all or a portion of the external surface of the second flexible member 282.

FIG. 15A is a side elevation view of an illustrative cutting head 1500 that includes an attachment member 236 having a plurality of apertures 1510A-1510n (collectively, "attachment member apertures 1510") formed therethrough, in accordance with at least one embodiment described herein. FIG. 15B is a rear elevation of the illustrative cutting head 1500 depicted in FIG. 15A, in accordance with at least one embodiment described herein. FIG. 15C is a front elevation view of the illustrative cutting head 1500 depicted in FIG. 15A, in accordance with at least one embodiment described herein.

As depicted in FIGS. 15A-15C, the cutting head 1500 is formed as a hollow cylindrical member 230 having a first end 1110, a second end 1120, an internal surface 232 and an external surface 234. An attachment member 236 is disposed transverse to the longitudinal axis of the cutting head 1500. The attachment member 236 includes a central aperture 238 sufficient in diameter to pass the flexible shaft 110. In embodiments, a plurality of attachment member apertures 1510 are formed through the attachment member 236. The attachment member apertures 1510 beneficially permit the passage of debris, detritus, and other materials through the cutting head 1500 as contact is maintained between the cutting head 1500 and the liner 820 disposed in the reinstated pipeline 810. The attachment member 236 may be formed integral with the hollow cylindrical member 230. The attachment member 236 may be formed separate from the hollow cylindrical member 230 and affixed to the internal surface 232 of the hollow cylindrical member 230, for example by welding, thermal bonding, chemical bonding, or compression fitting. The attachment member 236 may be detachably attached to the hollow cylindrical member 230, for example using threaded fasteners, snap rings, or similar attachment devices.

An attachment sleeve 1130 may be affixed to the attachment member 236. In embodiments, the attachment sleeve 1130 may include a hollow cylindrical member having a central aperture sufficient to permit the passage of the flexible shaft 110 therethrough. A plurality of shaft fasteners 1132 are disposed radially about the attachment sleeve 1130. The shaft fasteners detachably attach the cutting head 1100 to the flexible shaft 110. In at least some embodiments, the shaft fasteners 1132 may include set screws or similar threaded fasteners disposed radially about the attachment sleeve 1100 at equal angles (e.g., 3 fasteners 254 at 120°) or unequal angles (e.g., 3 shaft fasteners, the first two positioned at 90° with respect to each other, the third positioned at 135° with respect to each of the first two).

Figure 16C:
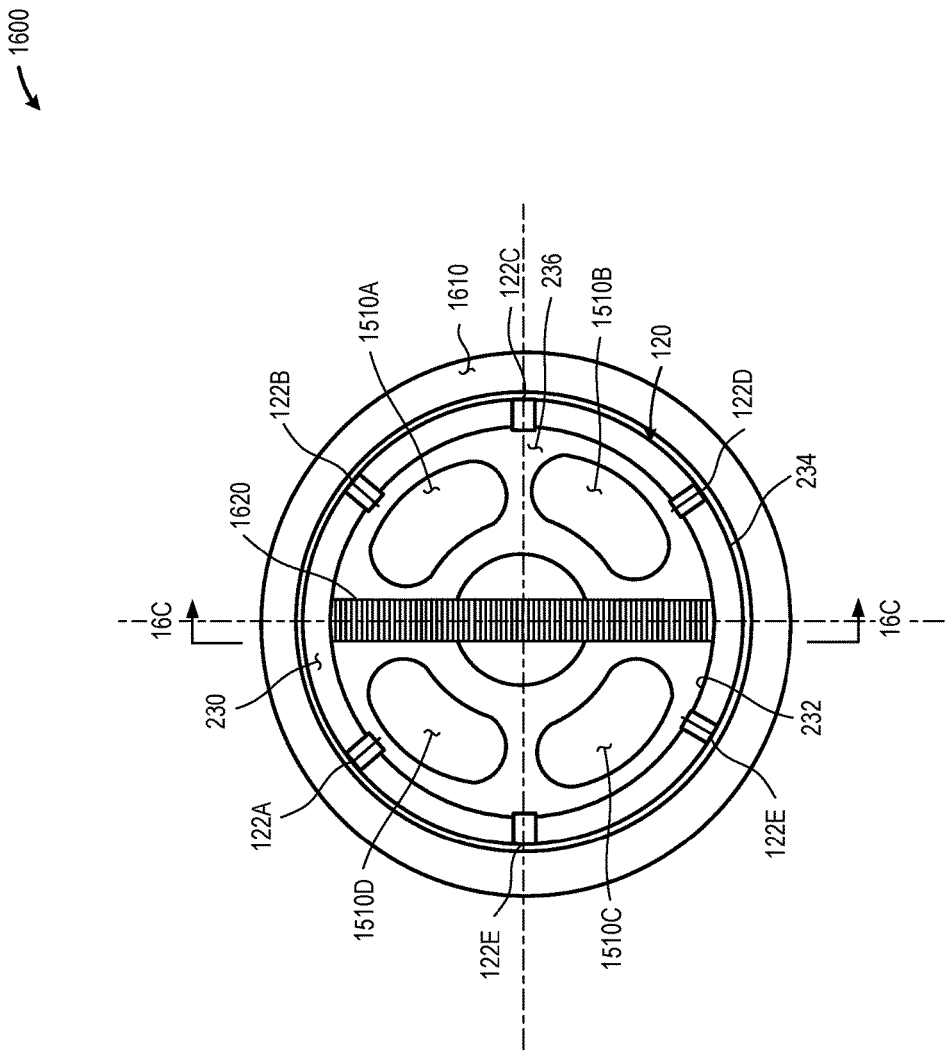
FIG. 16C is a front-elevation view of the illustrative assembled two-piece cutting head as depicted in FIG. 16B, in accordance with at least one embodiment described herein.
Figure 16D:
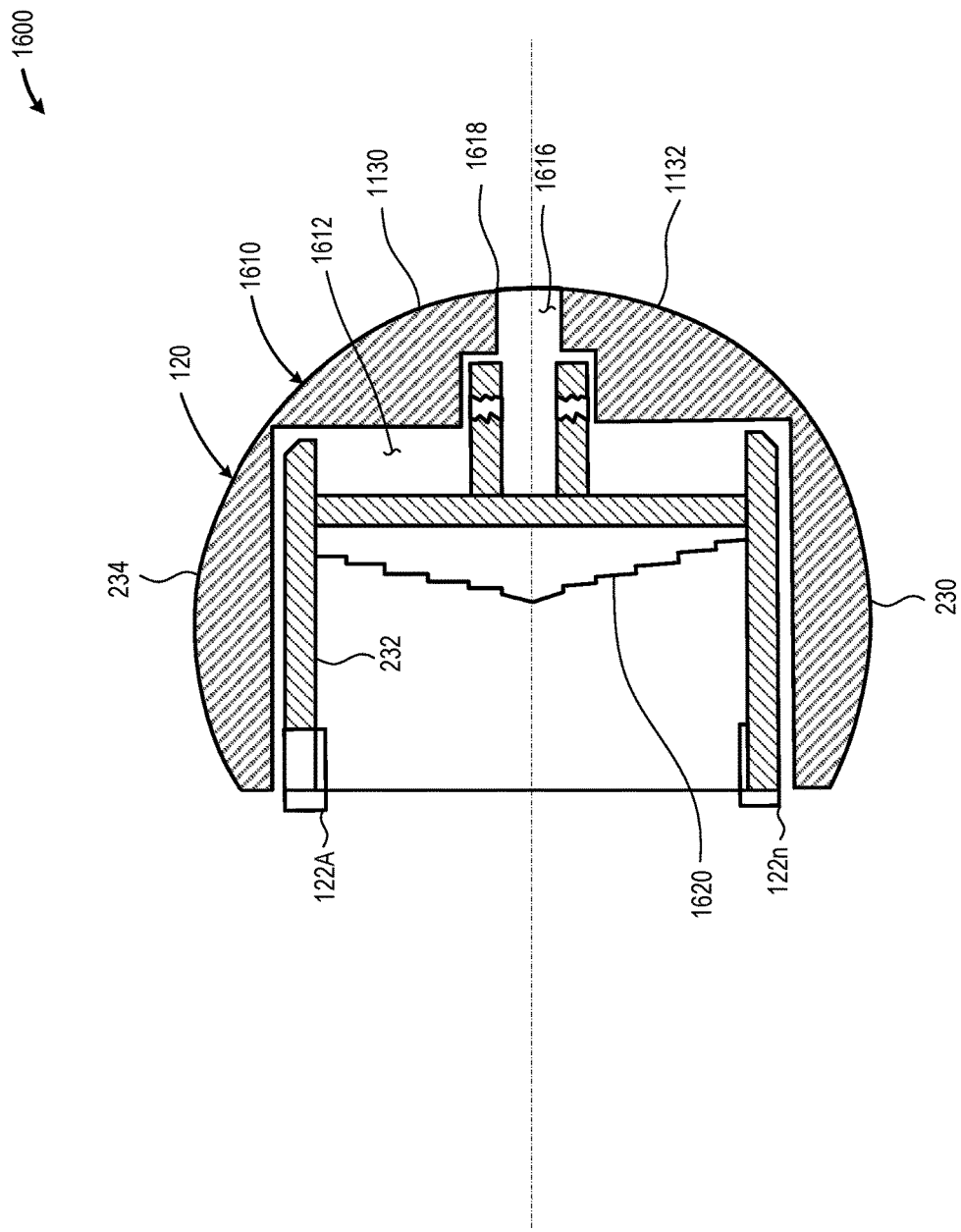
FIG. 16D is a cross-sectional elevation of the illustrative assembled two-piece cutting head as depicted in FIG. 16C along sectional line 16D-16D, in accordance with at least one embodiment described herein.
Figure 16F:
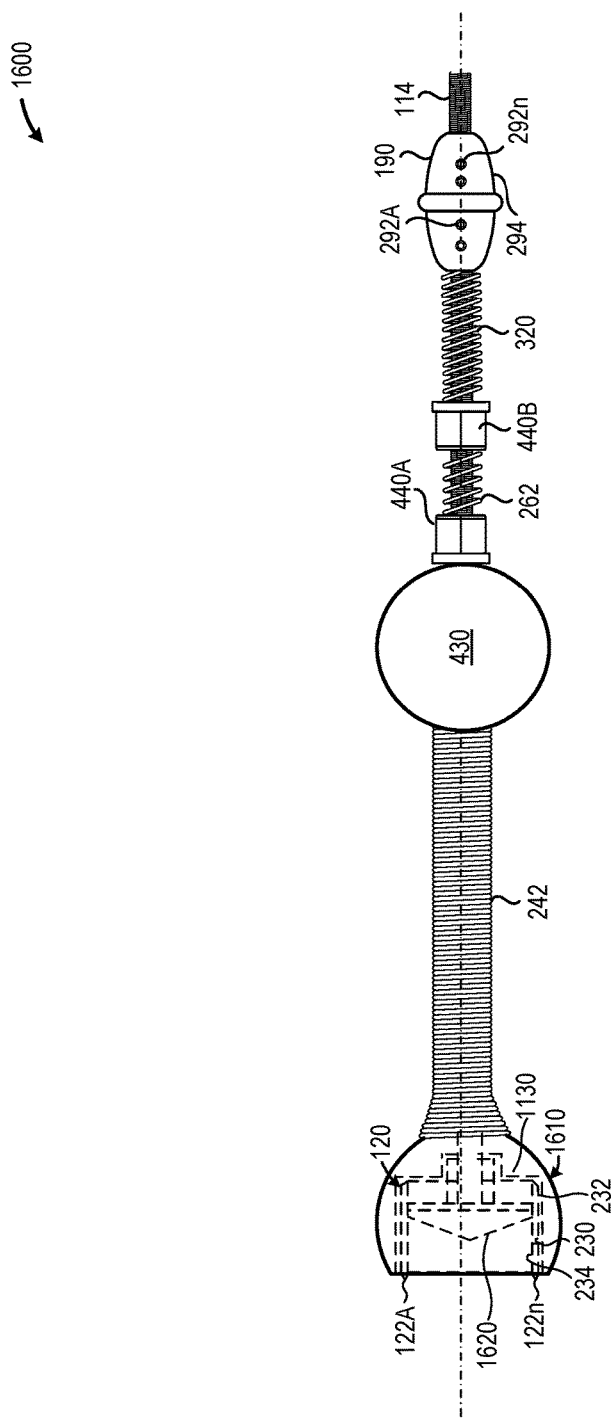
FIG. 16F is a side elevation of an illustrative pipeline reinstatement tool that includes the illustrative two-piece cutting head 1600 depicted in FIGS. 16A-16E, in accordance with at least one embodiment described herein.

FIG. 16A depicts a side elevation view of an illustrative two-piece cutting head system 1600 that includes a cutting head 120 that is separated from and slideably insertable into a hemispherical floating spacer member 1610 that is slideably displaceable along the longitudinal axis 112 of the flexible shaft 110, in accordance with at least one embodiment described herein. FIG. 16B depicts a side elevation view of the illustrative two-piece cutting head 1600 as depicted in FIG. 16A in an assembled state, with the cutting head 120 inserted into the hemispherical floating spacer member 1610, in accordance with at least one embodiment described herein. FIG. 16C depicts a front-elevation view of the illustrative assembled two-piece cutting head 1600 as depicted in FIG. 16B, in accordance with at least one embodiment described herein. FIG. 16D is a cross-sectional elevation of the illustrative assembled two-piece cutting head 1600 as depicted in FIG. 16C along sectional line 16D-16D, in accordance with at least one embodiment described herein. FIG. 16E depicts a rear-elevation view of the illustrative assembled two-piece cutting head 1600 as depicted in FIG. 16B, in accordance with at least one embodiment described herein. FIG. 16F depicts a side elevation of an illustrative pipeline reinstatement tool that includes the illustrative two-piece cutting head 1600 depicted in FIGS. 16A-16E, in accordance with at least one embodiment described herein.

As depicted in FIGS. 16A-16E. in embodiments, the cutting head 120 may be slideably insertable in a cavity formed in a hemispherical floating spacer element 1610. In operation, a force is applied along the longitudinal axis 112 of the flexible member 110, the hemispherical floating spacer element 1610 may be displaced along the flexible member, exposing the cutting head 120. In embodiments, the cavity formed in the hemispherical floating spacer element 1610 may include a plurality of portions, such as a first portion 1612 to accommodate the slideable insertion of the cylindrical member 230, a second portion 1614 coupled to the first portion 1612 to accommodate the slideable insertion of the attachment sleeve 1130, and a third portion 1616 coupled to the second portion 1614 having an aperture 1618 formed therethrough to permit the passage of the flexible shaft 110.

The hemispherical floating spacer element 1610 may have any outside diameter. In embodiments, the diameter of the hemispherical floating spacer element 1610 may be selected or otherwise determined based on the diameter of the lateral pipeline 830 through which the pipeline reinstatement tool passes to reach the reinstated pipeline 810. In embodiments, the hemispherical floating spacer element 1610 may have a diameter of: between ¼ inch (in) and 1.00 in; 1¹⁄₁₆ in and 2.00 in; 2¹⁄₁₆ in and 3.00 in; 3¹⁄₁₆ in and 4.00 in; 4¹⁄₁₆ in and 5.00 in; or 5¹⁄₁₆ in and 6.00 in.

The hemispherical floating spacer element 1610 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture 1618 formed through the hemispherical floating spacer element 1610 permits the passage of the flexible shaft 110 through the hemispherical floating spacer element 1610. The inside diameter of the aperture 1618 is larger than the outside diameter of the flexible shaft 110 thereby permitting the axial displacement of the hemispherical floating spacer element 1610 along the flexible shaft 110.

The two-piece cutting head system 1600 includes a cutting head 120 having a plurality of cutting teeth 122A-122n. In embodiments, the outer edge of each of the cutting teeth 122 is flush with the external surface 234 of the hollow cylindrical member 230 (i.e., the outside diameter of the circle formed by the cutting teeth 122 is identical to or slightly smaller than the outside diameter of the hollow cylindrical member 230). In such embodiments, the cutting head, including all or a portion of each of the plurality of cutting teeth 122 may be slideably inserted to the cavity formed in the hemispherical floating spacer element 1610. Although six (6) cutting teeth are depicted in FIGS. 16A-16E, the cutting head 120 included in the system 1600 may include any number of symmetrically or asymmetrically disposed cutting teeth 122. Although the cutting teeth 122 are depicted as having a similar triangular or pyramidal cutting edge, in embodiments some or all of the cutting teeth 122 may have the same or different cutting profiles.

As depicted in FIGS. 16A-16E, in embodiments, the cutting head 120 may include a button removal feature 1620 disposed at least partially within the hollow cylindrical member 230. As depicted in FIGS. 16A-16E, the button removal feature 1620 may include a pyramidal or stepped pyramidal blade feature intended to beneficially damage or reduce the size of the rigid liner "button" removed by the two-piece cutting head system 1600 from the liner 820 within the reinstated pipeline 810 thereby easing the flushing of the "button" from the reinstated pipeline 810. The cutting head 120 includes an attachment member 236 having a plurality of apertures 1510A-1510D formed therethrough.

As depicted in FIGS. 16A-16E, the cutting head 120 is formed as a hollow cylindrical member 230 having a first end 1110, a second end 1120, an internal surface 232 and an external surface 234. An attachment member 236 is disposed transverse to the longitudinal axis of the cutting head 1500. The attachment member 236 includes a central aperture 238 sufficient in diameter to pass the flexible shaft 110. In embodiments, a plurality of attachment member apertures 1510 are formed through the attachment member 236. The attachment member apertures 1510 beneficially permit the passage of debris, detritus, and other materials through the cutting head 120 as contact is maintained between the cutting head 1500 and the liner 820 disposed in the reinstated pipeline 810. The attachment member 236 may be formed integral with the hollow cylindrical member 230. The attachment member 236 may be formed separate from the hollow cylindrical member 230 and affixed to the internal surface 232 of the hollow cylindrical member 230, for example by welding, thermal bonding, chemical bonding, or compression fitting. The attachment member 236 may be detachably attached to the hollow cylindrical member 230, for example using threaded fasteners, snap rings, or similar attachment devices.

An attachment sleeve 1130 may be affixed to the attachment member 236. In embodiments, the attachment sleeve 1130 may include a hollow cylindrical member having a central aperture sufficient to permit the passage of the flexible shaft 110 therethrough. A plurality of shaft fasteners 1132 are disposed radially about the attachment sleeve 1130. The shaft fasteners detachably attach the cutting head 1100 to the flexible shaft 110. In at least some embodiments, the shaft fasteners 1132 may include set screws or similar threaded fasteners disposed radially about the attachment sleeve 1100 at equal angles (e.g., 3 fasteners each at 120° with respect to the other fasteners) or unequal angles (e.g., 3 shaft fasteners, the first two positioned at 90° with respect to each other, the third positioned at 135° with respect to each of the first two).

Finally referring to FIG. 16F, in operation, as a longitudinal force is applied along the flexible shaft 110, the compressible member 262 included in the compressible tensioner 160 and/or the compressible member 320 included in second flexible sleeve 320 are compressed, allowing a displacement of the floating spacer element 1610 along the flexible shaft 110. Since the cutting head 120 is affixed to the flexible shaft 110, as the floating spacer element 1610 is displaced along the flexible shaft 110, the cutting head is exposed, thereby allowing the cutting head to penetrate the liner 820 within the reinstated pipeline 810.

Figure 17C:
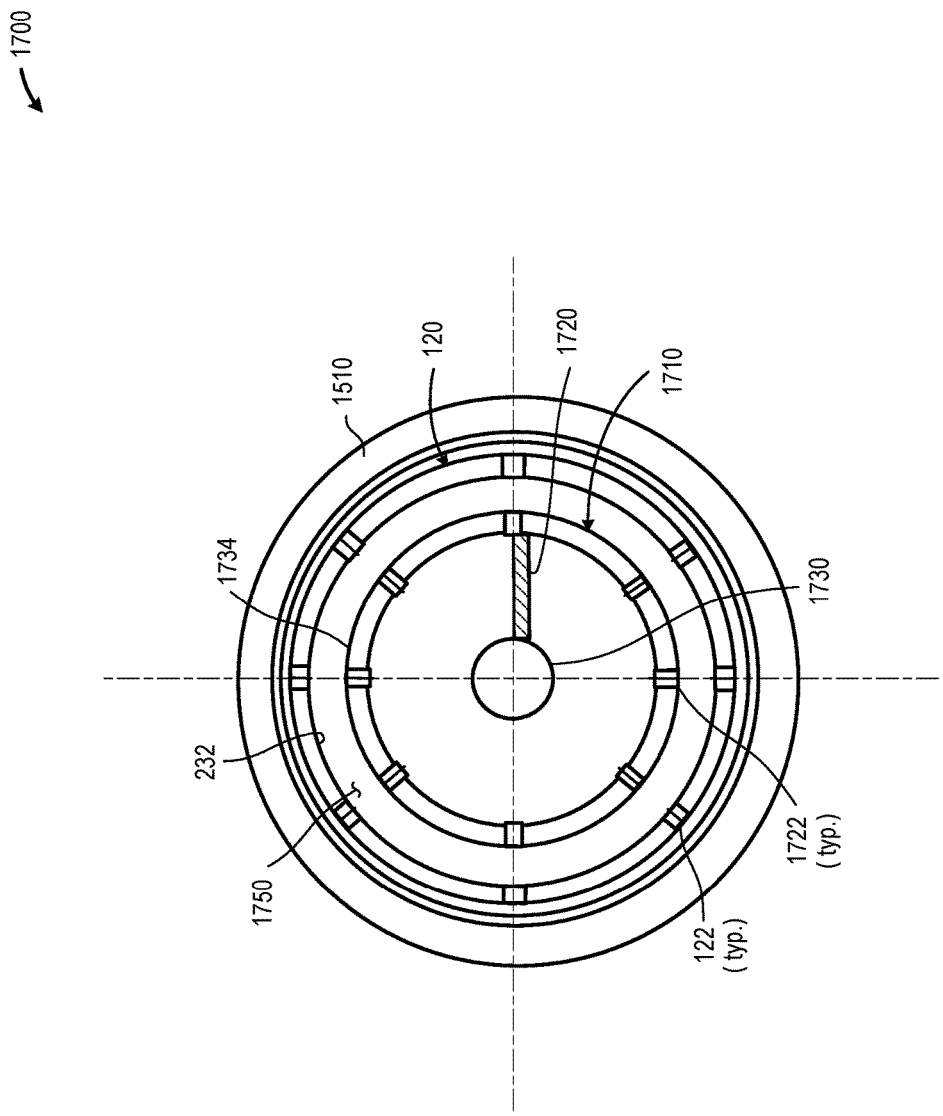
FIG. 17C is a front-elevation view of the illustrative assembled dual-blade cutting head as depicted in FIG. 17B, in accordance with at least one embodiment described herein.
Figure 17D:
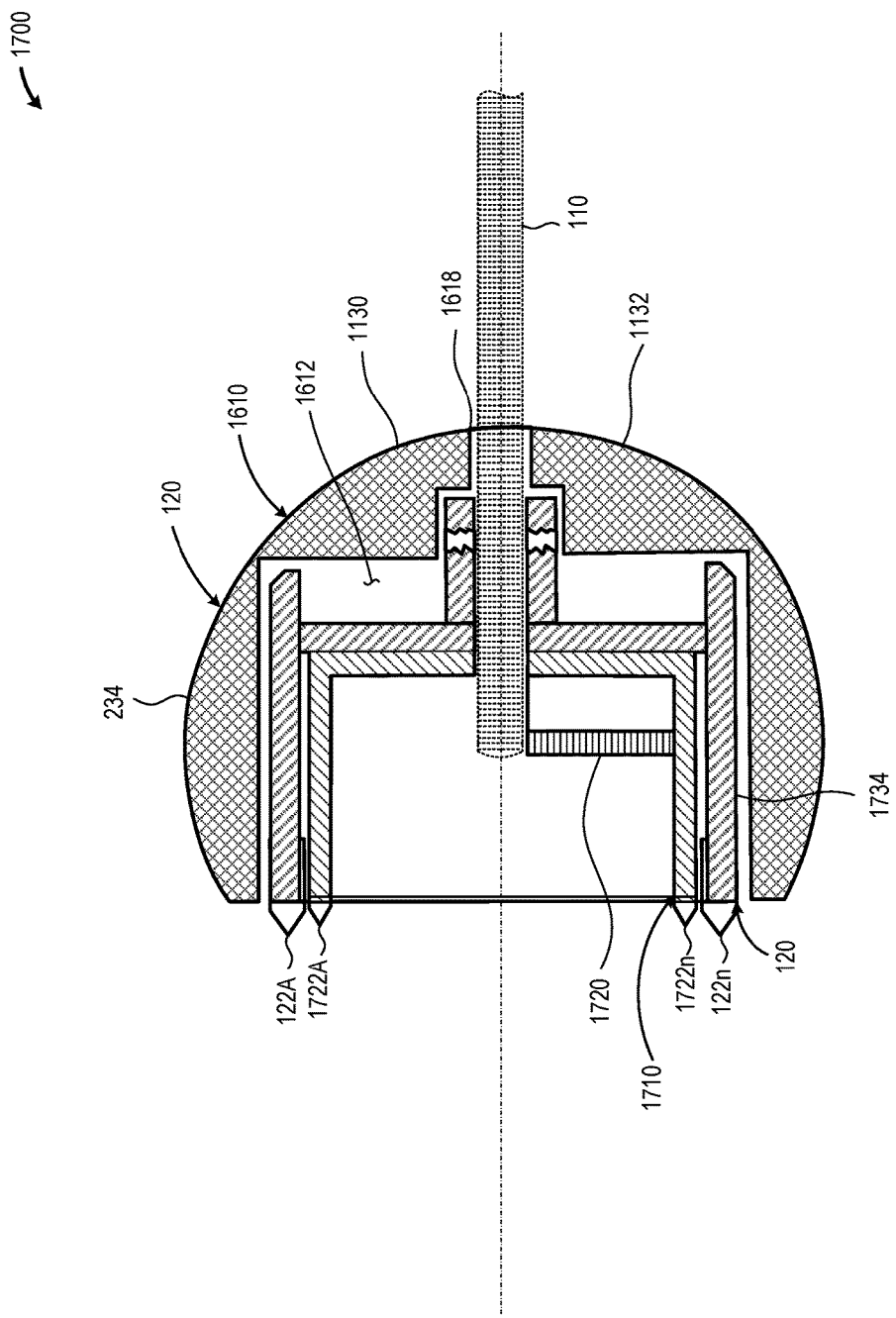
FIG. 17D is a cross-sectional elevation of the illustrative assembled dual-blade cutting head as depicted in FIG. 17C along sectional line 17D-17D, in accordance with at least one embodiment described herein.
Figure 17E:
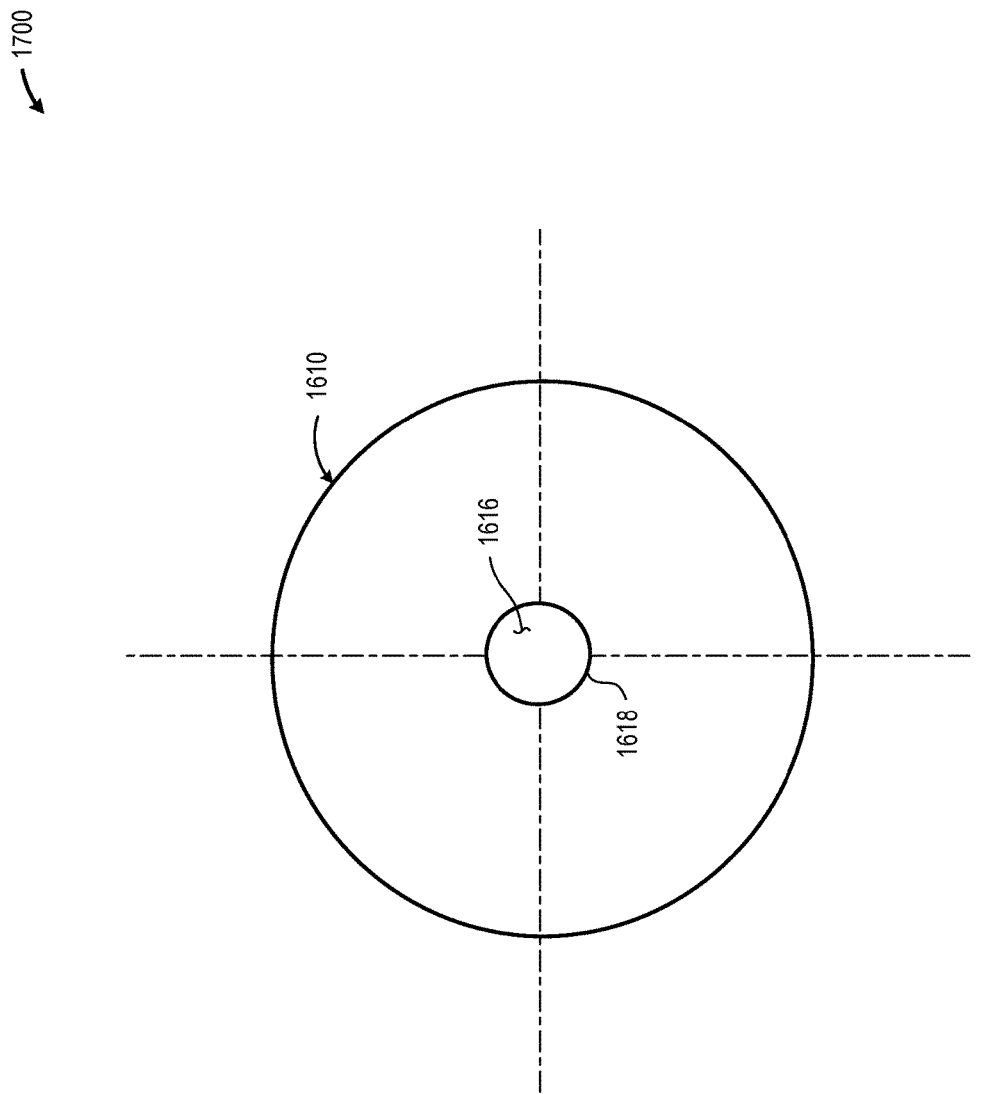
FIG. 17E is a rear-elevation view of the illustrative assembled dual-blade cutting head 1700 as depicted in FIG. 17B, in accordance with at least one embodiment described herein.
Figure 17F:
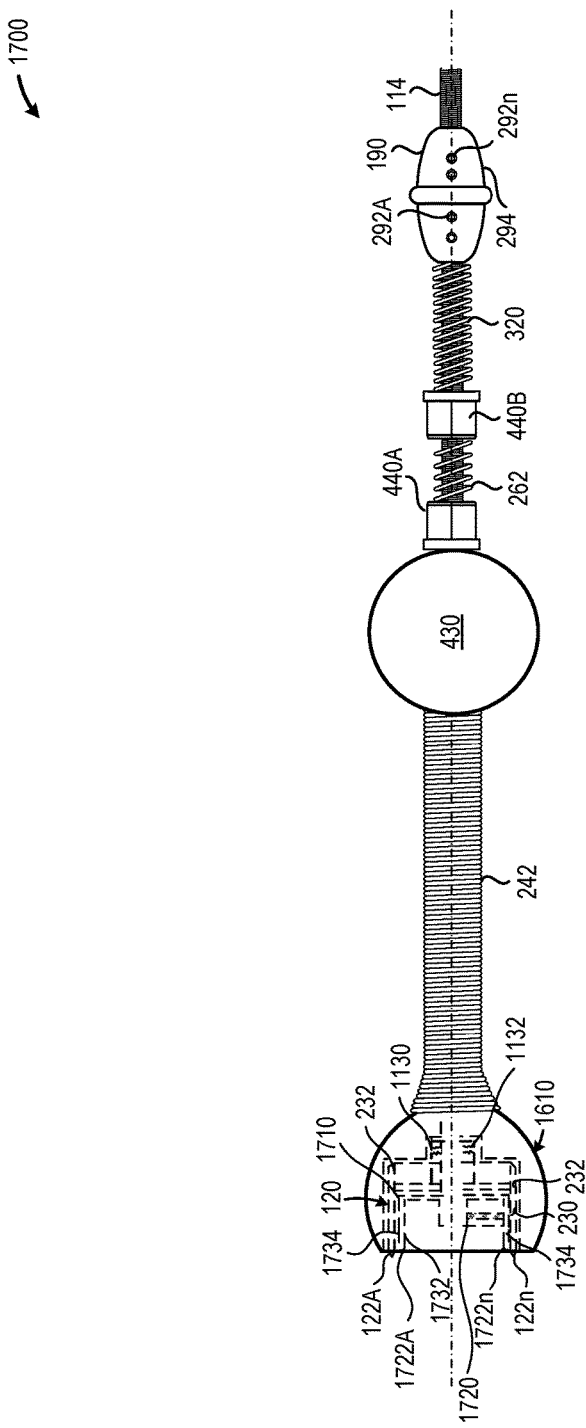
FIG. 17F is a side elevation of an illustrative pipeline reinstatement tool that includes the illustrative dual-blade cutting head 1700 depicted in FIGS. 17A-17E, in accordance with at least one embodiment described herein.

FIG. 17A depicts a side elevation view of an illustrative dual-blade cutting head system 1700 that includes a second cutting head 1710 disposed coaxially with and at least partially within the first cutting head 120, such that the dual-blade cutting head formed by the first cutting head 120 and the second cutting head 1710 are slideably insertable into a hemispherical floating spacer member 1610 that is slideably displaceable along the longitudinal axis 112 of the flexible shaft 110, in accordance with at least one embodiment described herein. FIG. 17B depicts a side elevation view of the illustrative dual-blade cutting head 1700 as depicted in FIG. 17A in an assembled state, with the first cutting head 120 affixed to the second cutting head 1710 and inserted into the hemispherical floating spacer member 1610, in accordance with at least one embodiment described herein. FIG. 17C depicts a front-elevation view of the illustrative assembled dual-blade cutting head 1700 as depicted in FIG. 17B, in accordance with at least one embodiment described herein. FIG. 17D is a cross-sectional elevation of the illustrative assembled dual-blade cutting head 1700 as depicted in FIG. 17C along sectional line 17D-17D, in accordance with at least one embodiment described herein. FIG. 17E depicts a rear-elevation view of the illustrative assembled dual-blade cutting head 1700 as depicted in FIG. 17B, in accordance with at least one embodiment described herein. FIG. 17F depicts a side elevation of an illustrative pipeline reinstatement tool that includes the illustrative dual-blade cutting head 1700 depicted in FIGS. 17A-17E, in accordance with at least one embodiment described herein.

As depicted in FIGS. 17A-17E, in embodiments, the dual-blade cutting head system 1700 includes a first cutting head 120 having a plurality of cutting teeth 122A-122n and a second cutting head 1710 having a second plurality of cutting teeth 1722A-1722n. In embodiments, the second cutting head 1710 is disposed at least partially within the hollow cylindrical member 230 forming the first cutting head 120. In embodiments, the outside diameter of the second cutting head 1700 is less than the inside diameter of the first cutting head 120 such that a gap 1750 exists between the outer surface 1734 of the second cutting head 1710 and the inner surface 232 of the first cutting head 120. In embodiments, the second cutting head 1710 is affixed to the first cutting head 120, for example, by welding, chemically bonding, or thermally boding at least a portion of the second cutting head 1710 to the attachment member 236 of the first cutting head 120. As depicted in FIGS. 17A-17E, the second cutting head 1710 beneficially damages or reduces the size of the rigid liner "button" removed by the dual-blade cutting head system 1700 from the liner 820 within the reinstated pipeline 810 thereby easing the flushing of the "button" from the reinstated pipeline 810. In embodiments, the plurality of cutting teeth 122 on the first cutting head 120 may be coplanar with the second plurality of cutting teeth 1722 on the second cutting head 1710. In other embodiments, the plane of the second plurality of cutting teeth 1722 may be positioned or recessed behind the plane of the plurality of cutting teeth 122 on the first cutting head 120 (i.e., the plurality of cutting teeth 122 may project beyond the second plurality of cutting teeth 1722). In yet other embodiments, the plane of the plurality of cutting teeth 122 on the first cutting head 120 may be positioned or recessed behind the second plurality of cutting teeth 1722 on the second cutting head 1710 (i.e., the second plurality of cutting teeth 1722 may project beyond the plurality of cutting teeth 122).

In embodiments, the outer edge of each of the cutting teeth 1722 is flush with the external surface 1734 of the second cutting head 1710 (i.e., the outside diameter of the circle formed by the second plurality of cutting teeth 1722 is identical to or slightly smaller than the outside diameter of the second cutting head 1710). Although the second plurality of cutting teeth 1722 includes eight (8) cutting teeth as depicted in FIGS. 17A-17E, the second cutting head 1710 may include a second plurality of cutting teeth 1722 having any number of symmetrically or asymmetrically disposed teeth. Although each of the second plurality of cutting teeth 1722 are depicted as having a similar triangular or pyramidal cutting edge, in embodiments, each of some or all of the second plurality of cutting teeth 1722 may have the same or different cutting profiles.

As depicted in FIGS. 17A-17E, in some embodiments, a button removal feature 1720 may be disposed at least partially within the second cutting head 1710. As depicted in FIGS. 17A-17E, the button removal feature 1720 may include a sharpened edge or blade feature that destroys, fractures, fragments, damages, or otherwise reduces the size and/or diameter of the rigid liner "button" removed from the liner 820 by the dual-blade cutting head system 1700, thereby easing the flushing of the "button" from the reinstated pipeline 810. Although omitted from FIGS. 17A-17E, in embodiments, the dual-blade cutting head 1700 may include an attachment member having one or more apertures that fluidly connect the inner volume of the second cutting head 1710 with the exterior volume above the attachment member 236 of the first cutting head 120. In embodiments, the button removal feature 1720 may be formed integral with the second cutting head 1710, for example via casting. In other embodiments, the button removal feature 1720 may be separately formed and coupled, attached, or otherwise affixed to the internal surface 1732 and/or second end of the second cutting head 1710.

As depicted in FIGS. 17A-17E, the second cutting head 1710 is formed as a hollow cylindrical member having a first end that includes the second plurality of cutting teeth 1722, a second end disposed proximate the attachment member 236 of the first cutting head 120, an internal surface 1732 and an external surface 1734. In embodiments, the second end of the second cutting head 1710 includes a central aperture sufficient in diameter to permit passage of the flexible shaft 110. In embodiments, the second end of the second cutting head 1722 may be permanently affixed to the attachment member 236 of the first cutting head 120 via welding, thermal bonding, chemical bonding, press-fitting, riveting, or similar. In embodiments, the second end of the second cutting head 1722 may be detachably attached or coupled to the attachment member 236 of the first cutting head 120 via one or more threaded couplings, threaded fasteners, set screws, or similar.

Finally referring to FIG. 17F, in operation, as a longitudinal force is applied along the flexible shaft 110, the compressible member 262 included in the compressible tensioner 160 and/or the compressible member 320 included in second flexible sleeve 320 are compressed, allowing a displacement of the floating spacer element 1610 along the flexible shaft 110. Since the cutting head 120 is affixed to the flexible shaft 110, as the floating spacer element 1610 is displaced along the flexible shaft 110, the cutting head is exposed, thereby allowing the cutting head to penetrate the liner 820 within the reinstated pipeline 810.

Figure 18C:
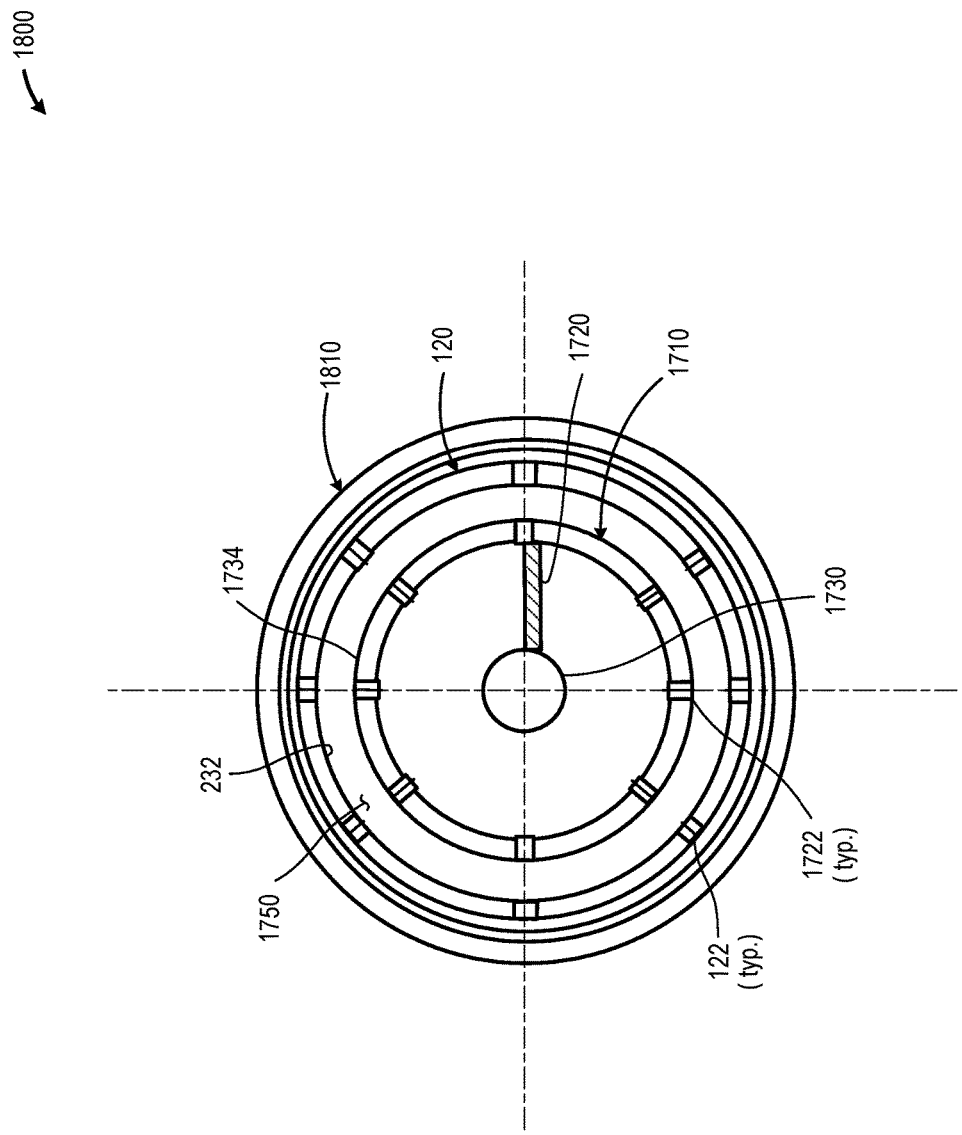
FIG. 18C is a front-elevation view of the illustrative assembled dual-blade cutting head as depicted in FIG. 18B, in accordance with at least one embodiment described herein.
Figure 18D:
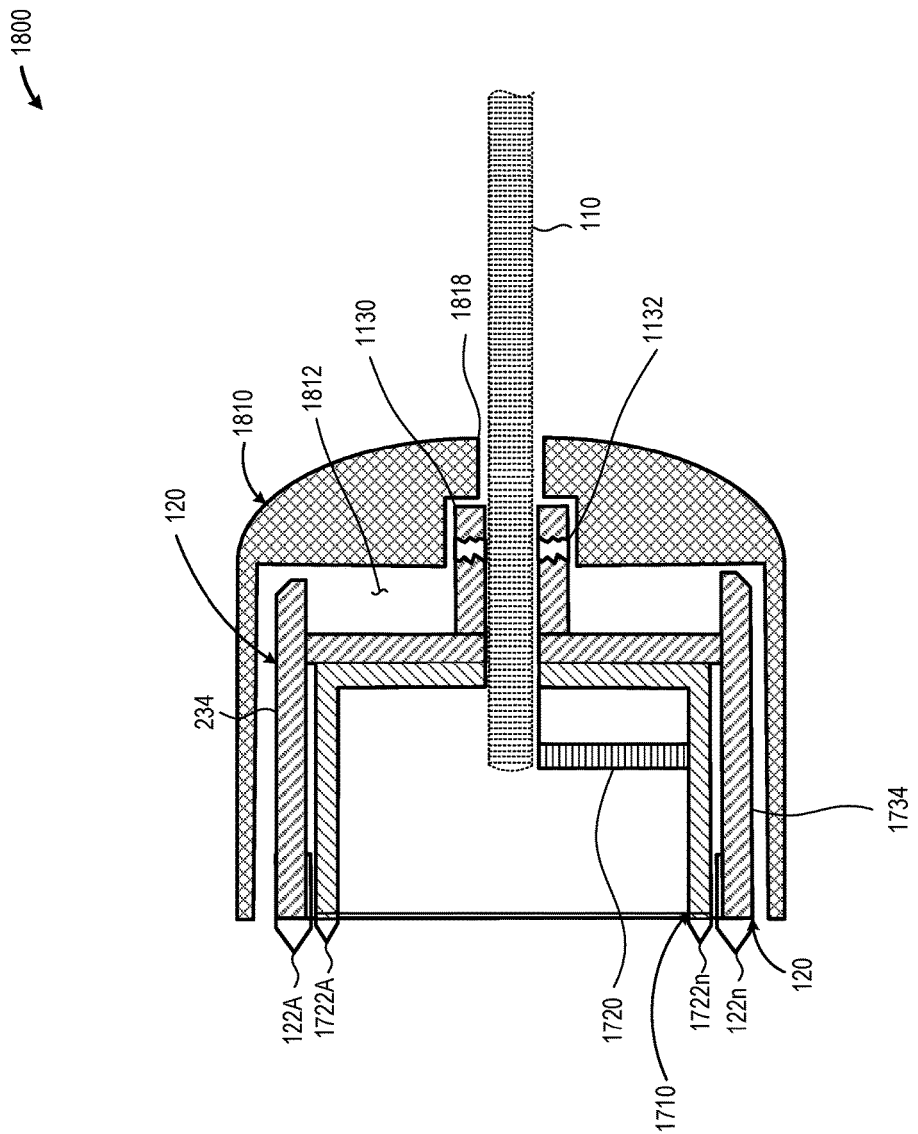
FIG. 18D is a cross-sectional elevation of the illustrative assembled dual-blade cutting head as depicted in FIG. 18C along sectional line 18D-18D, in accordance with at least one embodiment described herein.
Figure 18F:
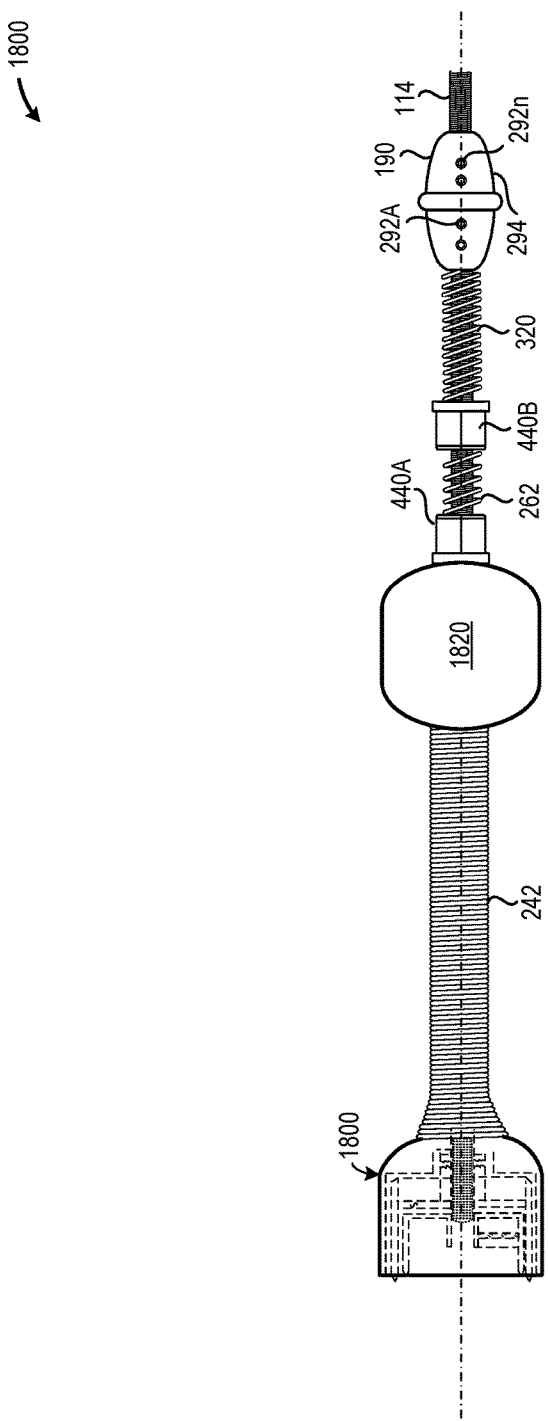
FIG. 18F is a side elevation of an illustrative pipeline reinstatement tool that includes the illustrative dual-blade cutting head 1800 depicted in FIGS. 18A-18E, in accordance with at least one embodiment described herein.

FIG. 18A depicts a side elevation view of an illustrative dual-blade cutting head system 1800 that includes a second cutting head 1710 disposed coaxially with and at least partially within the first cutting head 120, such that the dual-blade cutting head formed by the first cutting head 120 and the second cutting head 1710 are slideably insertable into a cylindrical floating spacer member 1810 that is slideably displaceable along the longitudinal axis 112 of the flexible shaft 110, in accordance with at least one embodiment described herein. FIG. 18B depicts a side elevation view of the illustrative dual-blade cutting head 1800 as depicted in FIG. 18A in an assembled state, with the first cutting head 120 affixed to the second cutting head 1710 and inserted into the cylindrical floating spacer member 1810, in accordance with at least one embodiment described herein. FIG. 18C depicts a front-elevation view of the illustrative assembled dual-blade cutting head 1800 as depicted in FIG. 18B, in accordance with at least one embodiment described herein. FIG. 18D is a cross-sectional elevation of the illustrative assembled dual-blade cutting head 1800 as depicted in FIG. 18C along sectional line 18D-18D, in accordance with at least one embodiment described herein. FIG. 18E depicts a rear-elevation view of the illustrative assembled dual-blade cutting head 1800 as depicted in FIG. 18B, in accordance with at least one embodiment described herein. FIG. 18F depicts a side elevation of an illustrative pipeline reinstatement tool that includes the illustrative dual-blade cutting head 1800 depicted in FIGS. 18A-18E, in accordance with at least one embodiment described herein.

As depicted in FIGS. 18A-18E. in embodiments, the cutting head 120 may be slideably insertable in a cavity formed in a cylindrical floating spacer element 1810. In operation, a force is applied along the longitudinal axis 112 of the flexible member 110, the hemispherical floating spacer element 1610 may be displaced along the flexible member, compressing the compressible element 262 in the compressible tensioner 160 and/or the compressible element 320 in the second flexible sleeve 180, thereby exposing the cutting head 120. In embodiments, the cavity formed in the cylindrical floating spacer element 1810 may include a plurality of portions, such as a first portion 1812 to accommodate the slideable insertion of the cylindrical member 230, a second portion 1814 coupled to the first portion 1812 to accommodate the slideable insertion of the attachment sleeve 1130, and a third portion 1816 coupled to the second portion 1614 having an aperture 1818 formed therethrough to permit the passage of the flexible shaft 110.

The cylindrical floating spacer element 1810 may have any outside diameter. In embodiments, the diameter of the cylindrical floating spacer element 1810 may be selected or otherwise determined based on the diameter of the lateral pipeline 830 through which the pipeline reinstatement tool passes to reach the reinstated pipeline 810. In embodiments, the cylindrical floating spacer element 1810 may have a diameter of: between ¼ inch (in) and 1.00 in; 1 1/16 in and 2.00 in; 2 1/16 in and 3.00 in; 3 1/16 in and 4.00 in; 4 1/16 in and 5.00 in; or 5 1/16 in and 6.00 in.

The cylindrical floating spacer element 1810 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture 1818 formed through the cylindrical floating spacer element 1810 permits the passage of the flexible shaft 110 through the cylindrical floating spacer element 1810. In embodiments, one or more bushings may be inserted into the aperture 1818 to accommodate the use of the cylindrical floating spacer element 1810 on different size flexible shafts 110. The inside diameter of the aperture 1818, and any bushings installed in the aperture 1818, is larger than the outside diameter of the flexible shaft 110 thereby permitting the axial displacement of the cylindrical floating spacer element 1810 along the flexible shaft 110.

As depicted in FIGS. 18A-18E, in embodiments, the dual-blade cutting head system 1800 includes a first cutting head 120 having a plurality of cutting teeth 122A-122n and a second cutting head 1710 having a second plurality of cutting teeth 1722A-1722n. In embodiments, the second cutting head 1710 is disposed at least partially within the hollow cylindrical member 230 forming the first cutting head 120. In embodiments, the outside diameter of the second cutting head 1700 is less than the inside diameter of the first cutting head 120 such that a gap 1750 exists between the outer surface 1734 of the second cutting head 1710 and the inner surface 232 of the first cutting head 120. In embodiments, the second cutting head 1710 is affixed to the first cutting head 120, for example, by welding, chemically bonding, and/or thermally boding at least a portion of the second cutting head 1710 to the attachment member 236 of the first cutting head 120.

As depicted in FIGS. 18A-18E, the second cutting head 1710 beneficially damages or reduces the size of the rigid liner "button" removed by the dual-blade cutting head system 1800 from the liner 820 within the reinstated pipeline 810 thereby easing the flushing of the "button" from the reinstated pipeline 810. In embodiments, the plurality of cutting teeth 122 on the first cutting head 120 may be coplanar with the second plurality of cutting teeth 1722 on the second cutting head 1710. In other embodiments, the plane of the second plurality of cutting teeth 1722 may be positioned or recessed behind the plane of the plurality of cutting teeth 122 on the first cutting head 120 (i.e., the plurality of cutting teeth 122 may project beyond the second plurality of cutting teeth 1722). In yet other embodiments, the plane of the plurality of cutting teeth 122 on the first cutting head 120 may be positioned or recessed behind the second plurality of cutting teeth 1722 on the second cutting head 1710 (i.e., the second plurality of cutting teeth 1722 may project beyond the plurality of cutting teeth 122).

In embodiments, the outer edge of each of the cutting teeth 1722 is flush with the external surface 1734 of the second cutting head 1710 (i.e., the outside diameter of the circle formed by the second plurality of cutting teeth 1722 is identical to or slightly smaller than the outside diameter of the second cutting head 1710). Although the second plurality of cutting teeth 1722 includes eight (8) cutting teeth as depicted in FIGS. 18A-18E, the second cutting head 1710 may include a second plurality of cutting teeth 1722 having any number of symmetrically or asymmetrically disposed teeth. Although each of the second plurality of cutting teeth 1722 are depicted as having a similar triangular or pyramidal cutting edge, in embodiments, each of some or all of the second plurality of cutting teeth 1722 may have the same or different cutting profiles.

As depicted in FIGS. 18A-18E, in some embodiments, a button removal feature 1720 may be disposed at least partially within the second cutting head 1710. As depicted in FIGS. 18A-18E, the button removal feature 1720 may include a sharpened edge or blade feature that destroys, fractures, fragments, damages, or otherwise reduces the size and/or diameter of the rigid liner "button" removed from the liner 820 by the dual-blade cutting head system 1700. Although omitted from FIGS. 18A-18E, in embodiments, the dual-blade cutting head 1800 may include an attachment member having one or more apertures that fluidly connect the inner volume of the second cutting head 1710 with the exterior volume above the attachment member 236 of the first cutting head 120. In embodiments, the button removal feature 1720 may be formed integral with the second cutting head 1710, for example via casting. In other embodiments, the button removal feature 1720 may be separately formed and coupled, attached, or otherwise affixed to the internal surface 1732 and/or second end of the second cutting head 1710.

As depicted in FIGS. 18A-18E, the second cutting head 1710 is formed as a hollow cylindrical member having a first end that includes the second plurality of cutting teeth 1722, a second end disposed proximate the attachment member 236 of the first cutting head 120, an internal surface 1732 and an external surface 1734. In embodiments, the second end of the second cutting head 1710 includes a central aperture sufficient in diameter to permit passage of the flexible shaft 110. In embodiments, the second end of the second cutting head 1722 may be permanently affixed to the attachment member 236 of the first cutting head 120 via welding, thermal bonding, chemical bonding, press-fitting, riveting, or similar. In embodiments, the second end of the second cutting head 1722 may be detachably attached or coupled to the attachment member 236 of the first cutting head 120 via one or more threaded couplings, threaded fasteners, set screws, or similar.

Finally referring to FIG. 18F, the pipeline reinstatement tool may include a cylindrical floating spacer element 1820 disposed between the first flexible sleeve 140 and the second flexible sleeve 180. In other embodiments, the cylindrical floating spacer element 1820 may be disposed between the first flexible sleeve 140 and the compressible tensioner 160. In yet other embodiments, the spherical floating spacer element 430 may be disposed between the second flexible sleeve 180 and the compressible tensioner 160. The outside diameter of the cylindrical floating spacer element 1820 may be similar to the outside diameter of the cylindrical spacer element 1810 disposed about the dual-blade cutting head 1800. In other embodiments, the cylindrical floating spacer element 1820 may have an outside diameter similar to the outside diameter of the circular path of the teeth 122 on the first cutting head 120. In yet other embodiments, the cylindrical floating spacer element 1820 may have an outside diameter that is smaller or less than the outside diameter 235 of the hollow cylindrical member 230 forming the first cutting head 120.

The spherical floating spacer element 1820 may be fabricated using any metallic, non-metallic, or composite material. Example metallic materials include but are not limited to: brass, bronze, stainless steel, or combinations thereof. Example non-metallic materials include but are not limited to: Lexan®; polypropylene; polyethylene; polytetrafluoroethylene (PTFE—Teflon®); or combinations thereof. An aperture formed through the cylindrical floating spacer element 1820 permits the passage of the flexible shaft 110 through the cylindrical floating spacer element 1820. The inside diameter of the aperture is larger than the outside diameter of the flexible shaft 110 thereby permitting the axial displacement of the cylindrical floating spacer element 1820 along the flexible shaft 110.

In operation, as a longitudinal force is applied along the flexible shaft 110 compresses the compressible member 262 included in the compressible tensioner 160 and/or the compressible member 320 included in second flexible sleeve 320, thereby allowing a displacement of the floating spacer element 1810 along the flexible shaft 110. Since the cutting head 120 is affixed to the flexible shaft 110, as the floating spacer element 1810 is displaced along the flexible shaft 110, the cutting head is exposed, thereby allowing the cutting head to penetrate the liner 820 within the reinstated pipeline 810.

FIG. 19A depicts an illustrative pipeline reinstatement tool 1900 in which the compressible tensioner 160 and the second flexible sleeve 180 have been combined to provide compressible tensioner sleeve 1910, in accordance with at least one embodiment described herein. FIG. 19B depicts the illustrative pipeline reinstatement tool 1900 depicted in FIG. 19A with an axially applied force ("F") 1930 causing the dual-blade cutting head to project from the cylindrical floating spacer element 1810, exposing the first cutter head 120 and the second cutter head 1710, in accordance with at least one embodiment described herein.

Referring first to FIG. 19A, the compressible tensioner sleeve 1910 includes a compressible element 1912 that may have a fixed or variable spring rate (e.g., where the compressible element comprises a helical coil spring, the coils may be evenly or unevenly spaced). In the absence of the axially applied force 1930 the compressible elements 1912 has a relatively longer first length ($L_1$) 1940.

Referring next to FIG. 19B, as the axial force 1930 is applied along the flexible shaft, the compressible member 1912 compresses to a relatively shorter second length ($L_2$) 1950. The reduction in length of the compressible member 1912 permits the displacement of the cylindrical floating spacer element 1810, the first flexible sleeve 140, and the cylindrical floating spacer element 1820 along the flexible shaft 110. The displacement of the cylindrical floating spacer element 1810 exposes the first cutter head 120 and the second cutter head 1710 allowing the pipeline reinstatement tool 1900 to penetrate the liner 820 in a reinstated pipeline 810.

Figure 20:
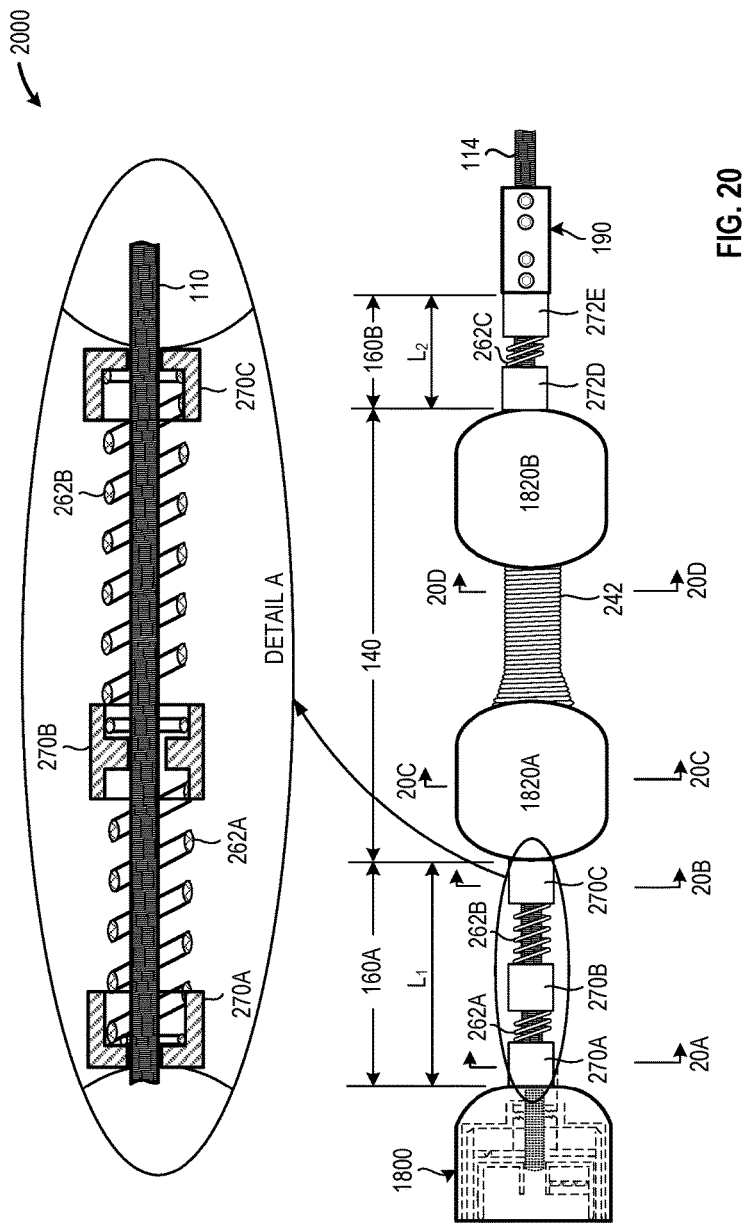
FIG. 20 is a side elevation view of an illustrative pipeline reinstatement tool that includes a flexible sleeve portion having a first cylindrical floating spacer element and a second cylindrical floating spacer element disposed along the flexible shaft and positioned between a first compressible tensioner section and a second compressible tensioner section, in accordance with at least one embodiment described herein.

FIG. 20 is a side elevation view of an illustrative pipeline reinstatement tool 2000 that includes a flexible sleeve portion 140 having a first cylindrical floating spacer element 1820A and a second cylindrical floating spacer element 1820B disposed along the flexible shaft 110 and positioned between a first compressible tensioner section 160A and a second compressible tensioner section 160B, in accordance with at least one embodiment described herein. FIG. 20A is a sectional view of the illustrative pipeline reinstatement tool depicted in FIG. 20 along sectional line 20A-20A, in accordance with at least one embodiment described herein. FIG. 20B is a sectional view of the illustrative pipeline reinstatement tool depicted in FIG. 20 along sectional line 20B-20B, in accordance with at least one embodiment described herein. FIG. 20C is a sectional view of the illustrative pipeline reinstatement tool depicted in FIG. 20 along sectional line 20C-20C, in accordance with at least one embodiment described herein. FIG. 20D is a sectional view of the illustrative pipeline reinstatement tool depicted in FIG. 20 along sectional line 20D-20D, in accordance with at least one embodiment described herein.

As depicted in FIG. 20, the flexible sleeve portion 140 includes a flexible member 242 disposed about the flexible shaft 110 and positioned between the first cylindrical floating spacer element 1820A and the second cylindrical floating spacer element 1820B. Also as depicted in FIG. 20, the first compressible tensioner section 160A may include a first compressible element 262A positioned between a first annular connector 270A and an intermediate annular connector 270B and a second compressible element 262B positioned between the intermediate annular connector 270B and a second annular connector 270C. The second compressible tensioner section 160B includes a compressible element 262C disposed between a third annular connector 270D and a fourth annular connector 270E. In embodiments, the length ($L_1$) of the first compressible tensioner section 160A may be greater than the length ($L_2$) of the second compressible tensioner section 160B.

The flexible sleeve portion 140 includes the first cylindrical floating spacer element 1820A and the second cylindrical floating spacer element 1820B. The first cylindrical floating spacer element 1820A and the second cylindrical floating spacer element 1820B may be longitudinally displaced along the axis of the flexible member 110. In embodiments, the flexible member 242 may include a tightly wound, incompressible, but flexible helical coil spring as depicted in FIG. 20. In such embodiments, the distance between the first cylindrical floating spacer element 1820A and the second cylindrical floating spacer element 1820B remains substantially fixed and permits the transmission of a force applied along the longitudinal axis of the flexible shaft to compress either or both the first compressible tensioner section 160A and/or the second compressible tensioner section 160B to expose the cylindrical cutting head 1100.

The flexible sleeve portion 140 includes a flexible member 242 positioned between the first cylindrical floating spacer element 1820A and the second cylindrical floating spacer element 1820B such that a first end of the flexible member 242 is positioned proximate the first cylindrical floating spacer element 1820A and a second end of the flexible member 242 is positioned proximate the second cylindrical floating spacer element 1820B. In embodiments, neither the first end nor the second end of the flexible member 242 is flared. Thus, in some embodiments, the flexible member 242 may maintain a substantially constant internal diameter and a substantially constant external diameter along the longitudinal length of the flexible member 242. In other embodiments, either or both the first end and/or the second end of the flexible member 242 may have an increasing radius that causes the respective end to flare outward. In such embodiments, the flexible member 242 may have a variable internal diameter and external diameter along at least a portion of the length of the flexible member 242. In some embodiments, the surface of the first cylindrical floating spacer element 1820A and/or the second cylindrical floating spacer element 1820B may be radiused or curved proximate the first end and/or second end of the flexible member 242. In such instances, the increasing radius of the flexible member may approximate or be the same as the curvature of the cylindrical floating spacer element, thereby providing an extended contact surface between the flexible member 242 and the cylindrical floating spacer element.

A first end of the first compressible element 262A seats inside a cavity or void space formed inside the first annular connector 270A and a second end of the first compressible element 262A seats inside a cavity or void space formed inside a first end of the intermediate annular connector 270B. Similarly, a first end of the second compressible element 262B seats inside a cavity or void space formed inside a second end of the intermediate annular connector 270B and a second end of the second compressible element 262B seats inside a cavity or void space formed inside the second annular connector 270C.

In embodiments, the first end of the first compressible element 262A may be physically affixed inside the cavity or void space inside the first annular connector 270A. In embodiments, the first end of the first compressible element 262A may be press-fit, chemically bonded, and/or thermally welded inside the cavity or void space inside the first annular connector 270A. In other embodiments, the first end of the first compressible element 262A may be detachably attached to the inside surface of the cavity or void space inside the first annular connector 270A. For example the first end of the first compressible element 262A may be threadedly attached to the inside surface of the cavity or void space inside the first annular connector 270A.

The first compressible element 262A may include any number and/or combination of metallic or non-metallic members capable of compression along the longitudinal axis 112 of the flexible member 110 upon application of a force applied along the longitudinal axis 112 of the flexible member 110. In embodiments, the first compressible element 262A includes a compressible element having a first spring constant ($K_1$) under compression. In embodiments, the first compressible element 262A includes a metallic helical coil spring having any number of turns. In embodiments, the first compressible element 262A includes a metallic helical coil spring fabricated using one or more corrosion resistant material such as, aluminum, stainless steel, galvanized steel, coated steel, nickel containing alloys, titanium, or combinations thereof. The flexible shaft 110 passes through a central aperture formed in the first compressible element. The first compressible element 262A may include a helical coil spring formed using round, square, or rectangular wire stock.

A first end of the intermediate annular connector 270B receives the second end of the first compressible element 262A and the opposed second end of the intermediate annular connector 270B receives the first end of the second compressible element 262B. The second annular connector 270C receives the second end of the second compressible element 262B. The second annular connector 270C may be disposed proximate the first cylindrical floating spacer element 1820A.

The second compressible element 262B may include any number and/or combination of metallic or non-metallic members capable of compression along the longitudinal axis 112 of the flexible member 110 upon application of a force applied along the longitudinal axis 112 of the flexible member 110. In embodiments, the second compressible element 262B includes a compressible element having a second spring constant ($K_2$) under compression. In embodiments, the second spring constant of the second compressible element 262B may be similar to the first spring constant of the first compressible element 262A. In other embodiments, the second spring constant of the second compressible element 262B may be greater than the first spring constant of the first compressible element 262A. In yet other embodiments, the second spring constant of the second compressible element 262B may be less than the first spring constant of the first compressible element 262A. In embodiments, the uncompressed length of the second compressible element 262B may be similar to the uncompressed length of the first compressible element 262A. In other embodiments, the uncompressed length of the second compressible element 262B may be greater than the uncompressed length of the first compressible element 262A. In yet other embodiments, the uncompressed length of the second compressible element 262B may be less than the uncompressed length of the first compressible element 262A.

In embodiments, the second compressible element 262B includes a metallic helical coil spring having any number of turns. In embodiments, the second compressible element 262B includes a metallic helical coil spring fabricated using one or more corrosion resistant material such as, aluminum, stainless steel, galvanized steel, coated steel, nickel containing alloys, titanium, or combinations thereof. The flexible shaft 110 passes through a central aperture formed in the second compressible element 262B. In embodiments, the second compressible element 262B may include a helical coil spring formed using round, square, or rectangular wire stock.

A first end of the third compressible element 262C seats inside a cavity or void space formed inside the third annular connector 270D and a second end of the third compressible element 262C seats inside a cavity or void space formed inside a first end of the fourth annular connector 270E. In embodiments, the first end of the third compressible element 262C may be physically affixed inside the cavity or void space inside the third annular connector 270C. In embodiments, the first end of the third compressible element 262C may be press-fit, chemically bonded, and/or thermally welded inside the cavity or void space inside the third annular connector 270D. In other embodiments, the second end of the third compressible element 262C may be detachably attached to the inside surface of the cavity or void space inside the third annular connector 270D. For example the first end of the third compressible element 262C may be threadedly attached to the inside surface of the cavity or void space inside the third annular connector 270D. The third annular connector 270D may be positioned proximate the second cylindrical floating spacer element 1820B. The fourth annular connector 270E may be positioned proximate the coupling assembly 190.

The third compressible element 262C may include any number and/or combination of metallic or non-metallic members capable of compression along the longitudinal axis 112 of the flexible member 110 upon application of a force applied along the longitudinal axis 112 of the flexible member 110. In embodiments, the third compressible element 262C includes a compressible element having a third spring constant ($K_3$) under compression. In embodiments, the third compressible element 262C includes a metallic helical coil spring having any number of turns. In embodiments, the third compressible element 262C includes a metallic helical coil spring fabricated using one or more corrosion resistant material such as, aluminum, stainless steel, galvanized steel, coated steel, nickel containing alloys, titanium, or combinations thereof. The flexible shaft 110 passes through a central aperture formed in the third compressible element 262C. The third compressible element 262C may include a helical coil spring formed using round, square, or rectangular wire stock.

In embodiments, the third spring constant of the third compressible element 262C may be the same as or similar to the first spring constant of the first compressible element 262A and/or the second spring constant of the second compressible element 262B. In other embodiments, the third spring constant of the third compressible element 262C may be greater than the first spring constant of the first compressible element 262A and/or the second spring constant of the second compressible element 262B. In yet other embodiments, the third spring constant of the third compressible element 262C may be less than the first spring constant of the first compressible element 262A and/or the second spring constant of the second compressible element 262B.

In embodiments, the uncompressed length of the third compressible element 262C may be the same as or similar to the uncompressed length of the first compressible element 262A and/or the uncompressed length of the second compressible element 262B. In other embodiments, the uncompressed length of the third compressible element 262C may be greater than the uncompressed length of the first compressible element 262A and/or the uncompressed length of the second compressible element 262B. In yet other embodiments, the uncompressed length of the third compressible element 262C may be less than the uncompressed length of the first compressible element 262A and/or the uncompressed length of the second compressible element 262B.

FIG. 21 is a side elevation view of an illustrative pipeline reinstatement tool 2100 that includes: a flexible sleeve portion 140 having a flexible member 242, an external flexible member 510 disposed about at least a portion of the flexible member 242, and two cylindrical floating spacer elements 1820A and 1820B disposed along the flexible shaft 110 and positioned between a first compressible tensioner 160A and a second compressible tensioner 160B, in accordance with at least one embodiment described herein. FIG. 21A is a sectional view of the illustrative pipeline reinstatement tool 2100 depicted in FIG. 21 along sectional line 21A-21A, in accordance with at least one embodiment described herein.

Referring first to FIGS. 21 and 21B, the flexible sleeve portion 140 includes the flexible member 242 and a first external flexible member 510 disposed about at least a portion of the first flexible member 242. In embodiments, the external flexible member 510 encircles at least a portion of the axial length of the flexible member 242. The external flexible member 510 may enclose, encompass, or encircle about 10% or less; about 20% or less; about 30% or less; about 50% or less; or about 75% or less of the axial length of the flexible member 242. In embodiments, the flexible member 242 may include a tightly coiled spring member and the external flexible member 510 may include a tightly coiled spring member having an inside diameter that closely matches the outside diameter of the flexible member 242. In such embodiments, the internal surface of the external flexible member 510 may threadedly engage the external surface of the flexible member 242. As the flexible member 242 is inserted into the external flexible member 510, the stiffness of the flexible sleeve portion 140 increases and as the flexible member 242 is withdrawn from the external flexible member 510, the stiffness of the flexible sleeve 140 decreases.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A reinstatement tool, comprising:
   a flexible shaft having a first length, a first end, and a second end;
   a cutting head coupled to the first end of the flexible shaft, the cutting head including:
      a hollow cylindrical member having a first end, a second end, an internal surface and an external surface; and
      cutting teeth disposed on a first end of the hollow cylindrical member and extending longitudinally from the first end of the hollow cylindrical member;
   a coupling assembly coupled to the second end of the flexible shaft;
   a first compressible tensioner portion disposed around the flexible shaft and extending a first distance along the flexible shaft, the first compressible tensioner portion disposed proximate the cutting head, the first compressible tensioner including;
      first annular connector;
      an intermediate annular connector;
      a second annular connector;
      a first compressible element having a first spring constant disposed between the first annular connector and the intermediate annular connector; and
      a second compressible element having a second spring constant disposed between the intermediate annular connector and the second annulare connector a second compressible tensioner portion disposed around the flexible shaft and extending a second distance along the flexible shaft, the second compressible tensioner portion disposed proximate the coupling assembly; and a flexible sleeve disposed around the flexible shaft and positioned between the first compressible tensioner portion and the second compressible tensioner portion.

2. The reinstatement tool of claim 1 wherein the first spring constant is similar to the second spring constant.

3. The reinstatement tool of claim 1 wherein the first spring constant is greater than the second spring constant.

4. The reinstatement tool of claim 1 wherein the first spring constant is less than the second spring constant.

5. The reinstatement tool of claim 1 wherein the second compressible tensioner portion comprises:
a third annular connector;
a fourth annular connector; and
a third compressible element having a third spring constant disposed between the third annular connector and the fourth annular connector.

6. The reinstatement tool of claim 5 wherein the flexible sleeve comprises:
a first cylindrical floating spacer element disposed around the flexible shaft;
a second cylindrical floating spacer element disposed around the flexible shaft;
a flexible member disposed about the flexible shaft and positioned between the first cylindrical floating spacer element and the second cylindrical floating spacer element.

7. The reinstatement tool of claim 6, further comprising:
an external flexible member disposed about at least a portion of an external surface of the flexible member.

8. The reinstatement tool of claim 7:
wherein the flexible member includes a tightly wound helical coil having a first length;
wherein the external flexible member includes a tightly wound helical coil having a second length;
wherein at least a portion of an internal surface of the external flexible member threadedly engaged at least a portion of an external surface of the flexible member.

9. The reinstatement tool of claim 8 wherein the first length is greater than the second length.

10. The reinstatement tool of claim 6 wherein the cutting head comprises:
a button removal feature disposed within the hollow cylindrical member and extending radially inward from the internal surface of the hollow cylindrical member.

11. The reinstatement tool of claim 10 wherein the cutting head further comprises:
a hemispherical floating spacer member disposed about at least a portion of the external surface of the hollow cylindrical member.

12. A pipeline reinstatement system, comprising:
a driver to provide a shaft output;
a rotatable external drive shaft to couple to the driver shaft output;
a pipeline reinstatement tool that includes:
a flexible shaft having a first length, a first end, and a second end;
a cutting head coupled to the first end of the flexible shaft, the cutting head including:
a hollow cylindrical member having a first end, a second end, an internal surface and an external surface; and
cutting teeth disposed on a first end of the hollow cylindrical member and extending longitudinally from the first end of the hollow cylindrical member;
a coupling assembly coupled to the second end of the flexible shaft, the coupling assembly to couple the flexible shaft to the rotatable external drive shaft;
a first compressible tensioner portion disposed around the flexible shaft and extending a first distance along the flexible shaft, the first compressible tensioner portion disposed proximate the cutting head, the first compressible tensioner including;
a first annular connector;
an intermediate annular connector;
a second annular connector;
a first compressible element having a first spring constant disposed between the first annular connector and the intermediate annular connector; and
a second compressible element having a second spring constant disposed between the intermediate annular connector and the second annulare connector;
a second compressible tensioner portion disposed around the flexible shaft and extending a second distance along the flexible shaft, the second compressible tensioner portion disposed proximate the coupling assembly, the second compressible tensioner portion; and
a flexible sleeve disposed around the flexible shaft and positioned between the first compressible tensioner portion and the second compressible tensioner portion.

13. The system of claim 12 wherein the first spring constant is similar to the second spring constant.

14. The system of claim 12 wherein the first spring constant is greater than the second spring constant.

15. The system of claim 12 wherein the first spring constant is less than the second spring constant.

16. The system of claim 12 wherein the second compressible tensioner portion comprises:
a third annular connector;
a fourth annular connector; and
a third compressible element having a third spring constant disposed between the third annular connector and the fourth annular connector.

17. The system of claim 16 wherein the flexible sleeve portion comprises:
a first cylindrical floating spacer element disposed around the flexible shaft;
a second cylindrical floating spacer element disposed around the flexible shaft;
a flexible member disposed about the flexible shaft and positioned between the first cylindrical floating spacer element and the second cylindrical floating spacer element.

18. A reinstatement tool, comprising:
a flexible shaft having a first length, a first end, and a second end;
a cutting head coupled to the first end of the flexible shaft, the cutting head including:
a hollow cylindrical member having a first end, a second end, an internal surface and an external surface;
cutting teeth disposed on a first end of the hollow cylindrical member and extending longitudinally from the first end of the hollow cylindrical member;

a button removal feature disposed within the hollow cylindrical member and extending radially inward from the internal surface of the hollow cylindrical member; and a hemispherical floating spacer member disposed about at least a portion of the external surface of the hollow cylindrical member;

a coupling assembly coupled to the second end of the flexible shaft;

a first compressible tensioner portion disposed around the flexible shaft and extending a first distance along the flexible shaft, the first compressible tensioner portion disposed proximate the cutting head, the first compressible tensioner including:

a first annular connector;

an intermediate annular connector;

a second annular connector;

a first compressible element having a first spring constant disposed between the first annular connector and the intermediate annular connector; and a second compressible element having a second spring constant disposed between the intermediate annular connector and the second annulare connector;

a second compressible tensioner portion disposed around the flexible shaft and extending a second distance along the flexible shaft, the second compressible tensioner portion disposed proximate the coupling assembly, the second compressible tensioner portion, the second compressible tensioner including:

a third annular connector;

a fourth annular connector; and a third compressible element having a third spring constant disposed between the third annular connector and the fourth annular connector; and a flexible sleeve disposed around the flexible shaft and positioned between the first compressible tensioner portion and the second compressible tensioner portion, the flexible sleeve including:

a first cylindrical floating spacer element disposed around the flexible shaft;

a second cylindrical floating spacer element disposed around the flexible shaft;

a flexible member disposed about the flexible shaft and positioned between the first cylindrical floating spacer element and the second cylindrical floating spacer element.

* * * * *